Oct. 18, 1966  H. W. MUELLER ETAL  3,279,692
CALCULATING MACHINE

Filed March 6, 1964  37 Sheets-Sheet 1

INVENTOR.
HANS W. MUELLER
BY HANS A. SCHULZ

*Irving Weiner*
AGENT

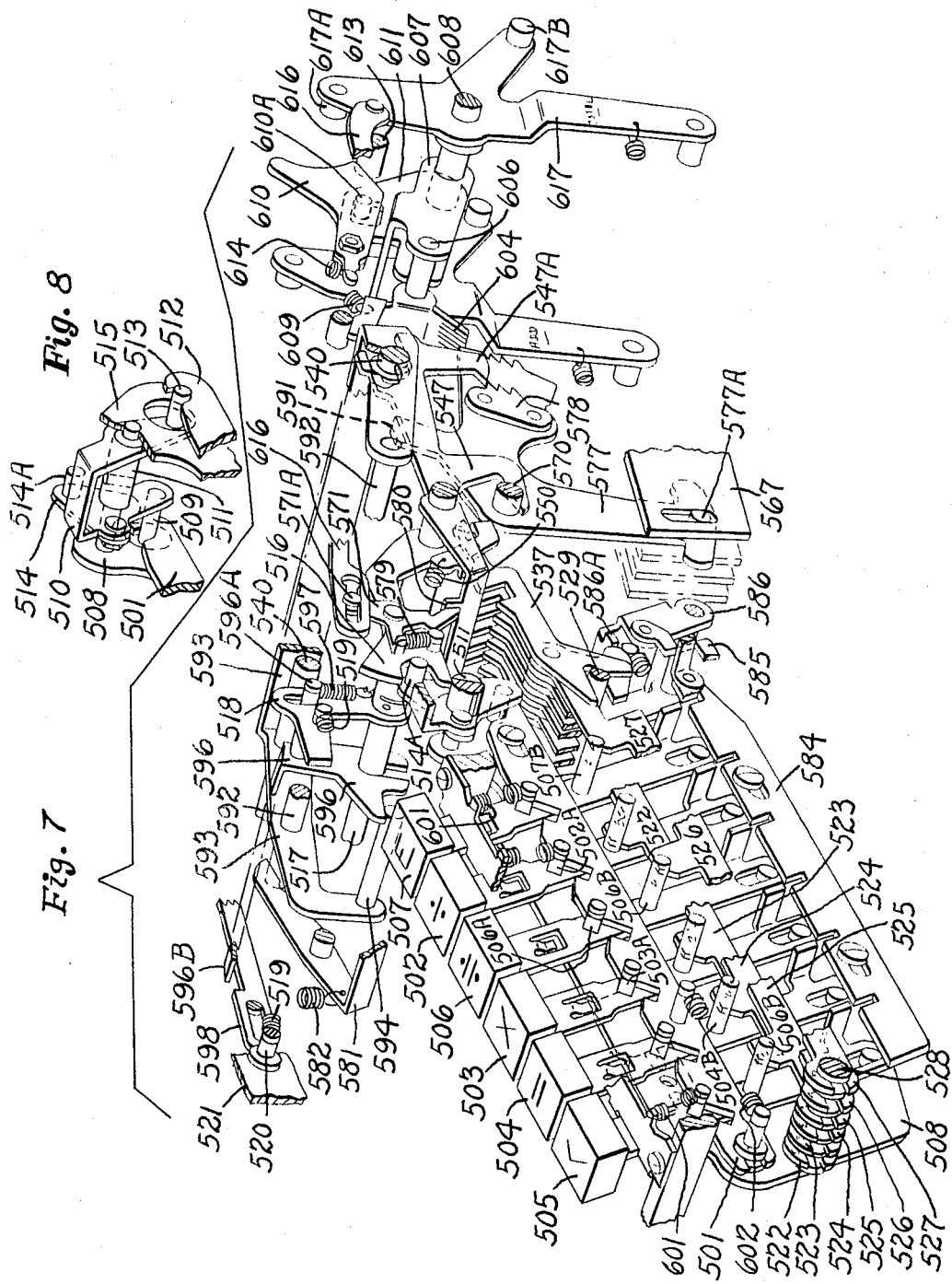

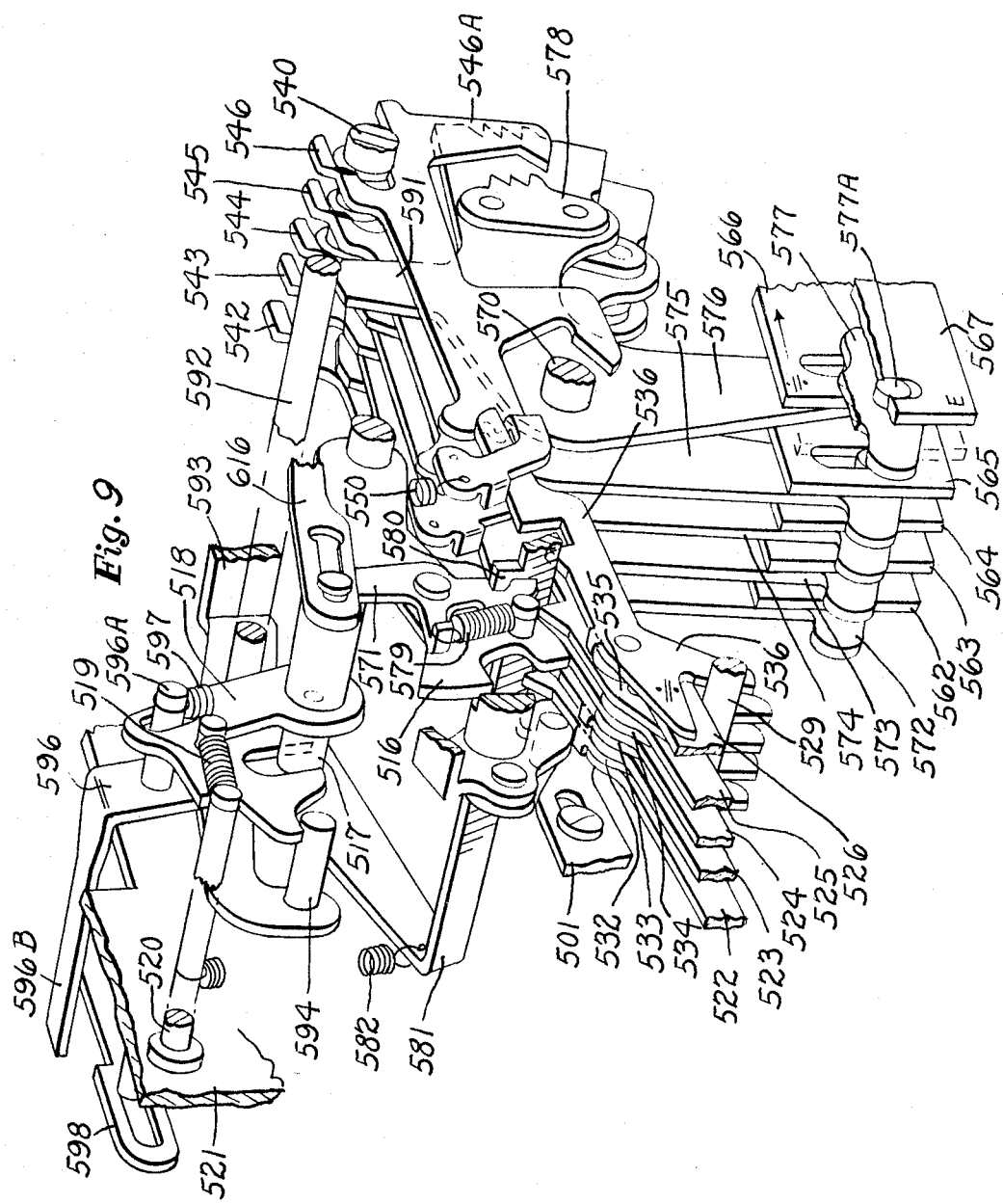

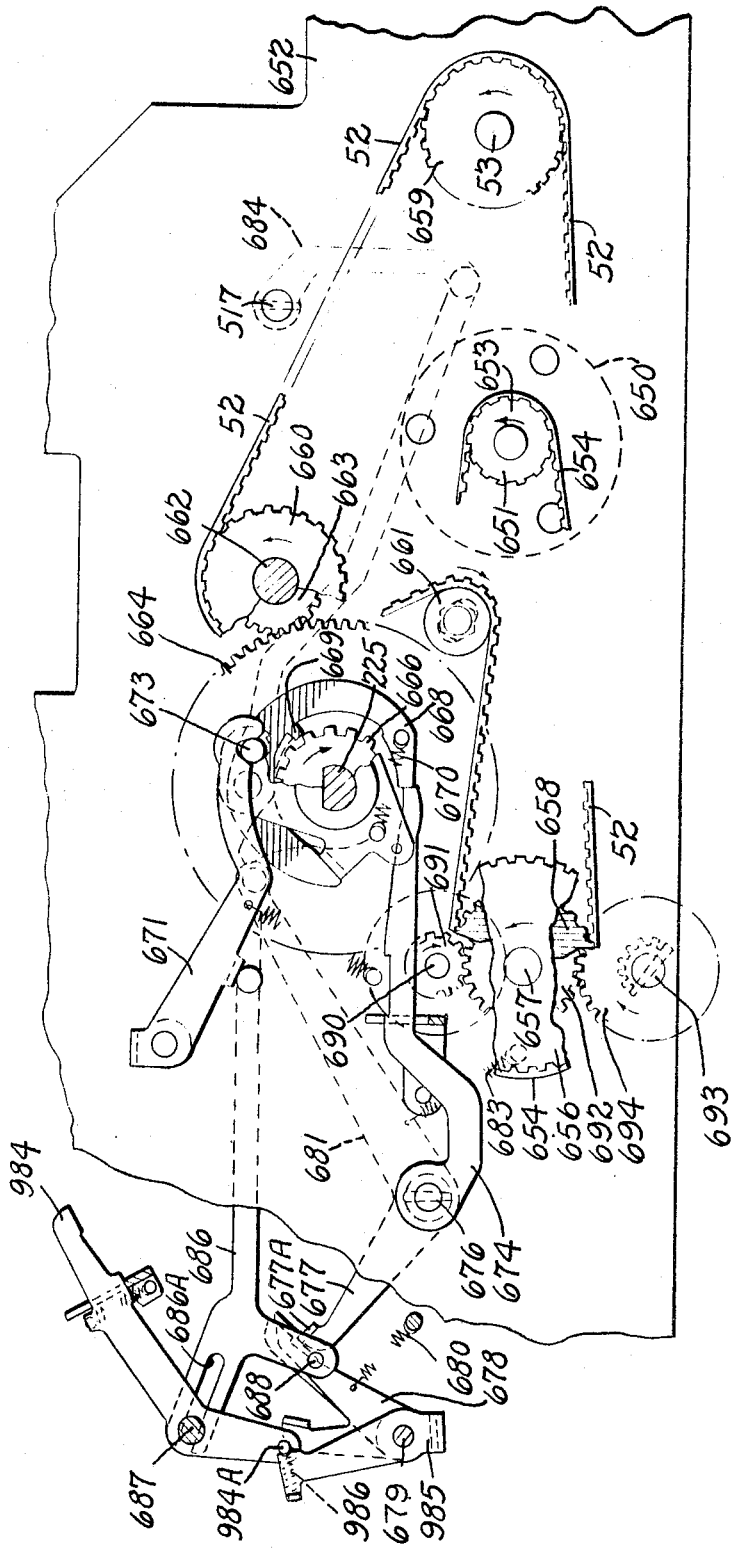

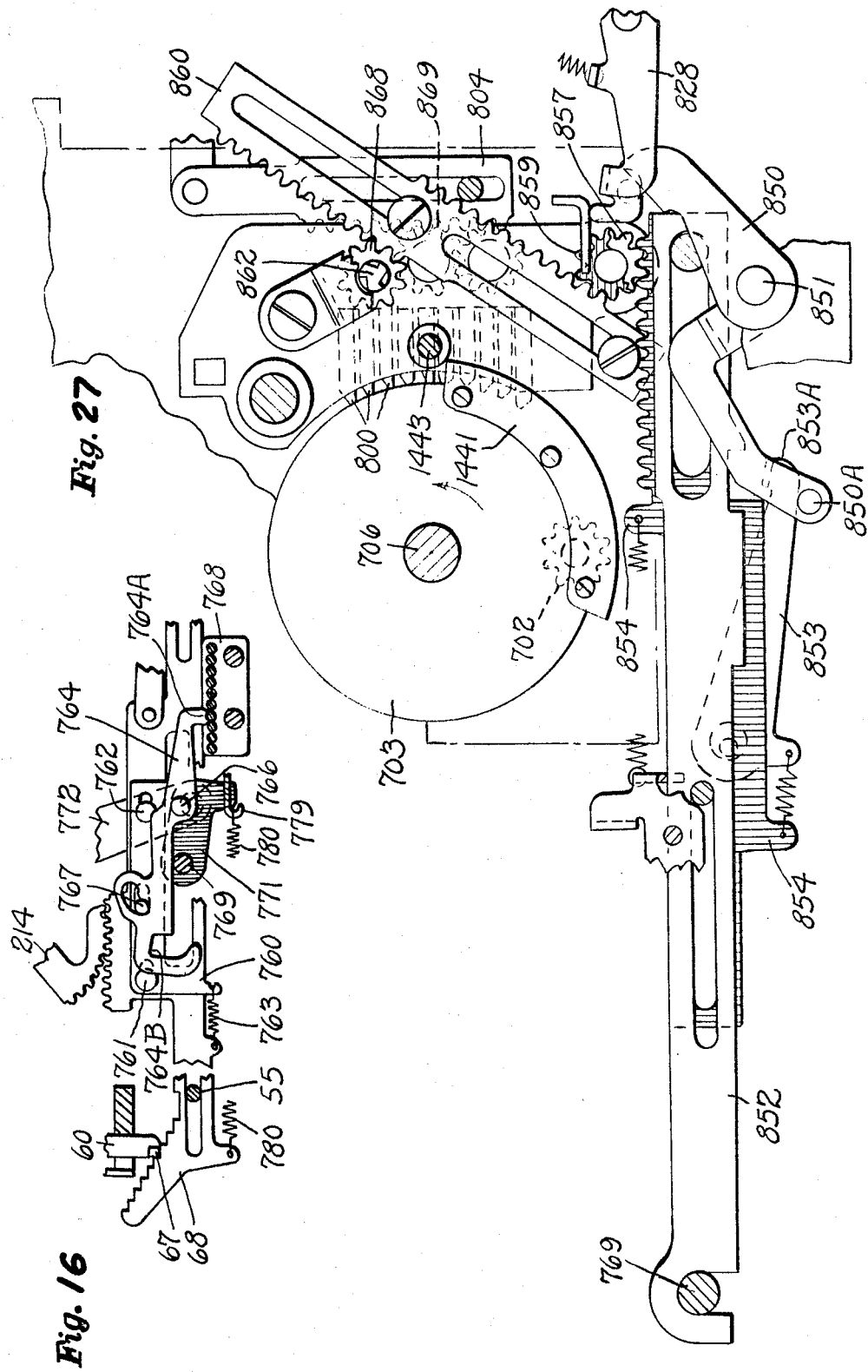

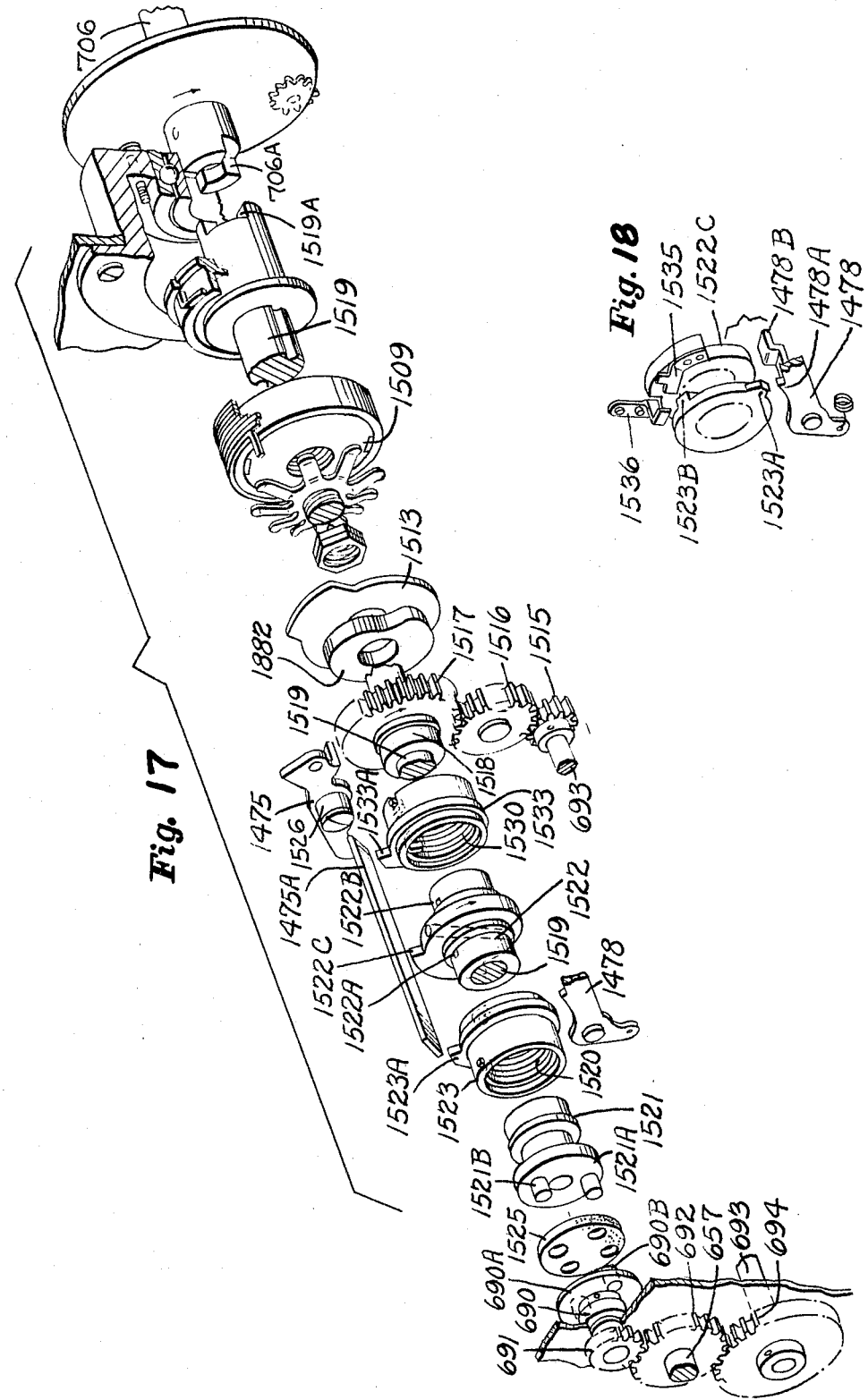

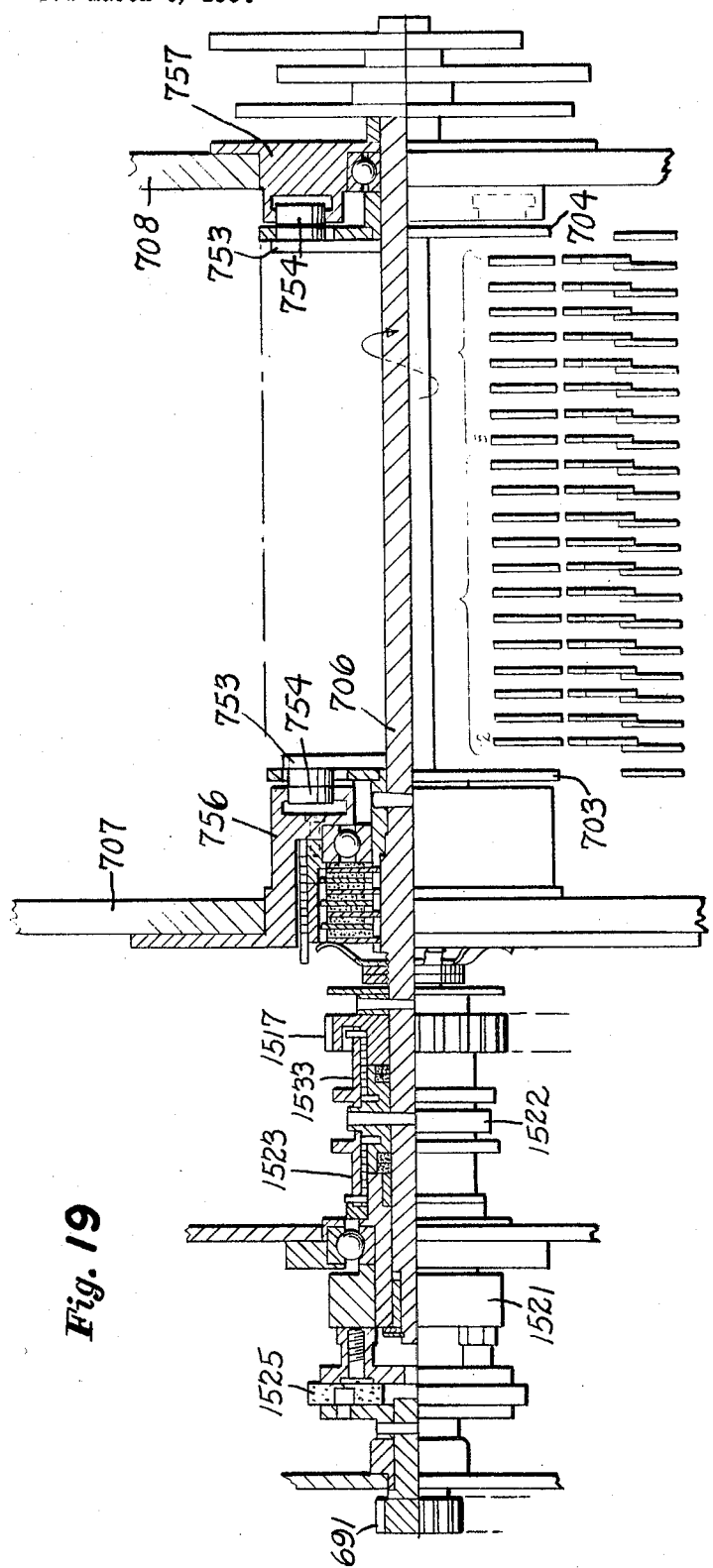

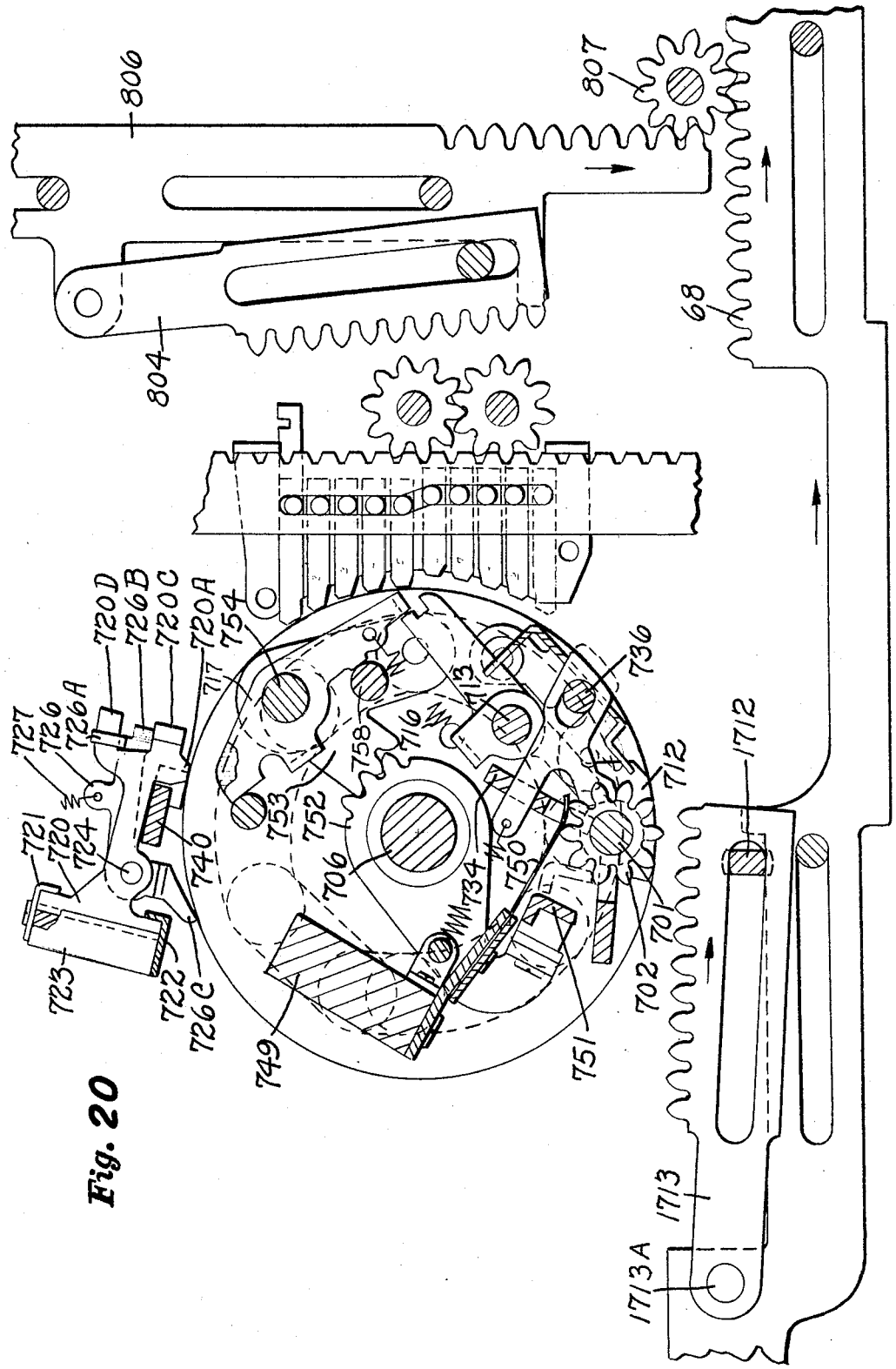

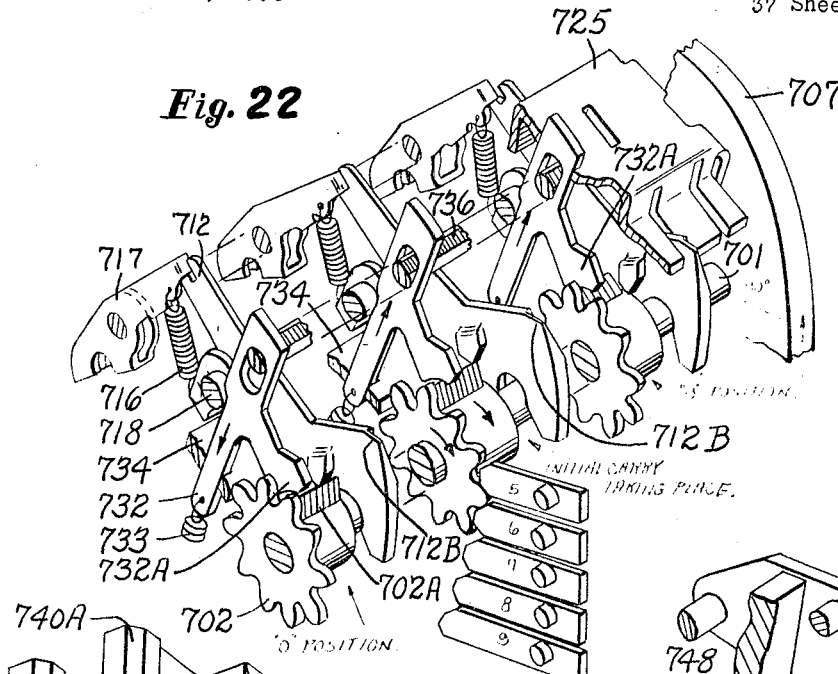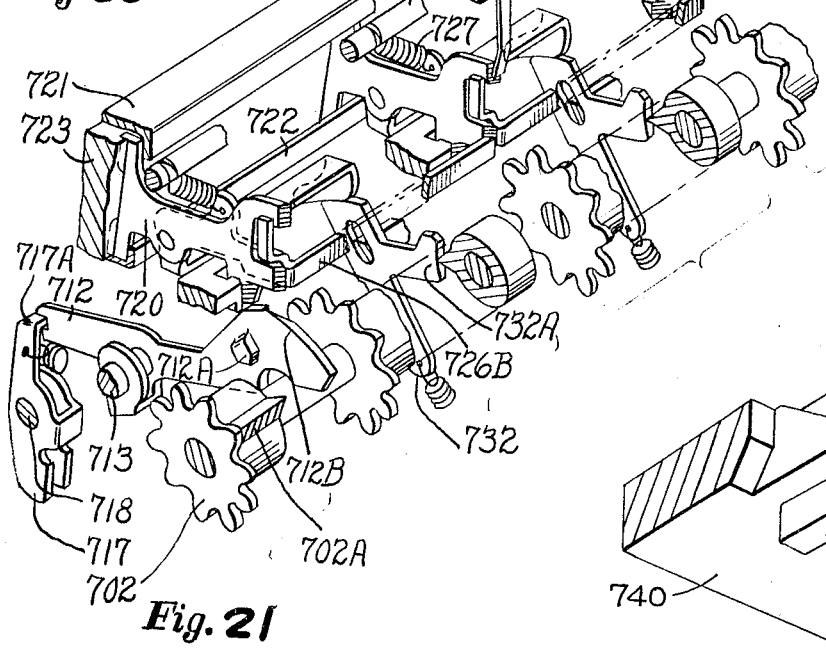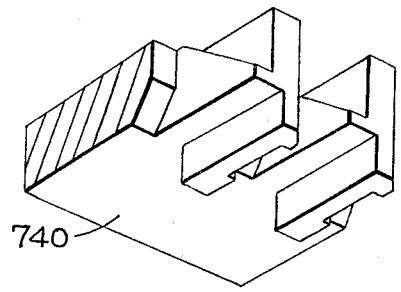

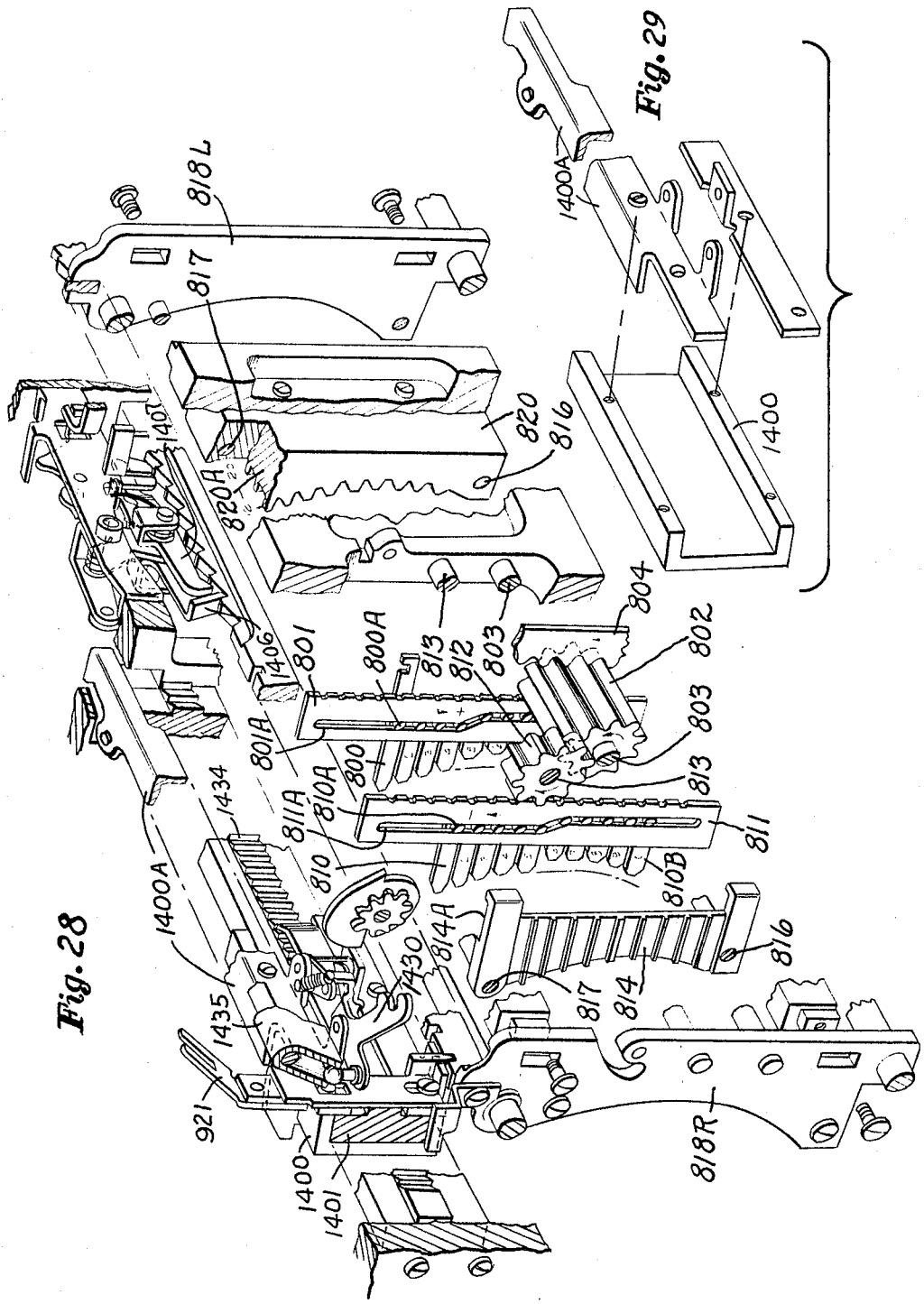

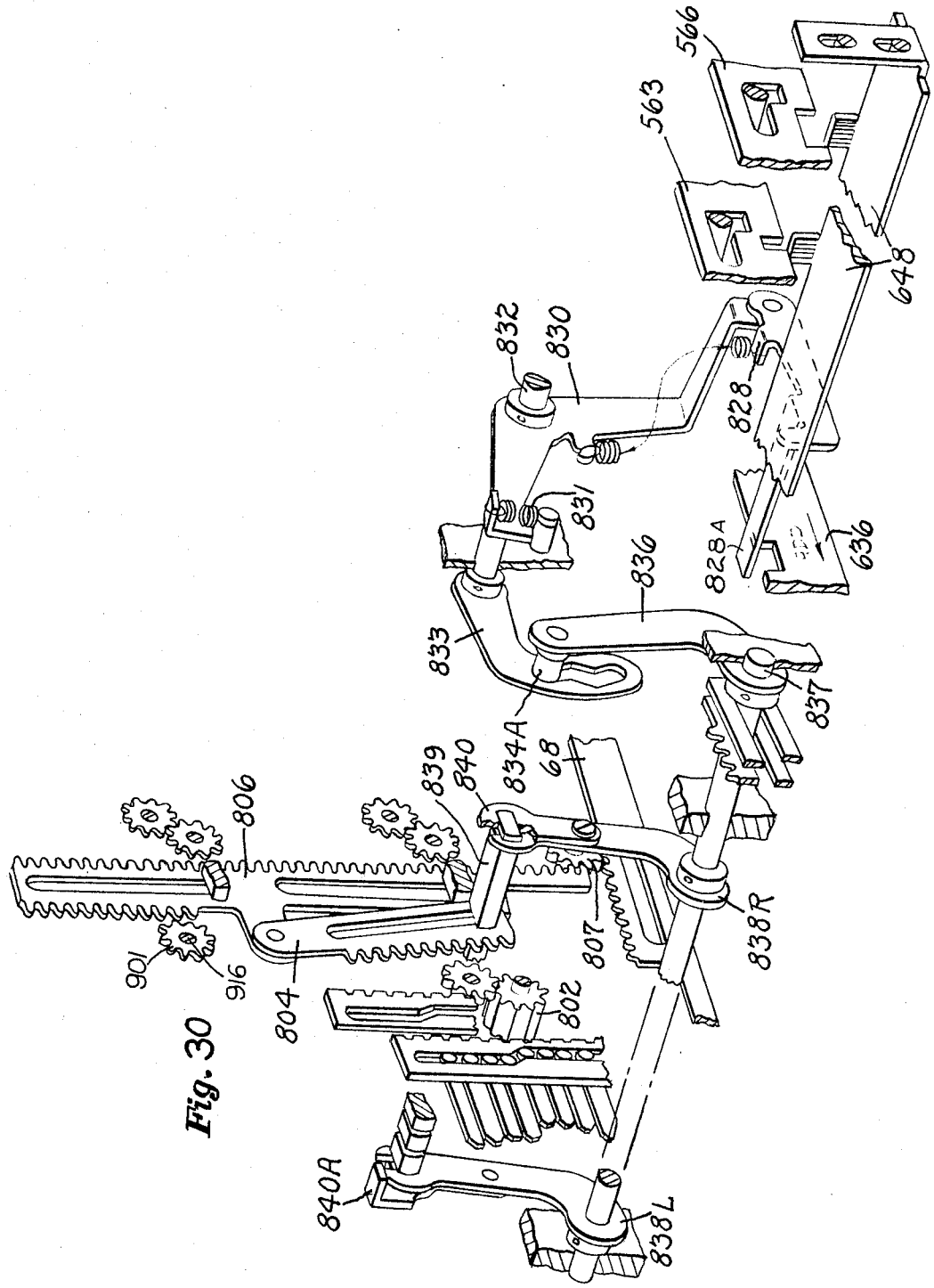

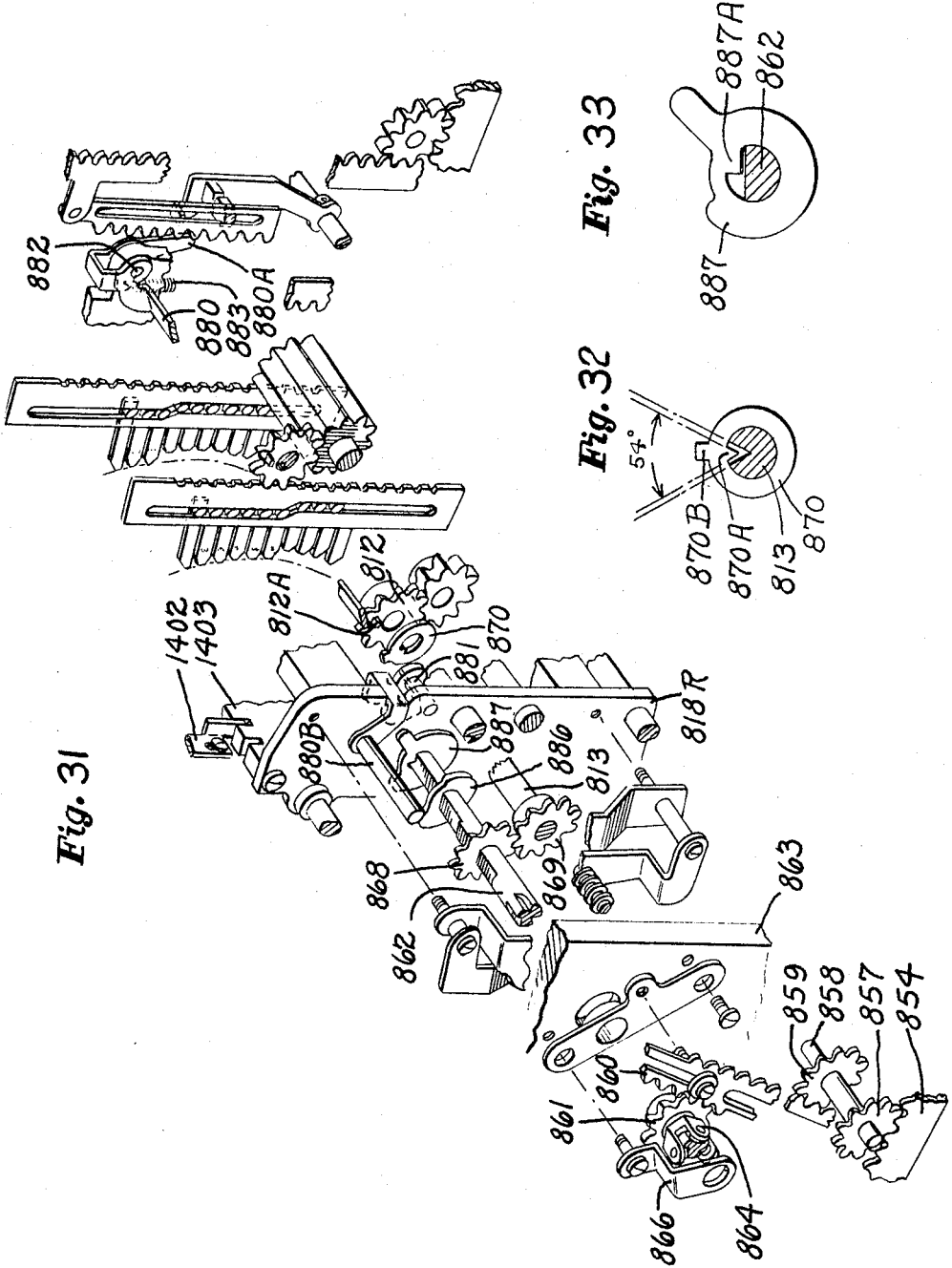

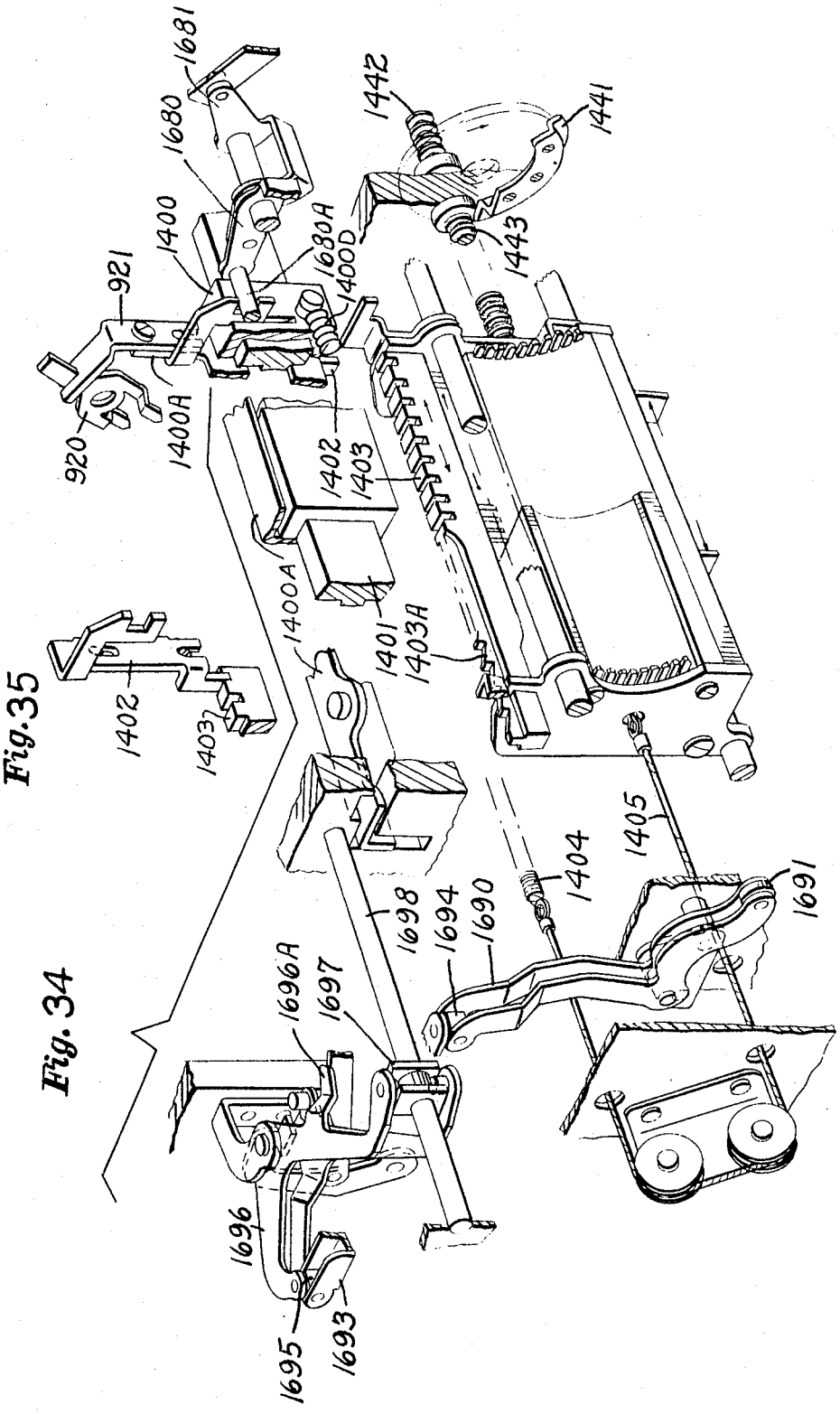

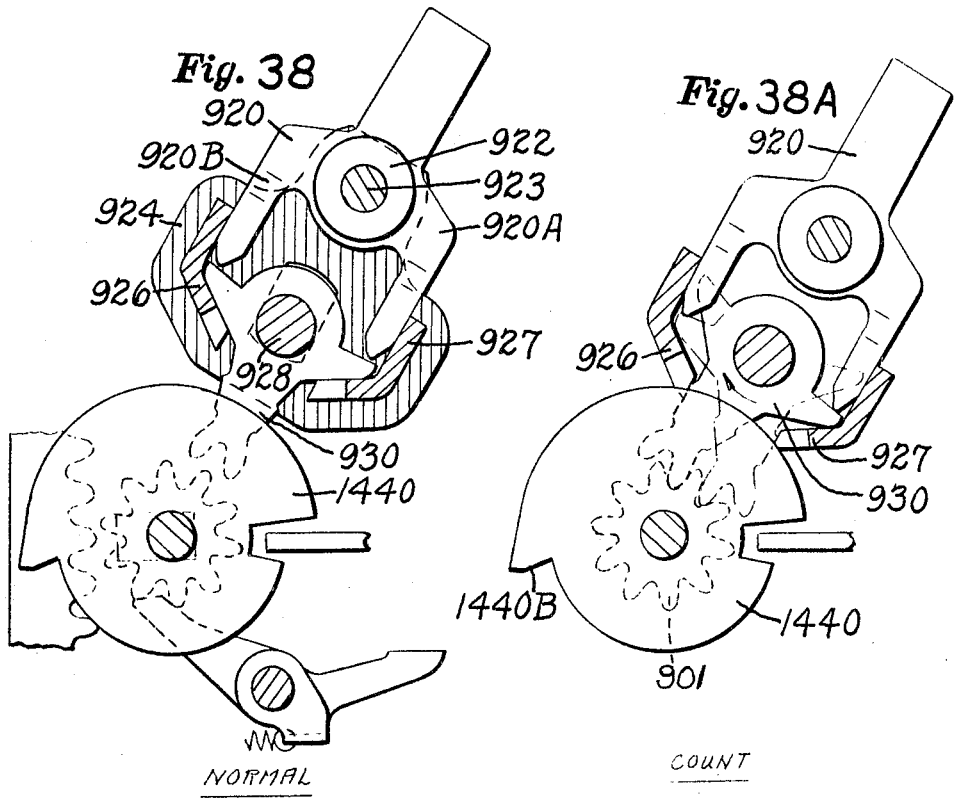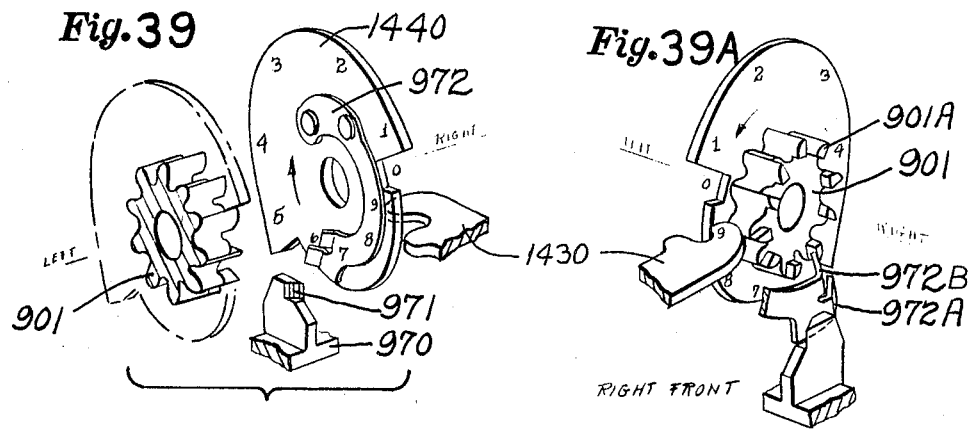

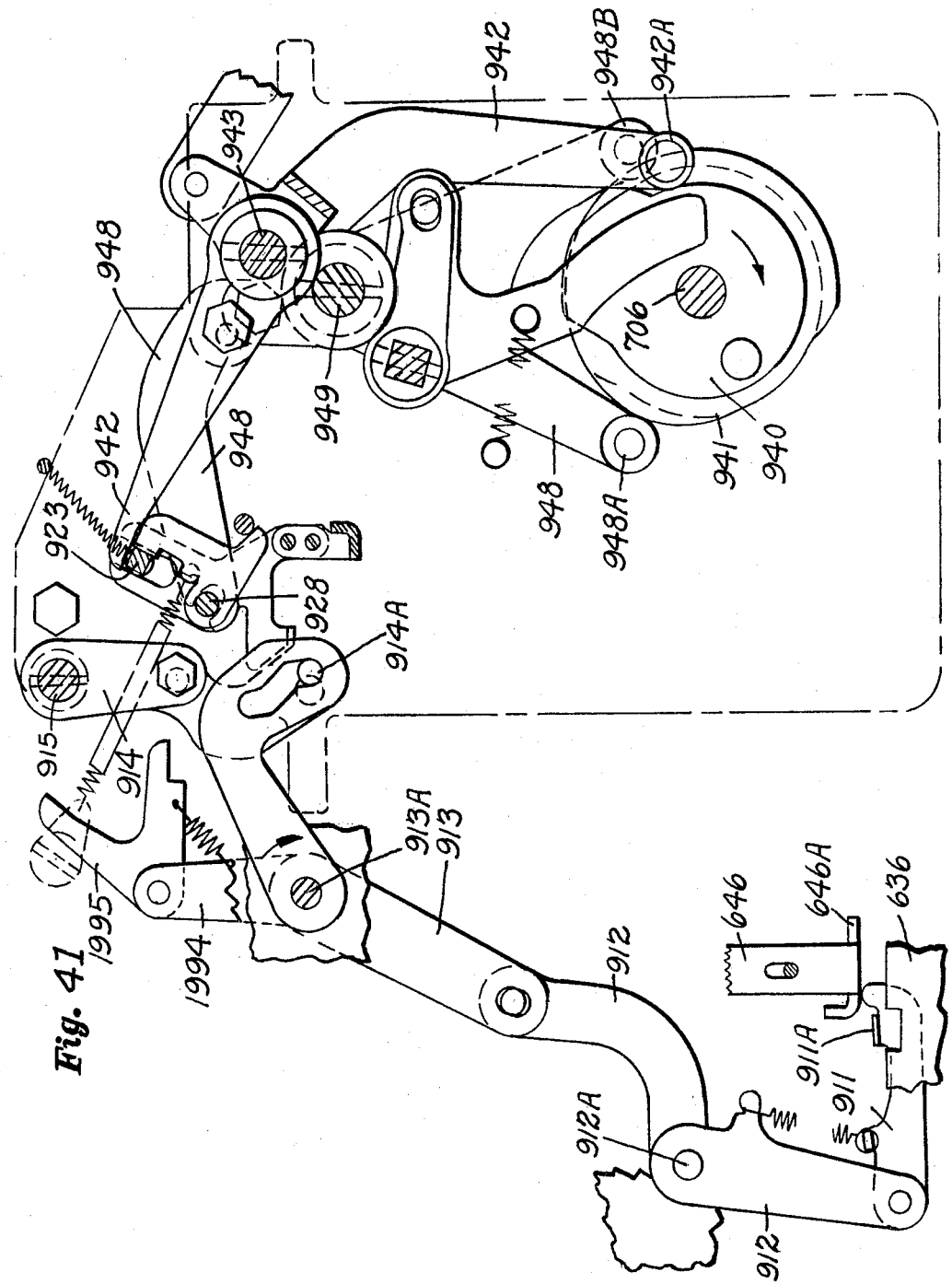

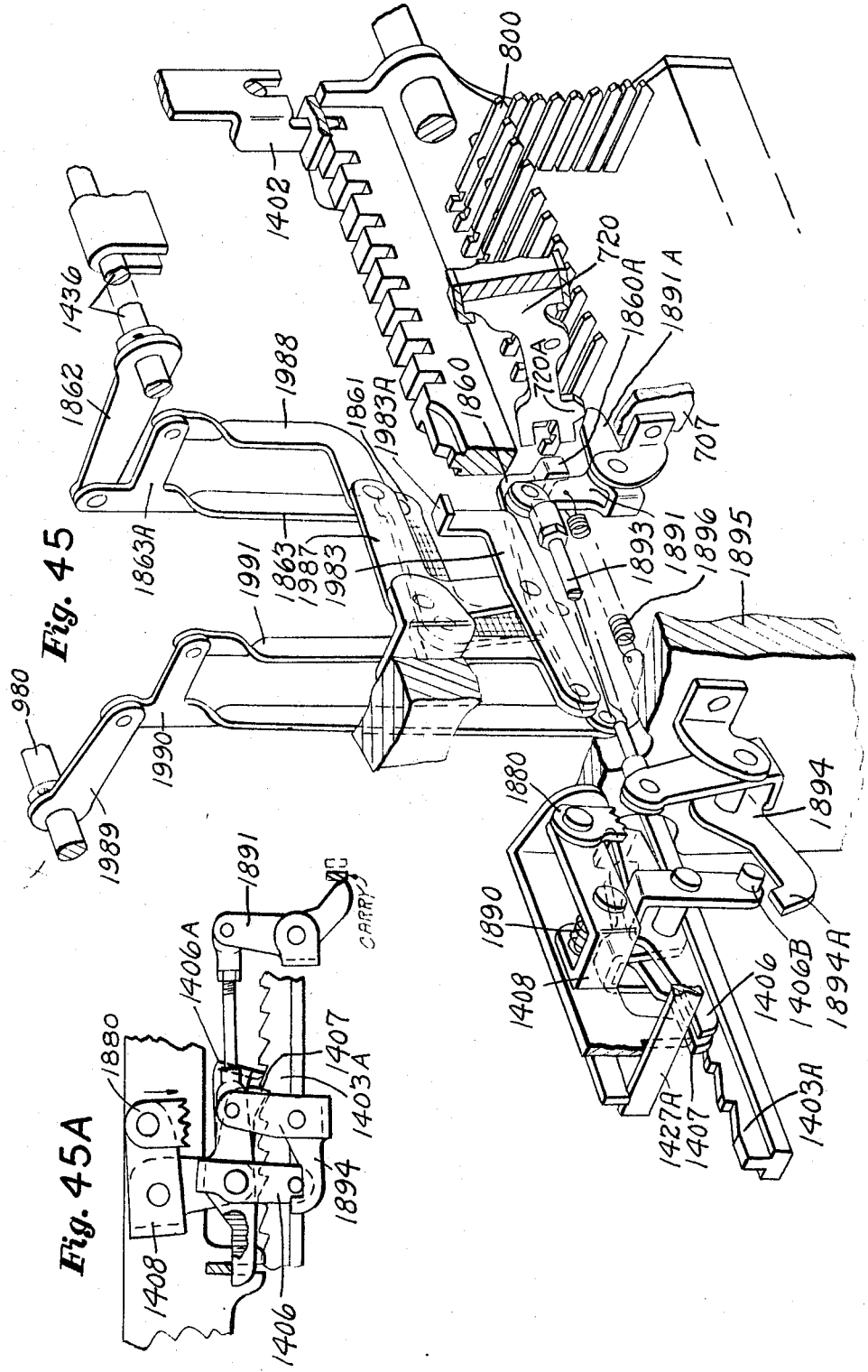

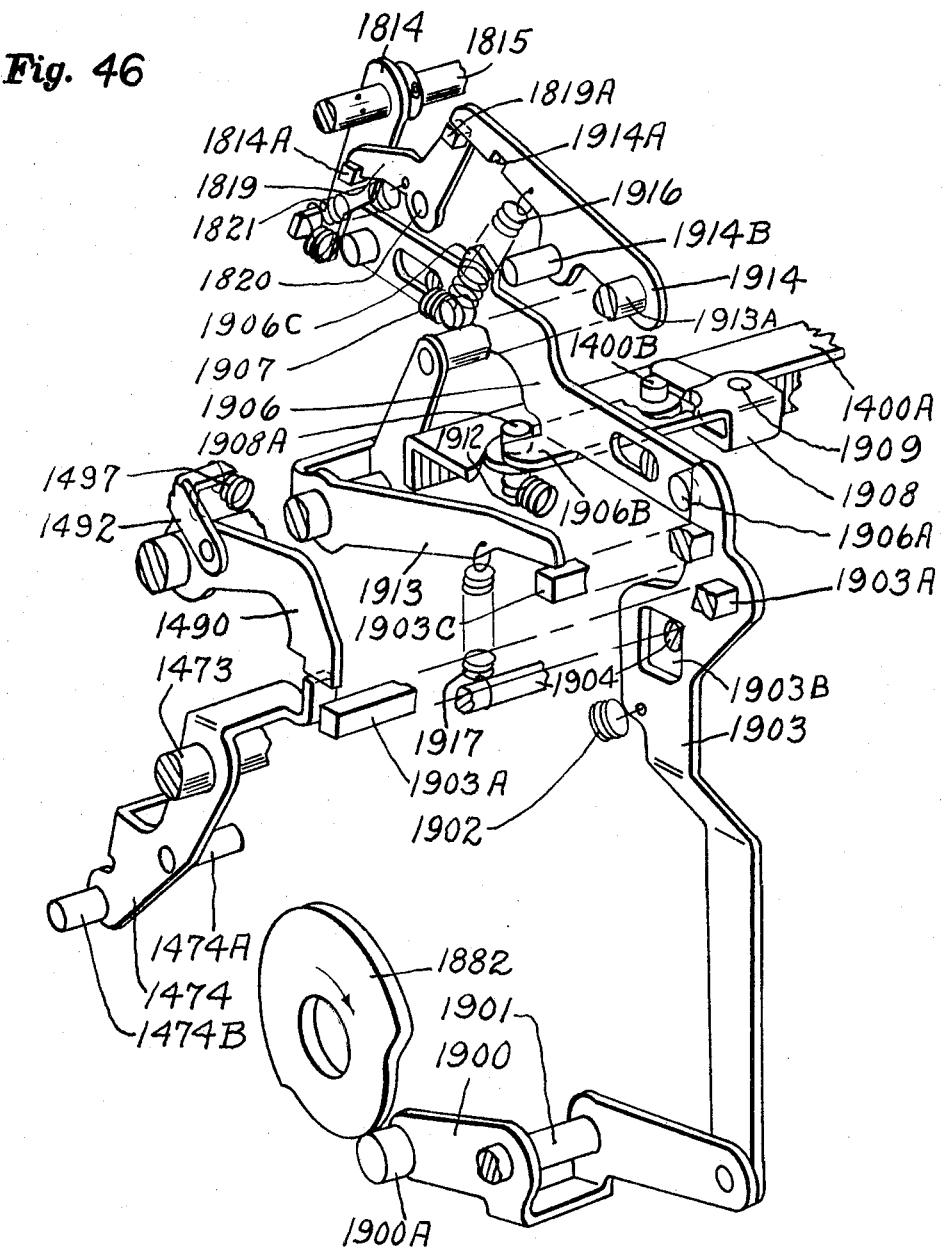

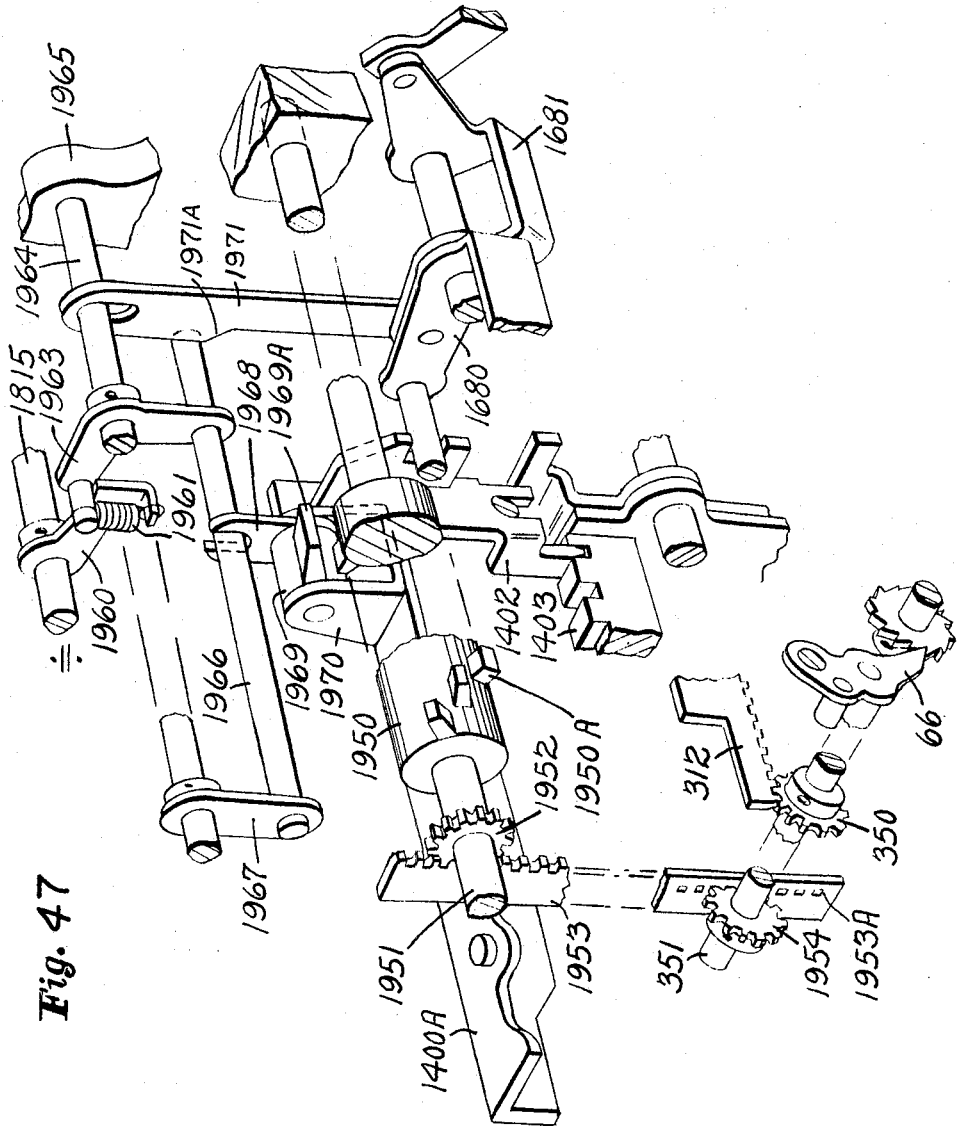

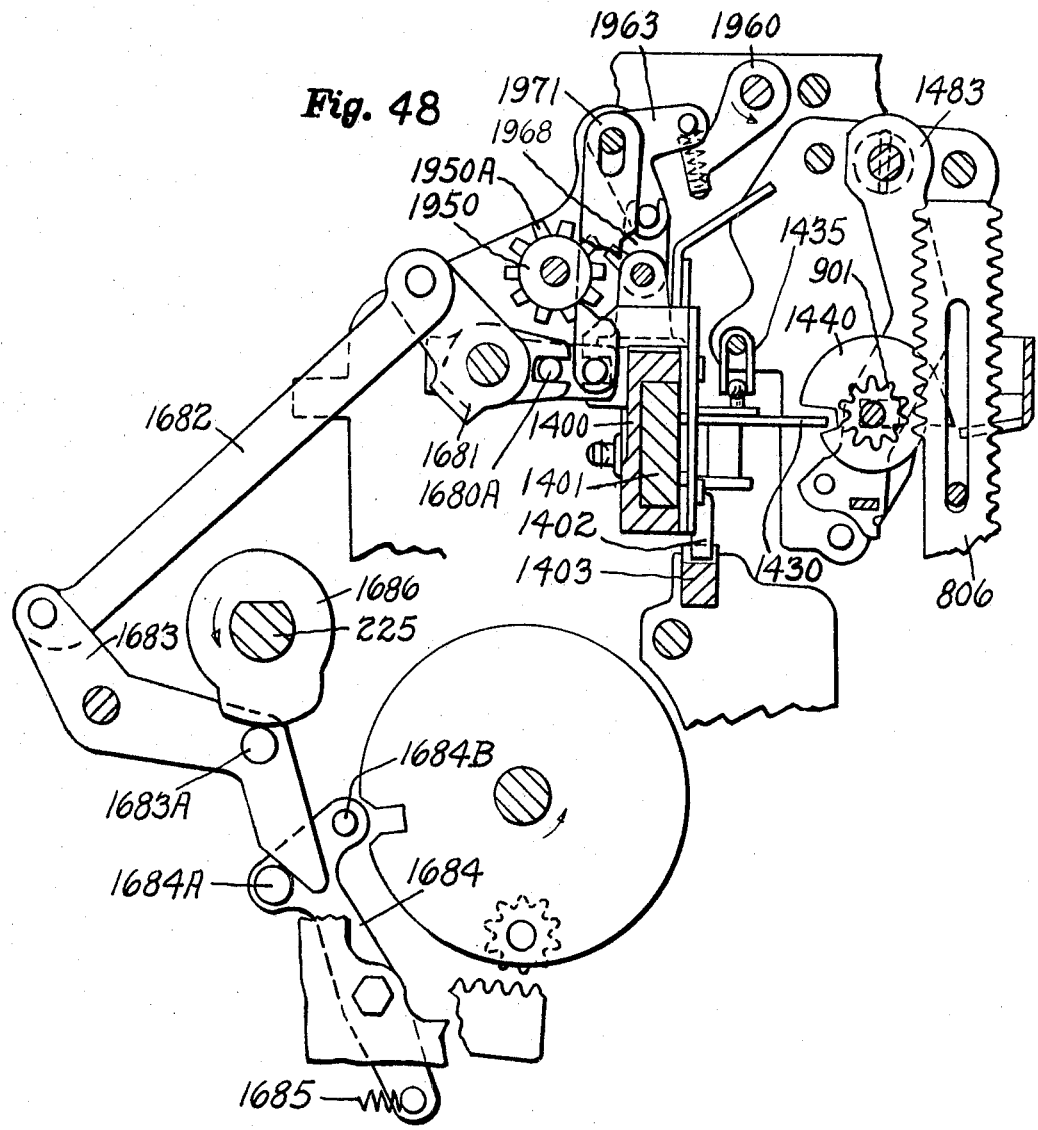

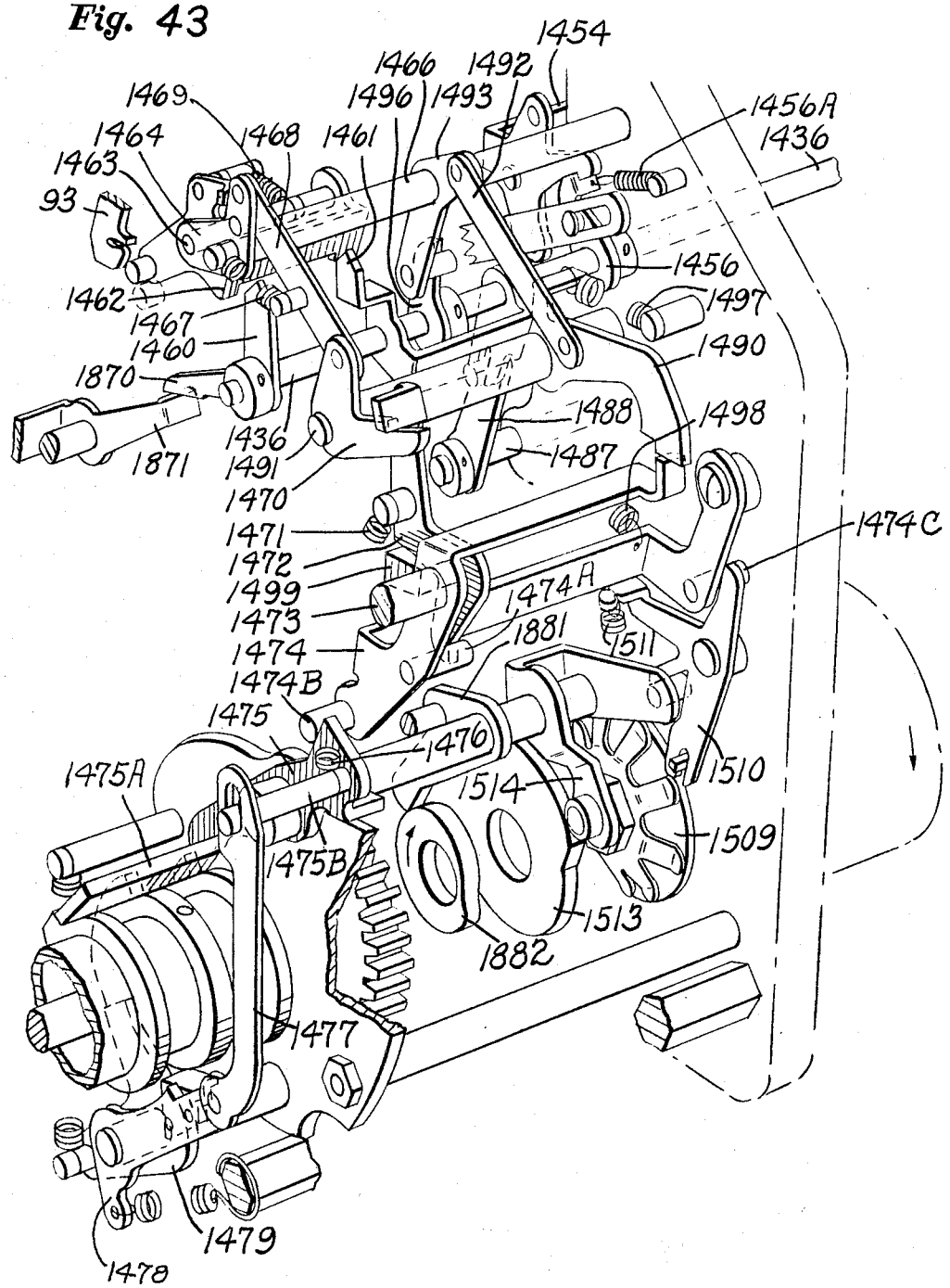

3,279,692
CALCULATING MACHINE
Hans Walter Mueller and Hans A. Schulz, Detroit, Mich., assignors to Burroughs Corporation, Detroit, Mich., a corporation of Michigan
Filed Mar. 6, 1964, Ser. No. 349,945
10 Claims. (Cl. 235—60)

The present invention relates to calculating machines and more particularly to an improved calculating machine adapted to perform multiplication and division problems.

In the prior art, calculating machines adapted for performing multiplication and division have operated on the general principle of repeated addition for multiplication and repeated subtraction for division. Various schemes have been devised for the performance of these repeat addition and subtraction operations including the use of reciprocating add racks. In many such ten key machines an accumulator serves as one storage medium, a pin carriage serves as another storage medium and a third unit is provided as a third storage medium. To perform multiplication on such ten key machines the multiplier is stored in a register and the multiplicand is placed in the pin carriage. Thereafter the add racks are used to transfer the amount from the pin carriage to the accumulator section, the number of such transfer operations being controlled by a multiplier unit.

In recent years machines have been devised which utilize a short-cut method of repeat addition or subtraction to decrease the number of cycles required to perform a given operation. For example, such machines when used to multiply a given multiplicand by a multiplier digit of seven would operate as follows. The multiplicand would be subtracted from the accumulator three times in the units order and then the multiplicand would be added once in the adjacent higher order (the tens order). It will be seen that using such a shortened system of repeat addition, the number of cycles required to multiply by 7 is reduced from 7 to 4, but the acceleration and deceleration of parts and problems associated therewith in a reciprocating add rack machine are not changed.

Accordingly, it is an object of the present invention to provide an improved calculating machine adapted to perform multiplication and division problems.

It is another object of the present invention to provide an improved high speed calculating machine adapted to perform multiplication and division problems. Another object is to provide an improved high speed printing calculating machine in which the results obtained are automatically printed.

A further object of the present invention is to provide an improved calculating machine having means therein adapted to perform multiplication and division problems wherein the various factors each have a decimal amount therein, the present machine being so constructed that the resulting product or quotient has the decimal properly located therein. An additional object is to provide a printing calculating machine adapted to print decimal amounts in each of the factors entered by an operator through the sequential depression of numeral keys, including the depression of a decimal key at the proper time during the entry of amounts, and in which the machine not only automatically performs the necessary mathematical computations but also provides a printed result in which the decimal is properly located and printed.

These and other objects of the present invention will be more clearly understood from the following description when read with reference to the accompanying drawings wherein a preferred embodiment of the invention is illustrated and in which, FIG. 1 is an orthogonal view of the complete machine as seen from the front right corner;

FIG. 5 is a perspective view from the front left of the capacity control apparatus;

FIG. 6 is an illustration of two levers of FIG. 5;

FIG. 7 is a perspective view from the front right illustrating various parts which are operated in response to depression of an operation control key;

FIG. 8 is an enlargement of a small bail and associated apparatus shown also in FIG. 7;

FIG. 9 is a perspective view of the levers which are disposed intermediate the operation control keys and the function slides and which are controlled by the operation control keys;

FIG. 15 is a side elevation from the left side of the machine showing the main power apparatus for driving the machine;

FIG. 16 is a right side view of part of the add rack drive apparatus;

FIG. 17 is a partially exploded perspective view of the high-speed and low-speed clutch assembly used to couple the power drive with the product-dividend assembly;

FIG. 18 is a perspective view of part of the clutch control assembly of FIG. 17;

FIG. 19 is a front elevation of the clutch assembly of FIG. 17 together with sections of the add racks, product-dividend pinions, and associated frames with the upper half of the assembly shown in cross section;

FIG. 20 is a cross section of the product-dividend register together with a section of the multiplicand unit and associated add racks as seen from the right;

FIG. 21 is a perspective view from the upper right rear showing four orders of the product-dividend pinions approaching the tens transfer apparatus;

FIG. 22 is a perspective view from the upper right rear showing the manner in which the tens transfer apparatus in the product-dividend unit is operated;

FIG. 23 is an enlarged orthogonal view of a stationary camming block which forms part of the tens transfer apparatus of FIG. 22 as seen from the lower left rear:

FIG. 24 is the same part as shown in FIG. 23 but shown as seen from the lower right rear;

FIG. 27 is a right elevation of the apparatus used for clearing the multiplicand unit;

FIG. 28 is a perspective view from the upper right rear showing part of the multiplicand-divisor unit with the parts separated to more clearly illustrate the details of the apparatus;

FIG. 29 is a perspective view of a portion of the apparatus which guides the quotient counter and selectively couples the same to the pin carriage assembly;

FIG. 30 is a perspective view from the front right of the racks and associated control apparatus for entering amounts in the multiplicand-divisor pin carriage;

FIG. 31 is a perspective view from the upper right rear of the pin carriage clearing apparatus with the parts slightly spread to more clearly show their manner of operation;

FIG. 32 is a detail drawing of small parts which form part of the apparatus of FIG. 31;

FIG. 33 is a detailed drawing of small parts shown in FIG. 31;

FIG. 34 is a perspective view from the front left of part of the pin carriage and associated restoring mechanism;

FIG. 35 is an illustration of the quotient counter-pin carriage coupling device;

FIG. 38 is a left side view of one order of the multiplier-quotient unit, together with the pinion driving apparatus in its normal position;

FIG. 38A is a left side view of the parts of FIG. 38 but with the pinion driving apparatus in its pinion engaging position;

FIG. 39 is a perspective view from the left front of one order of the multiplier-quotient unit with the parts separated;

FIG. 39A is a perspective view from the right front of one order of the multiplier-quotient unit;

FIG. 41 is a left side view of the power drive for the multiplier quotient counting apparatus and of the apparatus used for moving the multiplier-quotient forwardly or rearwardly;

FIG. 43 is a left front perspective view of the high speed clutch control assembly responsive to the multiplier sensing apparatus;

FIG. 45 is a perspective view from the upper left front of the multiplicand-divisor pin sensing apparatus used for initiating the division routine;

FIG. 45A is a front view of a portion of the apparatus used for sensing tens transfers in the product-dividend register during the division operation and for controlling stepwise movement of the pin carriage;

FIG. 46 is a left front perspective view of the division terminating apparatus responsive to movement of the divisor unit into its home position for stopping the division routine;

FIG. 47 is a left front perspective view of the decimal division control assembly responsive to the sequential operation of the numerical keys and of the decimal key for properly locating the quotient counting apparatus with respect to the divisor assembly;

FIG. 48 is a right side view of the product-dividend locking assembly and of the apparatus used for selectively disconnecting the quotient counting assembly from the pin carriage;

As used hereinafter with reference to the drawings the terms right, left, top, bottom, front and rear together with all associated adjectives corresponding to such directional information shall be used with reference to a person viewing the machine from the front, top, or right-hand side thereof.

*General description*

Figure 1:
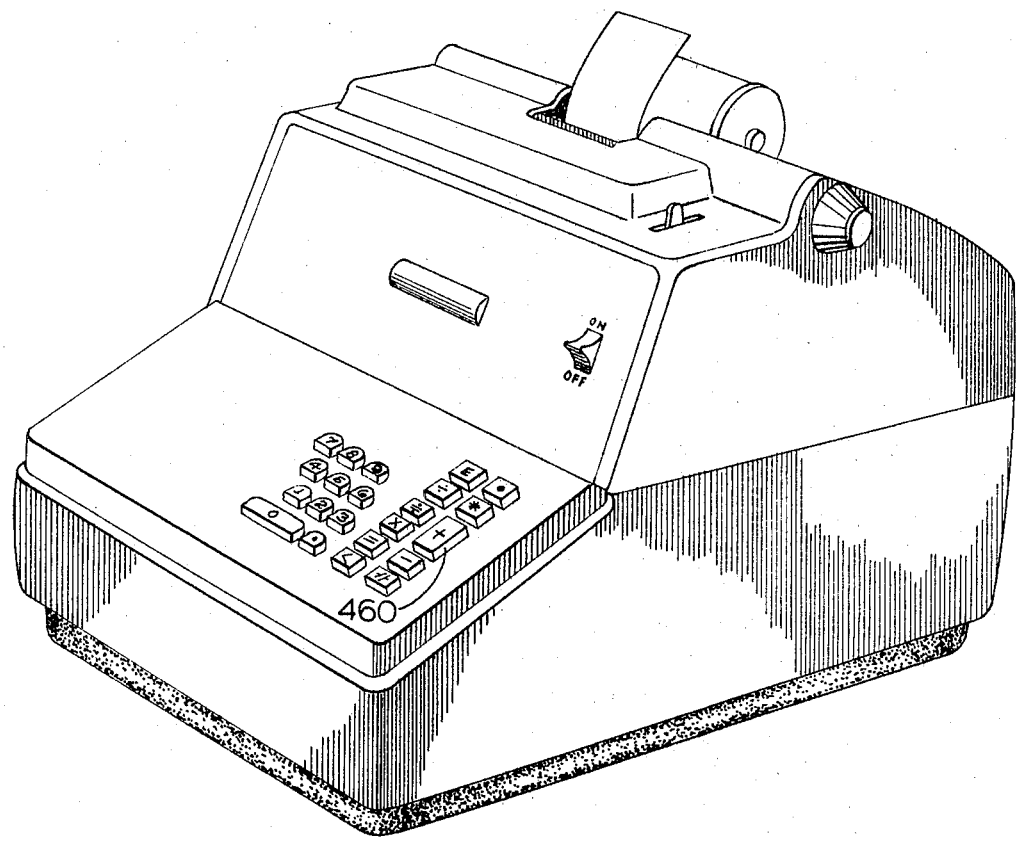
Figure 2:
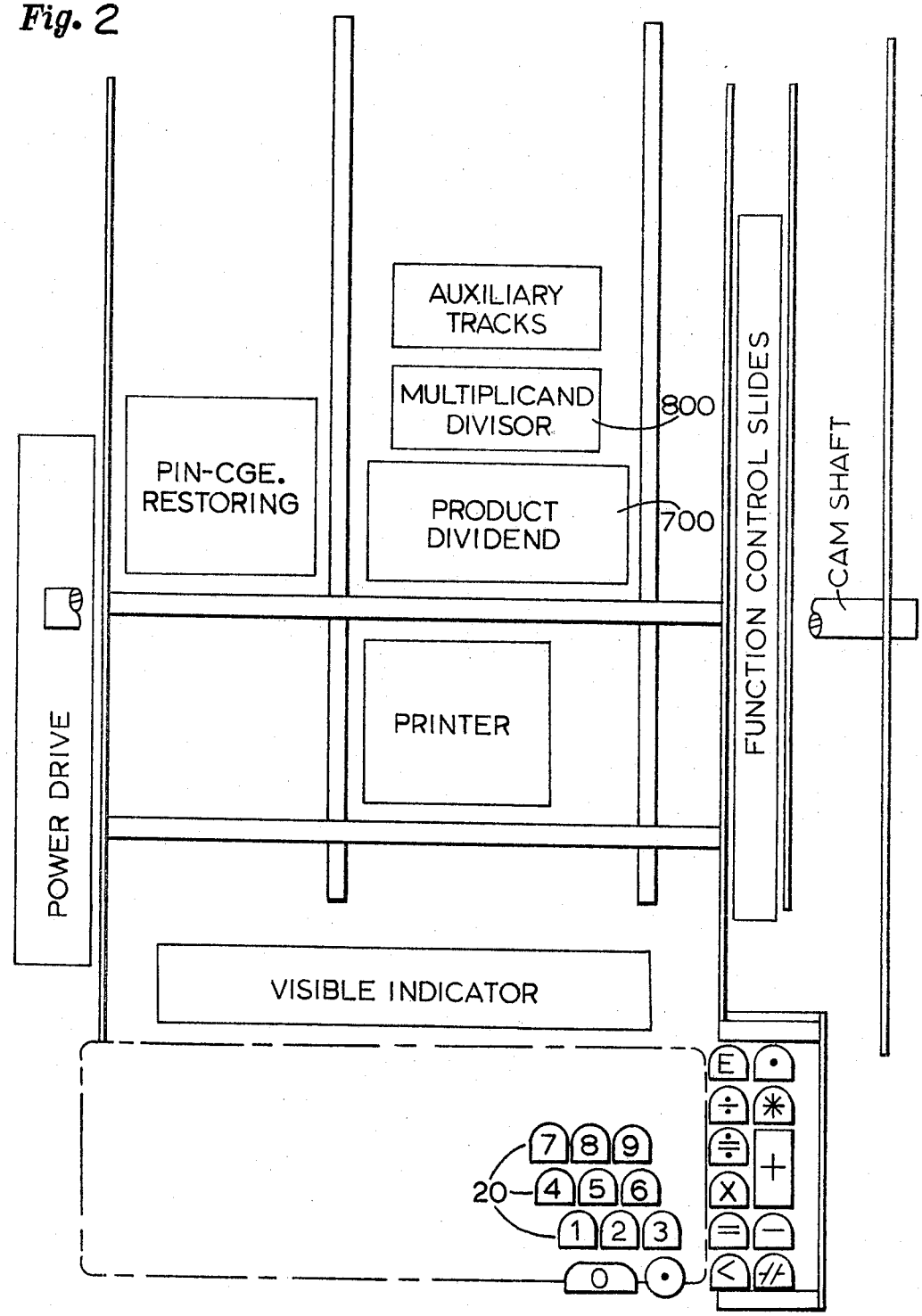
FIG. 2 is a general layout of the machine partially in block form showing the location of various segments of the machine.
Figure 3:
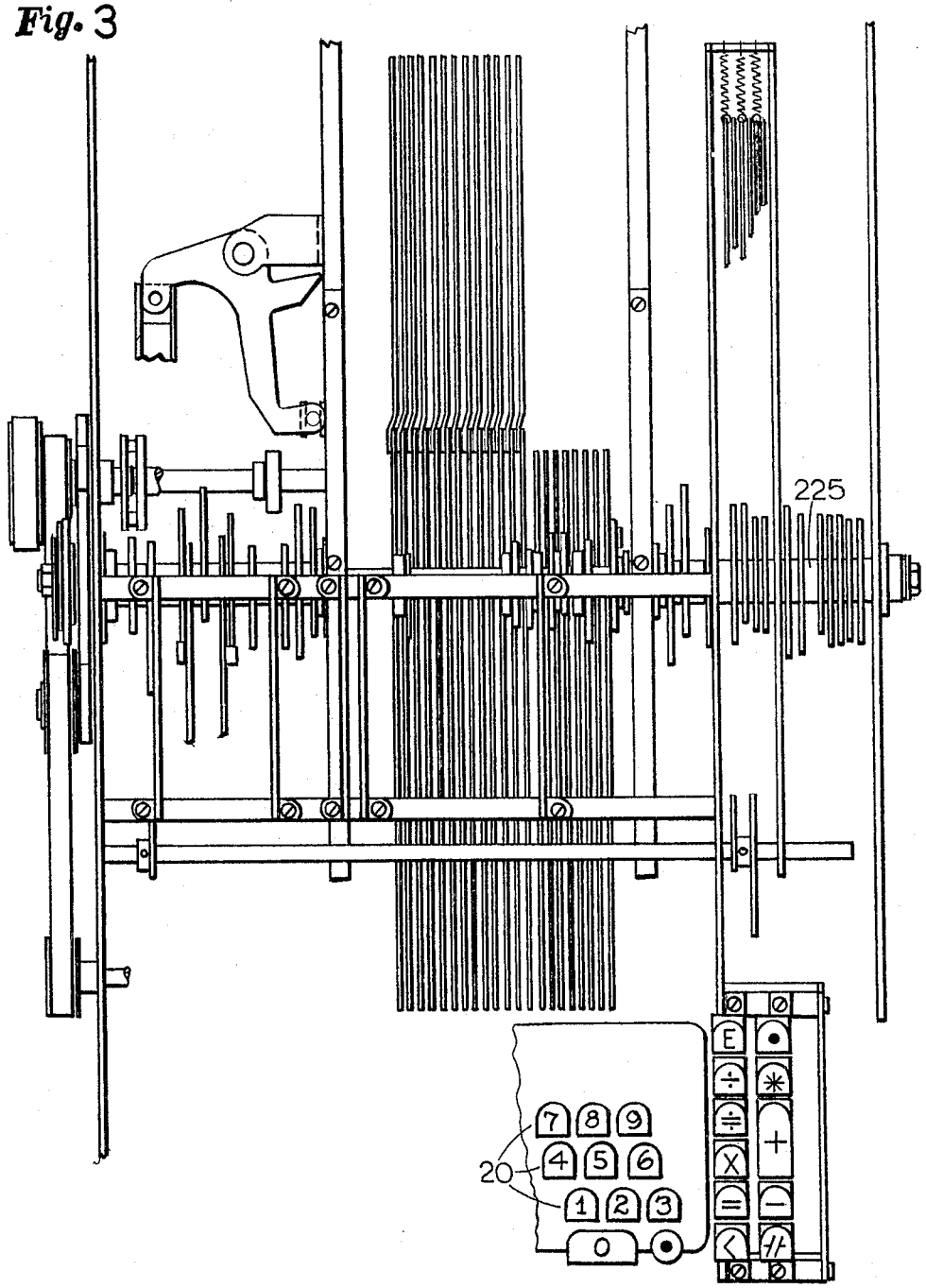
FIG. 3 is a view looking down on the lower portion of the machine with the upper portion removed to expose the add racks and main driveshaft.
Figure 4:
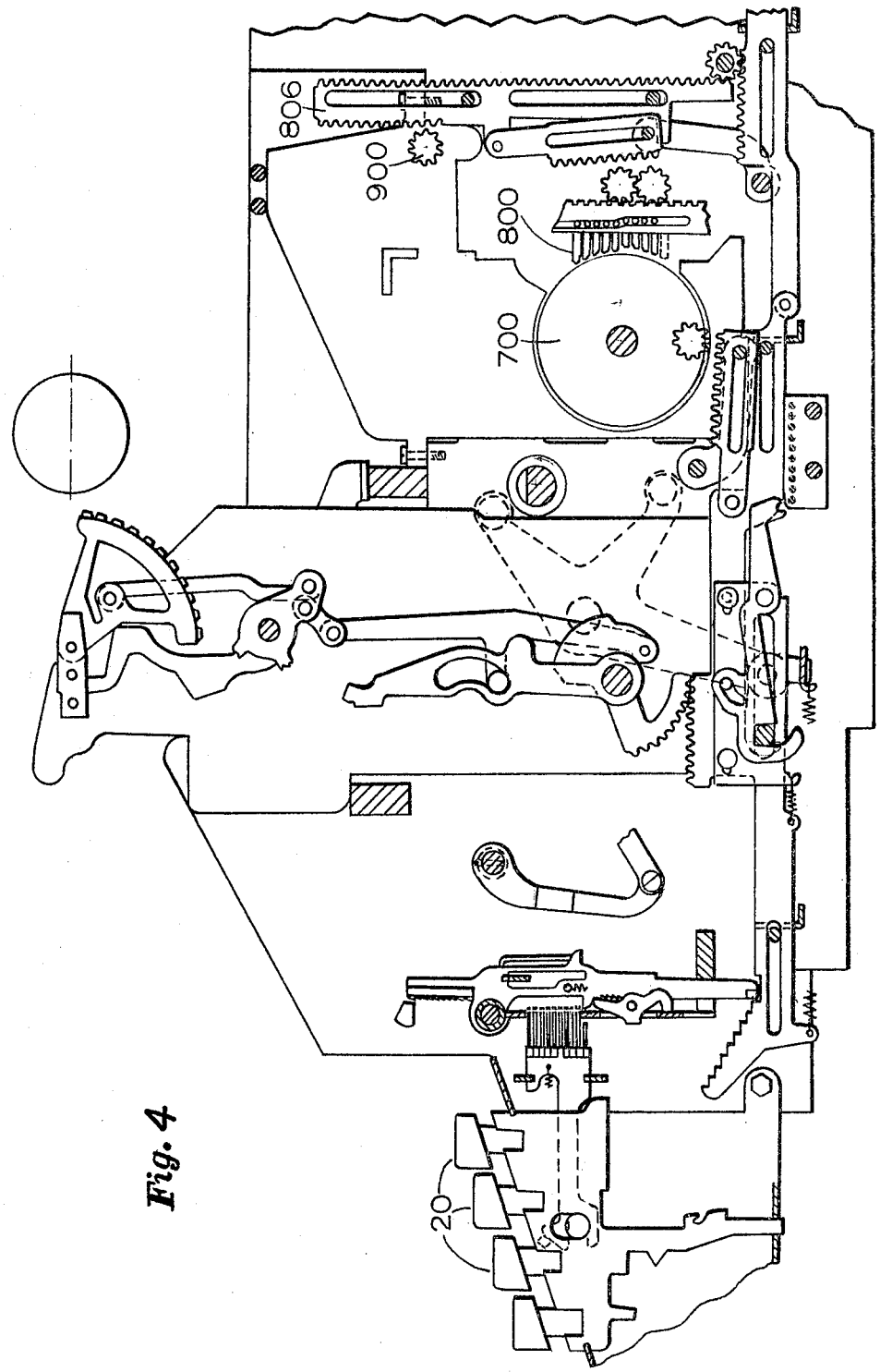
FIG. 4 is a right elevation of a cross section of the machine illustrating the location of the various units or segments of the machine.

As seen in FIG. 1 the machine is of the "ten key" type and hence is provided with ten individually operable numerical keys 20. The specific ten key mechanism utilized in the preferred embodiment of the present invention is the same as that disclosed in U.S. Patent 3,112,-873, assigned to the present assignee. The operation of the numerical keys serves to set elements which limit the rearward travel of the machine add racks. The add racks are selectively coupled with one of the three amount storage devices in the machine which are seen in the cross-section shown in FIG. 4 to include a rotating register or drum 700, a multiplicand-divisor storage unit 800 and a multiplier-quotient storage unit 900. The relative positions of these three units are illustrated schematically in the block diagram of FIG. 2. As seen in FIGS. 2 and 4 the register 700 includes a plurality of accumulating pinions carried by a drum supported by a central shaft and adapted for high-speed rotation. The multiplicand-divisor storage unit 800 is in the form of a pin carriage having a plurality of columns of individually movable pins disposed therein, the arrangement being such that when the add racks in the machine move rearwardly by differential amounts corresponding to the amount entered through the operation of the numerical keys a corresponding number of the individual pins in the carriage will be cammed forwardly by an amount sufficient to bring the front ends thereof into alignment with the pinions in the rotating register 700. The ends of the pins are so shaped and spaced with respect to each other and with respect to the pitch of the pinions that as the register 700 rotates about or on a central supporting shaft the pinions will be rotated on their supporting shaft by a number of steps equal to the number of pins cammed forwardly in each respective order. Thus it will be seen that as the product-dividend register is moved in a circular path the pinions therein will be advanced by a number of steps corresponding to the amount set in the multiplicand-divisor unit. During multiplication operations the number of times that the multiplicand is added to the product register is controlled by the pinions in the multiplier register. Since each of the respective storage devices is used for a given function during multiplication as well as during division, reference will be made hereinafter to such devices as the product, multiplicand, and multiplier storage units respectively, or as the dividend, divisor or quotient units. It should be understood that the rotating register serves the dual function of a product and a dividend register, the pin carriage as a multiplicand and divisor storage unit, and the register 900 as a multiplier and quotient storage unit.

An important feature of the machine, as will be described hereinafter, is that when an amount is set in the pin carriage 800 the true amount as well as the complement thereof will be simultaneously set in adjacent columns of pins in the carriage. For example, when a multiplicand number such as "234" is set in the pin carriage, said carriage will have a number of pins moved forward to represent the true amount of "234" and will also have interspersed between these pins a number of pins corresponding to the nines complement thereof or "765." It will be noted that in the units order in the pin carriage, the *tens complement* of the units order multiplicand digit is established rather than the nines complement. The reason for this will be more clearly understood in connection with the specific description of the pin carriage which is provided hereinafter.

The machine performs division operations in the following manner. The digits in the dividend are first entered into the machine by the sequential operation of the numerical keys, said amount being subsequently transferred to the rotatable dividend register by means of the add racks in response to the operation of a dividend key. The machine performs a single cycle of operation in response to the depression of the dividend key. Thereafter the operator sequentially depresses the numerical keys for the entry of the divisor and then operates the divisor motor bar. When the divisor motor bar is operated the machine is set to perform three complete cycles of operation. During the first of these cycles the amount is transferred from the keyboard to the pin carriage so that the divisor is set therein. During the first cycle of operation the pin carriage is moved to the left to a position where the highest non-zero order of the complemental pins is aligned with the highest order pinion in the rotatable dividend register. During this time a mechanism is effective to hold the second cycle of the machine in abeyance until the division operation has been completed. When the pin carriage reaches its leftmost position a high-speed drive apparatus is coupled with the rotatable register and serves to repeatedly rotate the dividend register through the divisor unit (pin carriage). It should be noted that at the time the high-speed drive is coupled with the rotatable register the complemental pins in the carriage are aligned with the rotatable register pinions. Therefore, as the register rotates the amount set in the divisor pin carriage will be repeatedly subtracted from the dividend register. As long as the amount in the dividend register remains greater than the amount in the divisor unit the rotation of the dividend register will continue with no displacement of the pin carriage. However, as soon as the amount in the dividend register is reduced to an amount which is less than that in the pin carriage, the pin carriage will be stepped to the right by an amount referred to as a "half step" to bring the positive pins therein into alignment with the dividend pinions, such movement taking place after the pinions have departed from the pins and during the time that the register is completing its rotation (this eliminates any need for stopping the rotation of the register during carriage movement). Thereafter the register rotates once while aligned with the positive pin. This serves to add the divisor to the dividend once to correct the over-subtraction which had previously occurred and caused the dividend to become less than the divisor. After such single cycle wherein the divisor is added to the dividend, the carriage is again stepped to the right by one-half step to bring the complemental pins into alignment with the dividend pinions. This procedure is continued until the pin carriage has been restored to its right-hand home position at which time the high-speed clutch is disengaged, the rotating register is brought to its rest position, and a second cycle of the machine which was previously held in abeyance is automatically initiated to cause the quotient to be printed. A third automatic cycle causes any remainder to be printed.

During the time that the dividend register is being rotated to cause repeated subtraction of the divisor from the dividend a driving pawl associated with the quotient register is operated in response to each rotation of the dividend register and serves to repeatedly advance a proper one of the quotient pinions. This driving pawl is translated to the right along with the pin carriage and therefore the number of revolutions of the dividend register which takes place in any given order will be counted in the quotient unit. Accordingly, upon the completion of the division operation (that is, when the driving pawl reaches its rightmost position of alignment with the units order quotient pinion) the quotient will stand in the quotient pinions and the remainder will be in the dividend pinions. The ensuing automatic cycle of operation will cause a total-taking operation to be performed, said total being derived from the quotient pinions and printed on a tape. The machine is so constructed that a third automatic cycle of operation is initiated, which cycle will be a total-taking cycle with the remainder being derived from the dividend pinions.

*Numerical input*

As previously mentioned the machine is provided with a ten key keyboard and utilizes the mechanism of U.S. Patent 3,112,873 for not only limiting the travel of the add racks but also to provide a visible indication of the amounts entered. This mechanism is fully described in U.S. Patent 3,112,873. The machine is adapted to not only print numerical amounts but also to print punctuation marks at the proper locations in such amounts. To this end a punctuation control mechanism is provided which is substantially identical to that disclosed in U.S. Patent 3,138,325, assigned to the present assignee.

*Numerical printing and punctuation control mechanism*

In addition to the mechanism necessary for the performance of multiplication and division problems, the calculating machine of the present invention is provided with a plurality of conventional accumulators. These accumulators are used in a number of ways, including conventional addition and subtraction operations. Since the machine may be used for the performance of calculating operations in which monetary amounts are involved, not only the usual numerical type fonts but also a safeguard symbol ($) which can be selectively rendered operable for printing adjacent to the highest order digit being printed are provided. The punctuation control mechanism is so constructed that the monetary punctuation will be automatically printed without the need for the operator to depress the decimal key. That is, if an operator wanted to print "$5.00" it would merely be necessary to depress 500. A manually operable lever is provided so that the automatic monetary punctuation apparatus can be selectively rendered inoperable when the machine is being used to perform straight numerical (non-monetary) computations. The punctuation apparatus is fully described in U.S. Patent 3,138,325.

It will be seen that the required punctuation marks are properly printed in each of the factors including the multiplicand, multiplier, dividend and divisor as well as in the resulting product and quotient. The punctuation locating mechanism further serves to control the positioning of various other parts in the calculating sections of the machine in the manner described hereinafter. The manner in which the operation control keys serve to control not only the various parts in the punctuation mechanism but also the various other parts in the machine will now be described.

*Operation control keys*

As seen in FIG. 1 the machine keyboard includes not only the ten numerical keys together with the decimal key, but also a plurality of operation control keys disposed in two parallel columns to the right thereof. The rightmost column of keys is used to control the performance of the usual add, subtract, total, and subtotal operations in the machine in conjunction with the accumulators provided near the rear of the machine. Since the performance of these operations with the accumulators can be controlled in a number of ways, which form no part of the present invention, further details thereof are not included herein. A detailed description of the operation of each of the left-hand columns of operation control keys, which is seen to include an error key 507, a dividend key 502, a divisor key 506, a multiplicand key 503, a multiplier key 504, and a transfer key 505, will now be provided with reference to FIG. 7.

Referring to FIG. 7 it will be seen that each of the operation control keys 502–507 has an associated rightwardly extending rectangular lug 502A–507A which is adaptable to an associated rectangular slot cut in a cycle initiating slide 501 supported by stud and slot connections on the right side of a stationary plate 508. The arrangement is such that when any one of the control keys is depressed the slide 501 will be cammed rearwardly to initiate operation of the main driveshaft of the machine and also to properly position the necessary control elements to cause the performance of the desired operations. As more clearly seen in the enlarged view of the rear end of the slide 501 shown in FIG. 8, the slide 501 is coupled with the leftwardly extending stud 509 pinned to the left arm of a bail or lever 510. The lever 510 is secured to a horizontal shaft 511 supported for rotation by the stationary frames 508 and 515. The center section of the shaft 511 is enlarged and is cut away to form a "half-shaft" as seen in FIG. 7. Since the machine is provided with two rows of operation control keys (see FIG. 1) a second cycle initiating slide 512 is supported by stud and slot connections on the right side of the frame 515 and is coupled with a second rightwardly extending stud 513 carried by the right downwardly extending arm of the bellcrank lever 510.

As seen in FIGS. 7, 8 and 9, a small lever 514 is secured to the left side of the lever 510 and has a rightwardly extending stud 514A near its rear end which is disposed within a semicircular opening in the front end of a lever 516 pinned to a rotatable cycle control shaft 517 which extends across the machine and as seen in FIG. 15 is connected at its left end to the downwardly extending lever 684. The manner in which the movement of the shaft 517 serves to control the application of power to the main driveshaft will be described hereinafter with reference to FIG. 15.

As will be seen in FIGS. 7 and 9, a second lever 518 is pinned to the shaft 517 and has a heavy spring 519 connected to a stud on the right side thereof. The front end of the spring 519 is connected to the stud 520 extending rightwardly from the stationary frame 521 and hence said spring 519 provides a constant counterclockwise urge on the shaft 517. The lower front end of the lever 516 rests on the top of the split shaft 511 carried by the bellcrank lever 510 and hence the shaft 517 is held in its most clockwise position as long as no operation control key has been depressed. It will be seen however that if one of the keys is depressed the slide 501 will move rearwardly and hence the split shaft 511 will be rocked in a counterclockwise direction to a position where it no longer serves to hold the lever 516. Accordingly, when a key is depressed the spring 519 is effective to rock the shaft 517 counterclockwise to initiate a machine cycle. It will be seen that the upper front surface of the lever 516 is arcuate and is so positioned with respect to the stud 514A that as the lever 516 moves counterclockwise said arcuate surface will be engaged with the stud 514A and hence will serve to hold the slide 501 in its rearward position as long as the shaft 517 is in its counterclockwise position. As is common in the art, the shape of the upper surface of the slide 501 is such that as long as the slide is held rearwardly the operated key will be held depressed and each of the other keys will be locked against depression.

There are six independent slides 522, 523, 524, 525, 526 and 527 disposed beneath the operation control keys 502–507, said slides being supported for independent forward and rearward movement by means of a pair of studs 528 and 529 extending to the right from the frame 508. Each of the slides 522–527 has a single upwardly extending lug having a chamfered surface thereon which is adaptable to a respective one of the rightwardly extending studs 502B–507B associated with the keystems of the respective operation keys 502–507. There are six levers 532–537 respectively pinned to the upper rear end of an associated one of the slides 522–527, the arrangement being such that when a given one of the control keys is depressed an associated one of the levers 532–537 will be moved rearwardly. Each of the levers 532–537 is supported at its rear end by the front lateral portion of an associated one of the six levers 542–547 supported for rotation by means of sleeves on a stationary shaft 540. Individual springs 550 urge each of the levers 542–547 in a clockwise direction about the shaft 540. It will be seen that each of the levers 532–537 is provided with a pair of forwardly extending arms at its front end which are disposed on either side of the stud 529. The arrangement is such that as long as a slide 522–527 is in its forward position the associated lever 532–537 will be in contact with the stud 529 and hence will have no tendency to affect the position of the associated one of the levers 542–547.

Figure 10:
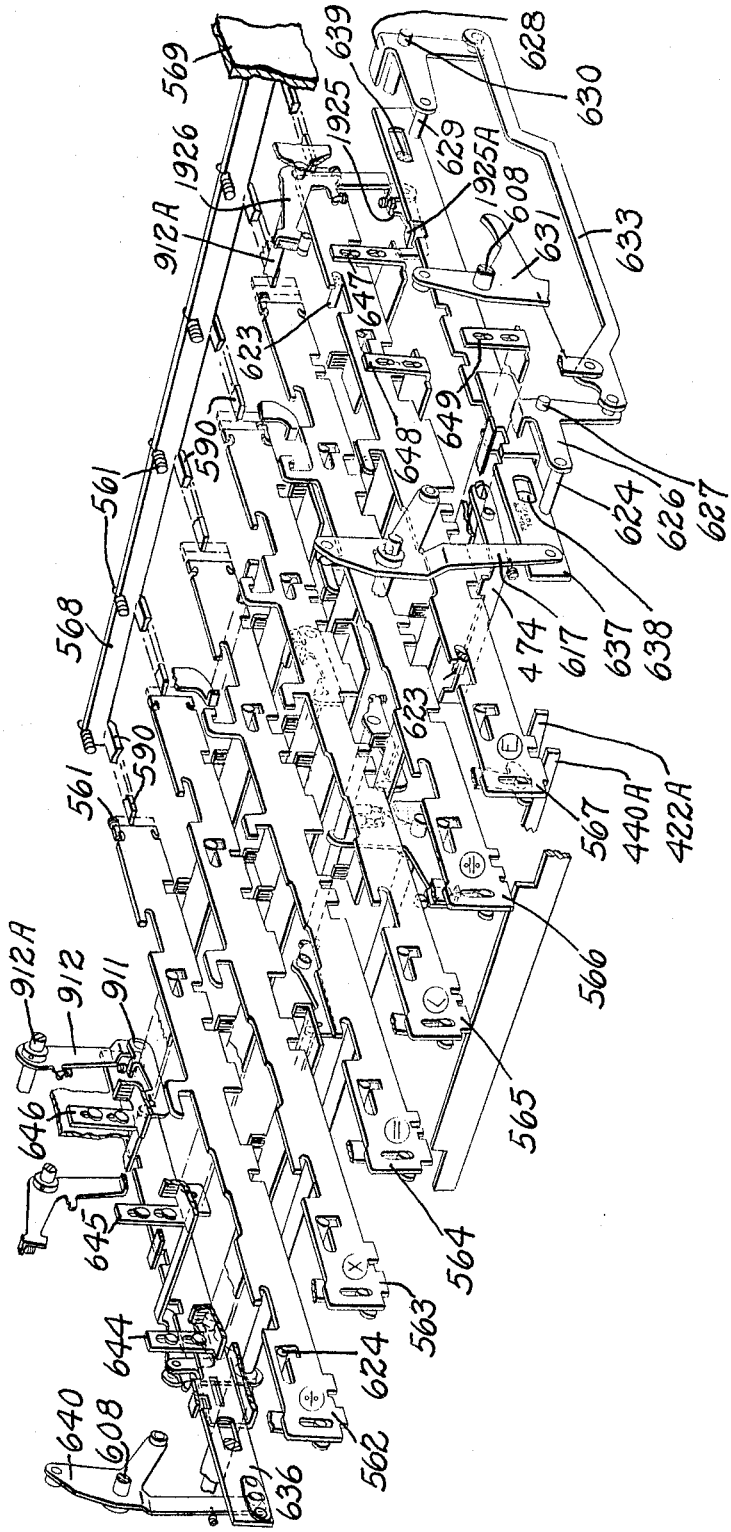
FIG. 10 is a perspective view from the upper right showing the various function control slides and a part of the associated apparatus.

As seen in FIGS. 7, 9 and 10, the operation control mechanism includes six function control slides 562–567, the specific functions controlled by each being described hereinafter. Individual springs 561 (FIG. 10) secured to the rear ends of the slides 562–567 and to a stationary bracket 568 extending to the left from the stationary frame 569 serve to constantly urge the slides 562–567 rearwardly. As seen most clearly in FIGS. 7 and 9 the front ends of the slides 562–567 are each provided with a vertical slot through which a rightwardly extending stud similar to the stud 577A extends, said studs being carried at the lower end of an associated lever 572–577 pivoted on a stationary shaft 570. Each of the levers 572–577 has a small detent plate 578 riveted thereto, each of said plates 578 being provided with teeth on the rear vertical surface thereof which are adaptable to one of the downwardly and forwardly extending latching noses similar to the nose 546A shown on lever 546 in FIG. 9. The arrangement of the parts is such that when the levers 542–547 are in their most clockwise (normal) positions as illustrated in FIG. 7 the associated latching nose will be engaged with the top ones of the teeth on the plates 578 and hence each of the six function slides 562–567 is normally held in its most forward position against the rearward urge thereon provided by the springs 561.

The lever 516 pinned to the cycle initiating shaft 517 (FIG. 7) has a small pawl 571 pinned on the right side thereof, said pawl 571 being constantly urged in a counterclockwise direction by means of the spring 579 connected to the pawl and to a stud extending to the right from the lever 516. The lower end of the pawl 571 is engaged with a vertical lug 580 provided on a small bail 581 pivoted on the shaft 517. The lower surface of the bail 581 is normally aligned with a rectangular opening provided in each of the levers 532–537, the arrangement being such that if the bail 581 is moved counterclockwise against the urge of the light spring 582 connected to the left end thereof, said bail will have no effect on those levers 532–537 which are in their forward home positions. The pawl 571 is provided with a horizontal drive surface which is aligned with the lug 580 on the bail 581 and therefore when the cycle initiating shaft 517 is moved counterclockwise by the heavy spring 519 the pawl 571 will serve to drive the bail 581 counterclockwise down into the rectangular openings of the levers 532–537. As previously described, the shaft 517 is released for counterclockwise movement in response to the operation of one of the control keys. This timing of the movement of the shaft 517 is such that one of the levers 532–537 connected to the operated one of the slides 522–537 will be in its rearward position prior to the time that the shaft 517 is released. Accordingly, when the bail 581 is driven counterclockwise in response to the counterclockwise movement of the shaft 517 one of the levers 532–537 will have its rectangular opening disposed to the rear of the lower surface of the bail 581 and hence that lever will be driven in a clockwise direction. Such clockwise movement of one of the levers 532–537 will in turn cause the associated one of the levers 542–547 to be driven counterclockwise about the shaft 540 against the light clockwise urge provided thereon by one of the springs 550. It will be seen that as soon as a given one of the levers 542–547 is driven counterclockwise an associated one of the slides 562–567 will be free to move rearwardly under the urge of one of the springs 561 (FIG. 10). This will be more clearly seen in FIG. 20 wherein the parts are shown in their positions after the divisor key 506 has been depressed and the slide 526 has been cammed rearward.

From the above it will be seen that when one of the control keys 502–507 is depressed the shaft 517 will be rocked counterclockwise by the heavy spring 519 and one of the function control slides 562–567 will move to its rearward position under the urge of one of the springs 561. Since the main portion of the energy provided by the operator merely serves to rock the split shaft 511 counterclockwise, it will be seen that a light key depression mechanism is provided. It should be noted that since the machine has two rows of operation control keys means is provided to prevent the depression of any second key once any of the keys has been depressed. To this end a pair of slotted slides 584 and 585 (FIG. 7) are provided near the lower ends of the keystems. The slots in the slides are normally aligned with the rightwardly extending lugs on the bottom of the keystems until one of the keys is depressed. A small lever 586 having a portion 586A which extends across the lower rear ends of each of the slides 522–527 is pinned to and adapted to control the slide 585 disposed beneath the right-hand row of operation control keys. The arrangement is such that when one of the slides 522–527 is moved rearwardly by the depression of one of the keys 502–507 the lever 586 will be rocked clockwise and hence the slide 585 disposed beneath the right-hand column of keys will be pulled rearwardly to a position where it will serve to prevent downward movement of any key in the right-hand column. In a similar manner another lever substantially identical to the lever 586 is provided for controlling the slide 584 disposed beneath the left-hand column of keys so that when one of the keys in the right-hand column is depressed the slide 584 will be moved rearwardly and hence prevent the depression of any of the keys 502–507.

As will be described hereinafter, the machine is adapted not only to perform multiplication and division problems but is adapted to automatically cause the results of such computations to be automatically printed. Thus it will be seen that in order to automatically print such results it is necessary that some of the control keys be operable to cause a plurality of machine cycles. For example, when a single key 504 is depressed for the entry of the multiplier digits in a multiplication operation, such depression of the key 504 must also serve to cause the printing of the product after the multiplication has been performed. Therefore, means is provided for causing a selected number of machine cycles to take place in response to the operation of the keys 502–507. The various functions which are performed by the machine during each of such plurality of cycles of operation is different and hence the position of the active one of the function control slides 562–567 must be altered in order for a single one of the slides to be able to cause different functions during different cycles of operation. This is described more clearly hereinafter in connection with the specific functions controlled by each of the function slides 562–567. The mechanism will now be described for controlling the selective positioning of the slides 562–567 together with the mechanism for causing a selected number of machine cycles to take place in response to the operation of the control keys.

It will be seen in FIG. 10 that a stationary stop member 590 is provided in alignment with the rear surface of each of the slides 562–567. The distance between the stop members 590 and the rear vertical surfaces of the slides 562–567 differs from slide to slide. During each cycle of operation of the main machine driveshaft a mechanism is operable to advance the active one of the slides 562–567 in step-wise fashion forwardly to its home position. The length of each one of such steps of movement is uniform and therefore to illustrate the number of steps which each of the various slides 562–567 must undergo to be returned from a stop 590 to its home position, there is shown in FIG. 10 a series of dashed line positions to the rear of each slide indicating the positions which may be assumed by each slide. Thus it will be seen in FIG. 10 that the slide 562 controlled by the dividend key moves rearwardly by a single step when key 502 is depressed, slide 563 controlled by the multiplicand key 503 moves rearwardly by a single step, slide 564 controlled by the multiplier key 504 moves rearwardly by two steps, slide 565 controlled by the transfer key 505 moves rearwardly by two steps, the slide 566 controlled by the divisor key 506 moves rearwardly by three steps, and the the slide 567 controlled by the error key 507 moves rearwardly by one step. As previously described, each of said slides 562–567 moves rearwardly under the urge of an associated spring 561 when a control key 502–507 is depressed.

As seen in FIGS. 7 and 9 each of the levers 572–577 coupled with the front ends of the slides 562–567 has an upwardly extending lug 591. The lugs 591 are normally positioned to the rear of and below a short shaft 592 extending between the two arms of a bail 593 pivoted on the shaft 540. The left arm of the bail 593 carries a rightwardly extending stud 594 which is disposed beneath the forwardly extending lug provided on the small coupling slide 596 which straddles the cycle initiating shaft 517. A spring 597 connected to the shaft 517 and to a stud 596A extending to the right from the slide 596 through a vertical slot in the lever 518 serves to constantly urge the slide 596 downwardly and hence to hold the bail 593 in a counterclockwise position.

The slide 596 has a leftwardly extending lug 596B which when the slide is in its lowermost (normal) position is aligned with a vertical driving surface on a restoring slide 598. The front end of the slide 598 has an elongated slot therein which receives the shaft 517 to thereby support the front end of the slide 598 for forward and rearward movement. As seen in FIG. 49B the rear end of the slide 598 is pinned to the upper end of a lever 599 pivoted on the left side of the frame 521. A small spring serves to constantly urge the lever 599 in a counterclockwise direction to thereby maintain the roller carried by the rear arm of the lever in engagement with a cam 600 on the main driveshaft 225. The shape of the cam 600 is such that the slide 598 is normally in its forward position and then near the end of each cycle of operation of the main driveshaft 225 the cam serves to drive the slide rearwardly. The arrangement is such that as long as the lug 596B (FIG. 7) is aligned with the vertical driving surface on the slide 598 the rearward movement of the slide 598 will serve to drive the slide 596, the lever 518, and hence the shaft 517 in a clockwise direction. It will be seen in FIG. 7 that each of the keys 502–507 is spring urged upwardly by an individual restoring spring 601 and therefore as soon as the shaft 517 is restored to its clockwise position by the slide 598 a spring 601 will serve to restore the depressed key. A spring 602 (FIG. 7) connected to a stud extending to the right from the slide 501 constantly urges slide 501 forwardly and hence when the shaft 517 is restored to its clockwise position the slide 501 will be moved forwardly to its home position. As a result thereof the split shaft 511 will return to its clockwise position where it is again effective to hold the shaft 517 in its clockwise position. Thus it will be seen that the slide 598 is normally effective during the late portion of each cycle of operation of the main driveshaft 225 to restore the shaft 517 to its clockwise latched position.

The position of the lugs 591 on the levers 572–577 with respect to the small shaft 592 is such that if a slide 562–567 connected to the associated lever 572–577 moves rearwardly by a single step the associated lug 591 will not come into engagement with the shaft 592. Therefore when a slide 562–567 moves rearwardly by a single step the slide 596 will not be affected and hence the slide 598 will restore the shaft 517 to its home position after the machine driveshaft 225 has performed a single cycle of operation.

When a function control slide 562–567 is displaced rearwardly by more than one step the lug 591 on the associated lever 572–577 will be moved forwardly and upwardly in an arcuate path by an amount sufficient to engage and elevate the shaft 592. This holds the bail 593 in a clockwise position wherein it is effective to hold the slide 596 in an elevated position. With the slide 596 thusly held in an elevated position the lug 596B thereon will be positioned above the driving surface on the slide 598. Accordingly, as long as the active one of the slides 562–567 is displaced more than one step to the rear of its home position the slide 598 will not be effective to restore the shaft 517 and hence a plurality of cycles of operation of the machine will take place.

As described below, the active slide 562–567 is stepped forwardly by one step near the end of each cycle of the shaft 225 and therefore when such a slide is returned to a position which is only one step to the rear of its home position the coupling slide 596 will be returned to its lowered position. Therefore the cycle initiating shaft 517 will be reset on the next cycle.

Each of the levers 572–577 is provided with a set of teeth or driving surfaces on its rear surface. These teeth are adaptable to the lower edge of a restoring pawl 604 pivoted on a stud 606 carried by a bail 607 which is in turn supported for rotation by a shaft 608. A spring 609 connected to the upper end of the restoring pawl 604 serves to urge said pawl in a clockwise direction on the stud 606 to a position such that the upper arm of the pawl engages a stationary shaft 605. In this position the lower edge of the pawl is slightly to the rear of the teeth on levers 572–577. A lever 611 supported for independent rotation on the shaft 608 has its front end slotted and disposed about the stud 606 on which the pawl 604 is supported. A coupling pawl 610 is pivoted on the upper front end of the lever 611 and has a leftwardly extending stud 610A which passes through a rectangular opening provided in the lever 611. A spring 614 connected to the front end of the coupling pawl 610 serves to constantly urge pawl 610 in a clockwise direction on the lever 611 and also to hold lever 607 and pawl 604 clockwise on shaft 608. As seen in FIG. 49B a cam 612 on the main driveshaft 225 has a leftwardly extending stud 613 (FIG. 7) which when the machine is in its home condition—that is, with all of the parts in their normal positions prior to the initiation of a cycle of operation—is in a position such that the spring 614 urges the coupling pawl 610 into contact therewith.

The operation of the function slide restoring mechanism is as follows. As soon as the main driveshaft 225 starts to rotate the stud 613 moves away from the coupling pawl 610 and hence the pawl 610 moves in a clockwise direction to a position where its stud 610A is in the bottom portion of the rectangular opening in the lever 611. Near the end of the cycle of operation of the main driveshaft (after the restoring slide 598 has already started its rearward movement) the stud 613 engages the arcuate surface on the pawl 610 and serves to drive the lever 611 in a counterclockwise direction, said lever in turn by means of its coupling with the stud 606 serving to drive the restoring pawl 604 in a downward direction. It should be noted that as the pawl 604 is being driven downwardly the spring 609 connected to the upper end thereof will serve to cause a slight clockwise movement of the pawl on the stud 606 so that the lower driving surface of the pawl "dives into" or becomes adaptable to one of the teeth on the rear surface of the active one of the levers 572–577. Thereafter the pawl moves downwardly by an amount sufficient to drive the active one of the levers 572–577 one step in a clockwise direction with the associated one of the levers 542–547 acting as a bypass latching pawl. The stud 613 then moves to a position where its driving force on the coupling pawl 610 is no longer operative and hence the springs 609 and 614 are effective to pull the driving pawl 604 as well as the lever 611 back to their initial clockwise positions of FIG. 7. When the parts have been returned to the positions shown in FIG. 7 it will be seen that the coupling pawl 610 is again positioned in engagement with the stud 613 and with the leftwardly extending stud 610A thereon positioned in the upper portion of the rectangular opening in the lever 611.

The reason for the yielding connection between the coupling pawl 610 and the lever 611 is to permit the restoring operation of the pawl 604 to take place at the extreme end of the cycle of operation of the main driveshaft. It should be noted that the length of the driving stroke of the restoring pawl 604 is such that one of the slides 562–567 will be advanced forwardly by one step near the end of each cycle of operation of the main driveshaft 225. It should also be noted that the rear surface of each of the levers 572–577 has three teeth thereon so that if a function control slide 562–567 has been moved rearwardly by three steps (as for example is the case when the slide 566 is released by the operation of the key 506) the driving pawl 604 will still be effective to engage one of the teeth for the restoring operation. The timing is such that the driving surface of the cycle control shaft restoring slide 598 will have moved beneath the lug 596B on slide 596 prior to the stepwise movement of a lever 572–577 by the pawl 604. Therefore, in those cases where two cycles of operation are to take place the lug 596B will not be lowered into the path of the driving surface on the slide 598 in time for restoring of the shaft 517 on the first cycle of the main driveshaft. When the second cycle takes place the lug 596B will be aligned with the driving surface of the slide 598 and hence the shaft 517 will be at rest near the end of the second cycle.

In connection with the restoring of the levers 572–577 (and hence of the associated slides 562–567) by the driving pawl 604 it was stated that the levers 542–547 and the associated latching noses 542A–547A act as bypass pawls with respect to the plates 548 and hence it will be seen that the levers 542–547 must be released for movement to their clockwise home positions prior to the start of the operation of the restoring pawl 604. Therefore, a link 616 (FIGS. 7 and 9) is provided with an elongated slot in its front end which receives a rightwardly extending stud 571A provided on the upper end of the pawl 571 carried by lever 516. The rear end of the link 616 is pinned to the upwardly extending arm of the three-armed lever 617 supported for rotation by shaft 608. The lever 617 has a first leftwardly extending stud near its upper end which supports a roller 617A and a second stud on its lower arm which supports a second roller 617B. Rollers 617A and 617B, as described hereinafter, are respectively engaged with cams 612 and 646. As seen in FIG. 49B the shapes of cams 612 and 646 are such that relatively early in the machine cycle the lever 617 moves clockwise and hence the link 616 is pulled rearwardly early in the machine cycle. Such rearward movement of the link 616 rocks the pawl 571 clockwise and hence releases the small bail 581 (FIG. 9) which was driven counterclockwise when the shaft 517 was released. The bail 581 therefore returns to its clockwise home position under the urge of the spring 582 and hence releases the active one of the levers 542–547 for return to its home position under the urge of one of the springs 550. Accordingly, the levers 542–547 are released from the control of bail 581 early in the machine cycle so that they are effective to relatch the active one of the levers 572–577 when restored by the driving pawl 604.

From the above it will be seen that when one of the keys 502–507 is depressed one of the function control slides 562–567 will be moved to its rearmost position of engagement with a stationary abutment piece 590 (FIG. 10). It wil also be seen that when one of the keys is depressed the cycle initiating shaft 517 will be rocked counterclockwise by the heavy spring 519 and, as described hereinafter, such movement of the shaft 517 will cause the machine driveshaft to be driven by an electric motor through a cycle of operation. Certain ones of the keys must serve to cause multiple machine cycles and therefore, as described above, the connection between the restoring slide 598 and the shaft 517 includes the coupling slide 596 which is selectively elevated in response to the counterclockwise movement of one of the levers 572–577 by more than one step. It should be noted that if one of the levers 572–577 is more than one step away from its home (clockwise) position the vertical lug 591 on the upper portion thereof will serve to hold the coupling slide 596 in an elevated position. Therefore since the restoring slide 598 is not effective under those conditions to restore the cycle initiating shaft 517 to its clockwise position a plurality of cycles of operation of the main driveshaft will take place. From the above it will also be seen that in response to each cycle of operation of the main driveshaft 225, means is effective to move the active one of the slides 562–567 forwardly by one step toward its home position.

Referring now to FIG. 10 the manner in which the function slides 562–567 are power driven to control the various parts in the machine for the performance of a selected function will be described. As seen in FIG. 10, each of the function slides 562–567 is supported at its front end by means of a stud 624 extending to the left from a forwardly extending arm of a bail 626 supported for rotation on a stationary shaft 627. Each of the slides 562–567 will be seen to have a right angled (or L-shaped) slot in its front portion through which the stud 624 passes. In a similar manner a second leftwardly extending stud 629 carried by a second small bail 628 supported on a second stationary shaft 630 passes through the L-shaped slots provided near the rear ends of the slides. In addition, it will be seen that each of the slides 562–567 has two slotted openings in its upper surface through which a pair of stationary studs 623 pass for supporting the slides 562–567 as long as the slides are in their forward home positions. The position of the slides 562–567 when in their forward home positions is such that the vertical portions of the respective slots therein are aligned with the stud 624 and 629 so that downward movement of said studs normally has no effect on the slides. A lever 631 supported for rotation by the right end of the shaft 608 carries a roller on the upper extremity thereof which is engaged with a cam 632 (FIG. 49B) on the main driveshaft 225. The cam 632 carries a rightwardly extending stud 632A which engages the rearwardly extending arcuate portion of the lever 631 in a manner such that the lever 631 is positively positioned when the driveshaft 225 is in its home position. The downwardly extending arm of the lever 631 (FIG. 10) is pinned to the upper front end of a connecting link 633 which is coupled with the downwardly extending arms of the bails 626 and 628. The arrangement is such that when the shaft 225 is driven counterclockwise the cam 632 thereon will serve to rock the lever 631 counterclockwise and hence the bails 626 and 628 will be positively driven in counterclockwise directions. As a result thereof the studs 624 and 629 will be positively driven downwardly and hence any slide 562–567 which has been moved rearwardly from its home position will be driven downwardly. It should be noted that while each of the slides 562–567 is allowed to undergo a variable amount of rearward movement prior to the time that the rear end thereof engages a stop member 590, the position of the L-shaped slots therein is such that as soon as any slide is moved rearwardly by one step it will be driven downwardly in response to the counterclockwise rotation of the main driveshaft 225. This downward movement of a selected slide is either used directly to move selected parts or serves to couple selected parts with one or the other of two power driven slides.

As seen in FIG. 10 the two power driven slides, referred to hereinafter as the power add slide 636 and the power total slide 637, are supported for forward and rearward movement on a pair of stationary shafts 638 and 639 (supported by frames 508 and 569) which pass through elongated horizontal slots in the power slides. A lever 640 supported by shaft 608 is positioned on the left side of the power add slide 636 and is coupled therewith by means of a stud and slot connection so that when the lever 640 is driven clockwise and counterclockwise the slide 636 will be driven forwardly and rearwardly. As seen in FIG. 49B the lever 640 carries a leftwardly extending roller 640A which is engaged with a cam 641 while a rightwardly extending roller 640B is engaged with a cam 642. The cams 641 and 642 are complemental cams and are so shaped that during each cycle of operation of the main driveshaft 225 the lever 640 will be driven in a clockwise direction during an early portion of the second half cycle of the main driveshaft and will be driven counterclockwise back to its home position prior to the end of the machine cycle. Therefore, the power add slide 636 will be driven forwardly during the first part of the second half of a machine cycle and will be driven rearwardly near the end of each machine cycle.

In a similar manner the lever 617 (see also in FIG. 7) is supported by the shaft 608 and is coupled by means of a stud and slot connection with the front end of the power total slide 637. As seen in FIG. 49B the lever 617 carries a leftwardly extending roller 617A which is engaged with the cam 612 and also a rightwardly extending roller 617B which is engaged with a cam 643. The cams 612 and 643 are complemental cams and are so shaped that when the main driveshaft is driven through a cycle of operation the lever 617 will be first driven in a clockwise direction and then returned in a counterclockwise direction to its home position. It will be seen in FIG. 49B that the timing of the operation of the lever 617 is such that said lever is rocked clockwise during the early portion of the first half cycle of the main driveshaft and is then driven counterclockwise to its home position near the end of the first half of the cycle of shaft 225. Accordingly, the power total slide 637 will be driven forwardly during the early portion of the first half of a machine cycle and will then be driven rearwardly to its home (FIG. 10) position near the end of the first half of each machine cycle.

Figure 13:
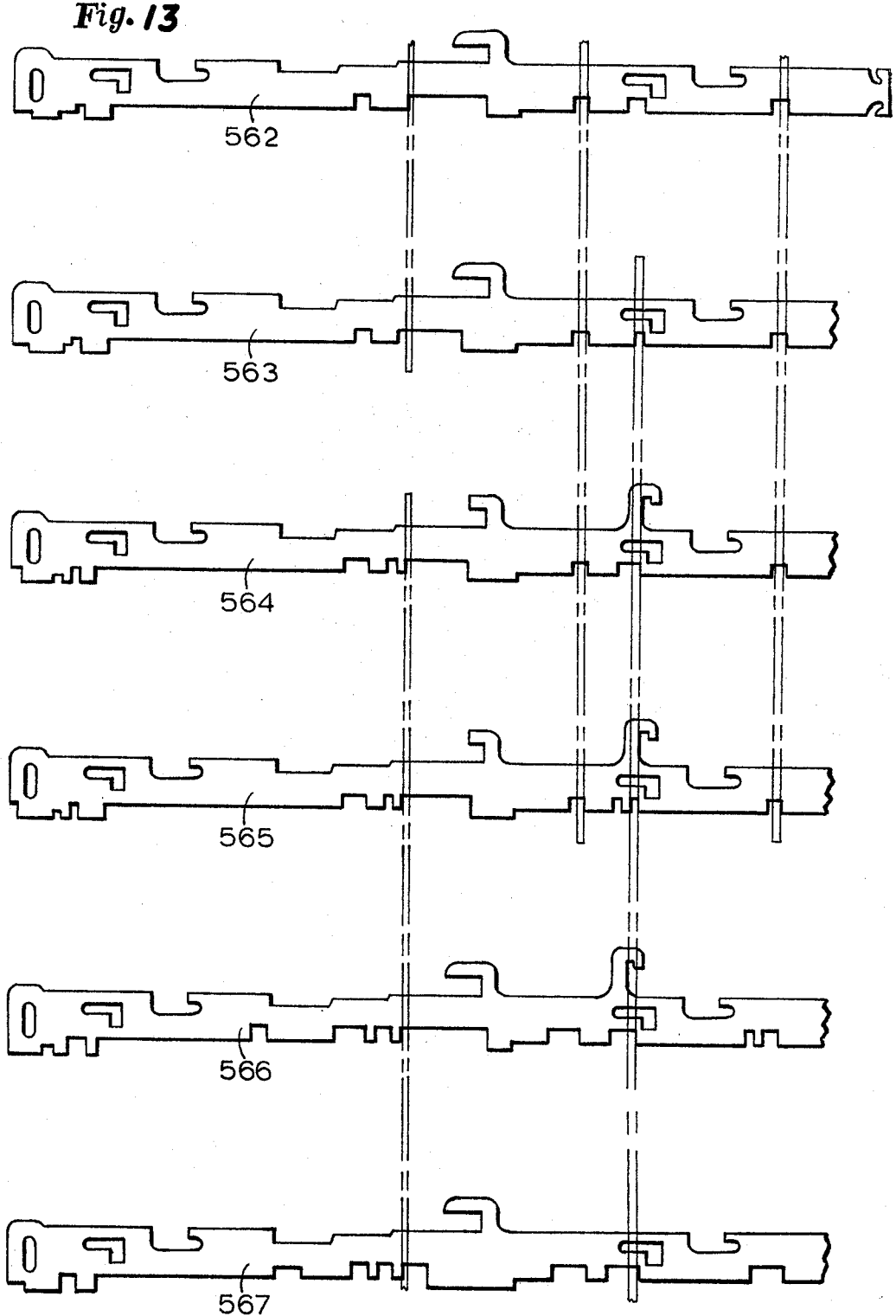
FIG. 13 is a composite illustration of the six power driven control slides showing the general outline of each together with an indication (shown by broken lines) of the location of various sensing levers disposed beneath the slides.

As seen in FIG. 10 the power add slide 636 and the power slide 637 have a number of rectangular openings cut in the top surfaces thereof. It should also be noted in FIG. 10 that there are six sensing interposers 644, 645, 646, 647, 648 and 649 each supported by a pair of stationary studs in a manner such that the interposers are free to move up and down in a vertical plane. Each of the interposers 644–649 extends beneath selected ones of the function control slides and each has a plurality of upstanding rectangular lugs thereon. As seen more clearly in FIG. 13 and as described in greater detail hereinafter, the function control slides 562–567 have rectangular openings cut in the bottoms thereof in a manner such that when a given slide in driven downwardly as a result of having been moved rearwardly through the depression of an operation control key, a selected one or ones of the sensing interposers will be driven downwardly. As seen in FIG. 10, interposer 644 extends beneath slides 562 and 563; interposer 645 extends beneath slides 562–565; interposer 646 extends beneath slides 562–565; interposer 647 extends beneath slides 566 and 567; interposer 648 extends beneath slides 563–567; and interposer 649 extends beneath slides 564–567.

As seen in FIG. 10 and as described in detail hereinafter with respect to the operation of the various parts in the machine for the performance of the different arithmetical functions, each of the sensing interposers is disposed above one or more coupling levers having lugs thereon which are adaptable to openings provided in the top surface of the power add and power total slides 636 and 637. The manner of operation is such that when a selected interposer is moved downwardly in response to the downward drive of a function slide, a selected part in the machine will be coupled with one or the other of the power driven slides 636 and 637 to thereby cause movement at the proper time in a machine cycle of such selected parts.

*Capacity control*

The machine is so constructed that the total number of digits which can be entered during a multiplication problem is twelve. That is, the number of digits in the multiplicand plus the number of digits in the multiplier cannot be greater than twelve. This limitation on the number of digits which can be entered is of course not a limitation imposed by the general scheme of the machine but only a limitation imposed by the capacity of the specific apparatus illustrated. In the case of division a somewhat more complicated "rule" is imposed due to the ability of the machine to properly perform division using factors having decimal amounts and with the result being printed with the decimal properly located therein. In the embodiment illustrated the number of digits in the dividend plus the number of digits to the right of the decimal point in the divisor must not exceed ten.

Figures 5, 6:
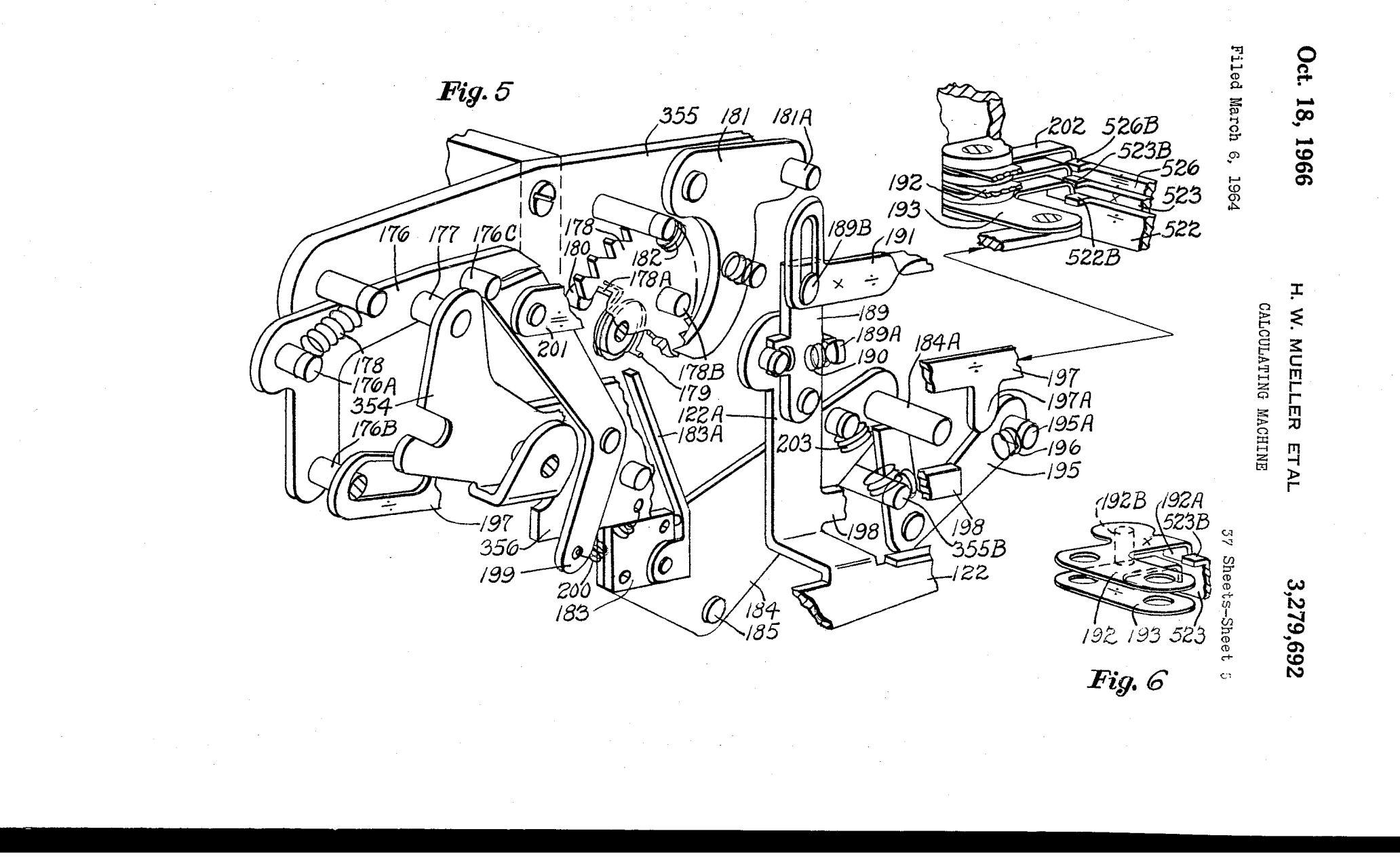

Referring now to FIG. 5 it will be seen that the lever 354 which is pivoted on the front of frame 355 has a driving pawl 176 pinned thereto at 177. A spring 178 connected to a stud 176A on pawl 176 and to a stationary stud on frame 355 serves to urge pawl 176 in a clockwise direction on the lever 354. Lever 354 is driven clockwise in response to each depression of a digit key. That is, the lever 39 which carries the support shaft for cam 40 has a rearwardly extending stud 39B disposed in the open slot in lever 354 so that when the cam 40 is rotated by the previously described power roll the lever 354 is rocked clockwise.

The right end of the driving pawl 176 is adaptable to a toothed counting wheel 178 supported for rotation on the front of frame 355. A small coil spring 179 having one end secured to frame 355 and the other end secured to the counting wheel 178 serves to constantly urge the wheel in a counterclockwise direction so that the small lip or lug 178A on the counting wheel limits against stationary stud 180. A latching detent lever 181 is urged clockwise on frame 355 by spring 182 so that the lower nose thereof is normally engaged with the teeth of the wheel 178 to prevent counterclockwise movement thereof.

A small electrical switch 183 secured to a frame 184 pivoted at 185 on the frame 355 has an arm 183A extending upwardly to be in the path of the stud 178B secured to the front side of the wheel 178. The switch 183 is normally open and is connected in circuit with a solenoid (not shown) which in turn controls a key blocking bail 187 pivoted at 188 beneath the numerical keys. The arrangement is such that when the wheel 178 rotates twelve steps clockwise from its home position with lug 178A engaged with stud 180, the stud 178B will engage switch arm 183A to thereby cause the solenoid to be energized. This in turn will prevent further depression of numerical keys.

A slide member 122 (FIG. 5) is elevated during each cycle of the main driveshaft 225 to permit the indicator assembly to be driven to the right early in the machine cycle. The slide 122 has a vertical portion 122A which carries a small lever 189 near its upper end. A small spring 190 connected to the section 122A and to lug 189A serves to hold the lever 189 in an upright position so that the top edge thereof is adaptable to a stud 181A on the detent lever 181. The arrangement is such that as long as the lever 189 is in its vertical position as illustrated in FIG. 5 the upward movement of slide 122 will cause release of the detent lever 181 and hence the counting wheel 178 will be released for return to its home position.

Since the wheel 178 must accumulate the number of digits in the multiplicand and the multiplier during multiplication operations, means must be provided to disable the release of the detent 181 until both factors have been entered. To this end a small connecting link 191 having its right end connected to a lever 192 is provided. The lever 192 is provided with a downwardly extending lug 192A which is disposed in the path of lug 523B on the previously described slide 523 which is moved rearwardly when the multiplicand key 503 is depressed. Therefore when the multiplicand key is operated (which occurs after the operator has sequentially operated the digit keys for the multiplicand entry) the connecting link 191 will be pulled to the right. As seen in FIG. 5 link 191 has a long vertical slot in its left end through which a headed stud 189B on lever 189 passes. Accordingly, when the multiplicand key is depressed the lever 189 will be rocked clockwise to a position where it will not engage the stud 181A on the detent lever 181 when slide 121 is elevated. Thus the wheel 178 will be in a position to add the number of digits subsequently indexed for the multiplier to the number of digits previously indexed for entry of the multiplicand. If the total is equal to or greater than twelve the switch 183 will be closed and the numerical keys will be blocked.

When the multiplier key is later operated for entry of the multiplier digits for performance of the multiplication operation the wheel 178 will be released during the ensuing cycle of the main driveshaft and returned to its home position.

In a manner substantially identical to that above described, the dividend entry operation serves to disable lever 189 so that after the operation of the dividend key the wheel 178 will be in a position corresponding to the number of times the numerical keys were operated for the dividend. To this end it will be seen in FIG. 5 that the lever 192 has a downwardly extending stud 192B disposed in the path of a lever 193 controlled by slide 522 which is actuated by the dividend entry key 502. Accordingly, the lever 189 will be disabled when the dividend key 502 is depressed. Since during division the number of digits in the dividend plus the number of digits to the right of the decimal in the divisor must not exceed ten, the switch 183 is moved to the right during division operations by a distance such that when the wheel 178 goes from its ninth to its tenth position the stud 178B will actuate the switch 183. It will be seen in FIG. 5 that the plate 184 which carries switch 183 has a forwardly extending stud 184A which is disposed on top of the upper left end of a lever 195 urged counterclockwise on frame 355 by spring 196 to a position limited by stud 355B secured to frame 355. Slide 522 has a lug 522B which is adapted to engage the lever 193 previously described which is similar to and immediately adjacent lever 192. Lever 193 is connected to a second connecting link 197 having a downwardly extending lug 197A disposed to the left of a stud 195A on lever 195. The arrangement is such that when the dividend key is depressed lever 195 is rocked clockwise so that the plate 184 moves clockwise until stud 184A thereon limits on the lug 198 on member 122A. The extent of movement is such that switch 183 is now in the proper position for being closed when wheel 178 is moved from its ninth to its tenth position. It should be noted that even though member 122A is elevated during the dividend entry operation such movement occurs before the operation control key 502 is released and therefore at the end of the dividend entry operation the stud 184A will rest upon lug 198 and lever 195 will be under a counterclockwise urge and rest against the right side of stud 184A. Thus the switch 183 is moved to the right of its normal position.

Since the wheel 178 must only count the digits to the right of the decimal in the divisor, means is provided for disabling the counting pawl 176 when the dividend key is depressed and then again enabling the pawl when the decimal key is operated. As seen in FIG. 5 the left end of link 197 is provided with an opening on slot which encompasses a forwardly extending stud 176B on the driving pawl 176. The pawl 176 has a third stud 176C which is normally disposed to the left of and slightly below the top surface of a lever 199 pivoted on the previously described slide 356 which is pulled to the right when the decimal key is operated. A spring 200 urges lever 199 in a counterclockwise direction. The arrangement is such that during depression of the numerical keys for entry of the dividend the pawl 176 will advance the counting wheel 178. When the dividend key is operated the link 197 will rock pawl 176 counterclockwise and thus permit the top edge of lever 199 to move under the stud 176C on the pawl 176. During the subsequent depression of the digit keys for entry of the divisor the end of the driving pawl 176 will pass above the teeth on counting wheel 178 until the decimal key is depressed. When the decimal key is depressed the slide 356 will be pulled to the right in a manner previously described in connection with the punctuation printing apparatus and therefore the lever 199 carried thereon will move to the right and permit stud 176C to fall off of the top surface of the lever 199. The subsequent depression of numerical keys for the entry of digits to the right of the decimal in the dividend will therefore cause advancement of the counting wheel 178. Since at this time switch 183 is in its rightmost position movement of the wheel 178 from its ninth to its tenth position will cause closing of he switch 183 to thereby prevent further operation of the numerical keys.

When the divisor key 506 is depressed means must be provided for enabling the driving pawl 176 in the event that the divisor contained no digits to the right of the decimal (in which event the decimal key would not have been operated and hence the lever 199 would hold the pawl 176 in a disabled condition). For this reason a third connecting link 201 is pinned to the upper portion of lever 199 and is connected at its right end to a lever 202 similar to the previously described levers 192 and 193. It will be seen in FIG. 5 that the slide 526 which moves rearwardly when the divisor key 506 is depressed has a leftwardly extending lug 526B disposed in operative relationship to the lever 202 so that rearward movement thereof will cause link 201 to be pulled to the right and hence cause lever 199 to be rocked clockwise and release the driving pawl 176. This first cycle of operation caused by the divisor key 506 will also be seen to reset switch 183 to its initial position against the urge of spring 203.

From the above it will be seen that the machine is provided with a capacity control apparatus which works in cooperation with various other parts in the machine to assure proper results when a given mathematical operation is being performed. It should be mentioned that the machine is so constructed that it will automatically provide any desired number of places in the quotient depending upon the desires of the operator. For example, if a two digit dividend is being divided by a two digit divisor any number of significant digits can be obtained in the quotient up to the capacity of the machine merely by the operator depressing the decimal key after the entry of the two dividend digits in those cases where the dividend does not contain a decimal amount and then depressing the cipher key by a number of times corresponding to the number of digits desired to the right of the decimal in the quotient. In those cases where the dividend contains nonzero digits to the right of the decimal the operator merely depresses the cipher key after the significant digits have been entered. As will be described hereinafter, the depression of the cipher key will serve to cause the dividend to be moved to the left into higher orders of the machine but since such depression of the cipher key occurs following depression of the decimal key the true amount of the dividend will be printed and used for performance of the division operation. This arrangement is particularly advantageous since the operator is not required to operate a "division stop" mechanism in order to terminate the performance of the division operation as is customary in many prior art calculating machines. In the machine of the present invention the operator can predetermine the extent to which the division routine is to be carried merely by the entry of additional zeros to the right of the decimal in the dividend.

*Power drive*

As previously mentioned the machine is provided with an electric motor which is adapted to be continuously energized and selectively coupled with a drive train to provide the necessary power for the machine. The drive assembly is positioned near the left side of the machine and is illustrated primarily in FIG. 15. Referring now to FIG. 15 it will be seen that an electric motor 650 is secured to the base of the machine and has a shaft 651 which extends through the left main frame 652 and has a gear 653 secured thereto on the left side of the frame 652. An endless geared belt 654 passes around the gear 653 and around a gear 656 pinned to a stub shaft 657 extending to the left from and supported for rotation by the left main frame 652. The gear 656 is partially broken away in FIG. 15 so that a gear 658 which is also pinned to the shaft 657 can be seen. The belt 52 passes around the gear 658 and the gear 659 secured to the left end of the shaft 53 which as described in connection with the numerical input mechanism is continuously rotated to provide the necessary power for the power roll 50 shown in FIG. 2 of U.S. Patent 3,112,-873. The belt 52 also passes around a gear 660 and a guide pulley 661. The gear 660 is pinned to a stub shaft 662 supported for rotation by the frame 652, said shaft 662 further having a gear 663 pinned thereto on the right side of the gear 660. Gear 663 is in mesh with a large gear 664 supported for rotation on the main driveshaft 225. The large gear 664 has secured thereto a smaller driving gear 666, the arrangement being such that as the belt 52 is driven by the motor 650 the driving gear 666 will be continuously driven in a counterclockwise direction (clockwise in FIG. 15).

A small plate 667 is secured to the left end of the main driveshaft 225. A power coupling member 668 is pinned to the plate 667 and has a single inwardly extending lug 669 which is adaptable to the spaces between the teeth on the driving gear 666. A spring 670 secured to studs on the coupling member 668 and the plate 667 serves to constantly urge the coupling member 668 in a counterclockwise direction on the plate 667 and hence tends to urge the lug 669 toward the driving gear 666. A detent lever 671 pivoted on the left side of the frame 652 and urged in a counterclockwise direction by means of a heavy spring 672 is provided with a detenting surface near its front end which is in engagement with a stud 673 extending to the left from the plate 667. With the parts in the positions shown in FIG. 15 the detent lever 677 serves to yieldingly hold the plate 667 against rotation and hence provides a home position for the main driveshaft 225.

The end of the coupling member 668 which faces rearwardly in FIG. 15 will be seen to be in engagement with the front end of a control lever 674 pinned to a small shaft 676 supported for rotation by the frame 652. A second lever 677 is similarly pinned to the shaft 676 (on the right-hand side of the frame 652) and has a leftwardly extending lug 677A near its rear end which is disposed in engagement with the latching nose on the forward arm of a bellcrank lever 678 pivoted on a stud 679 extending to the right from the frame 652. A small spring 680 serves to urge the bellcrank lever 678 in a counterclockwise direction so that the latching nose thereof is normally engaged with the lug 677A on the lever 677. A third lever 681 is also pinned to the shaft 676 to which the control lever 674 is pinned and carries a roller 681A (FIG. 49B) which is disposed in engagement with a cam 682 on the main driveshaft 225. A spring 683 connected to the lever 681 and to a stud on the right side of the frame 652 serves to provide a constant counterclockwise urge on the levers 674, 677 and 681 which are pinned to the shaft 676, said shaft 676 being normally held against counterclockwise movement by the latching bellcrank lever 678.

Figure 26:
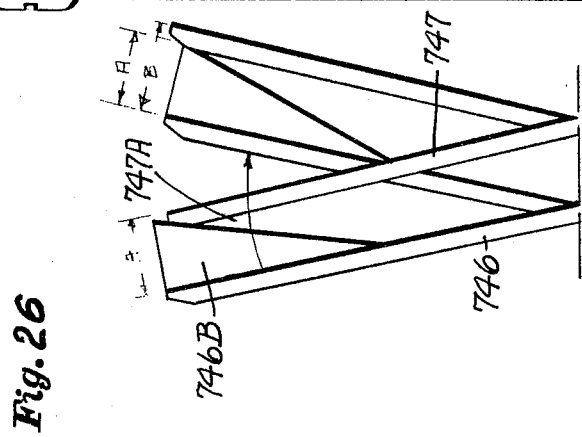
FIG. 26 is an enlarged diagram representing two adjacent parts and illustrating the manner in which sufficient movement is assured in higher orders when a large number of tens transfers takes place.

From the above it will be seen that although the motor 650 continuously rotates the driving gear 666 in a counterclockwise direction, the coupling member 668 carried by the main driveshaft 225 is normally held disengaged from the driving gear 666 by means of the control lever 674. As previously described in connection with the operation control keys, a cycle control shaft 517 is moved counterclockwise in response to the depression of any control key. As seen in FIG. 26 the left end of the cycle control shaft 517 is supported by the left main frame 652 and has a downwardly extending lever 684 pinned thereto. Said lever 684 is disposed on the right side of the frame 652 and is pinned at its lower end to the front end of a slide 686 supported for horizontal movement by means of the elongated slot 686A in the rear end thereof which encompasses a stud 687 extending to the right from the frame 652. The slide 686 near its rear end has a downwardly extending portion which carries a rightwardly extending stud 688 engaged with the front edge of the latching bellcrank lever 678. The arrangement is such that when the cycle control shaft 517 is moved counterclockwise in response to the depression of a control key the slide 686 will move rearwardly and thereby cause the latching lever 678 to be rocked clockwise (counterclockwise in FIG. 26). As a result thereof the spring 683 will be effective to pull the control lever 674 counterclockwise and hence release the coupling member 668 carried by the main driveshaft. Accordingly, the lug 669 on the coupling member 668 will move into engagement with the gear 666 so that the driveshaft 225 will be positively driven in a counterclockwise direction. As the main driveshaft 225 nears the end of its 360° rotation the cam 682 (FIG. 49B) carried thereby engages the roller 681A and hence the control lever 674 is cammed clockwise to its original position (as seen in FIG. 26). Therefore, the front of the control lever 674 will be disposed in the path of travel of the end of the coupling member 668. When the end of the coupling member 668 engages the lever 674 it will be seen that the lug 669 thereon will be driven away from the driving gear 666 and hence power will no longer be applied to the main driveshaft 225. The momentum of the main driveshaft will serve to cause complete disengagement of the lug 669 from the gear 666 and will bring the stud 673 on the plate 667 into engagement with the detenting notch of the lever 671. Thus it will be seen that the motor 650 will serve to drive the main driveshaft 225 through a complete cycle of operation (360°) in response to the counterclockwise movement of the cycle control shaft 517. It should be noted, that as described in connection with the operation control keys, the shaft 517 may be held in its counterclockwise position so that a plurality of machine cycles will take place. As seen in FIG. 15, if the cycle control shaft 517 is not restored to its clockwise home position prior to the end of the machine cycle the slide 686 will remain in its rearward position and hence will hold the latching bellcrank lever 678 in its clockwise ineffective position. Therefore, in such a case the main driveshaft 225 would be driven through more than one cycle of operation (except in the case described hereinafter).

In addition to providing the necessary power for the main driveshaft 225, the motor 650 serves to drive a shaft 690 at a much higher speed than the main driveshaft 225. The mechanism adapted to be driven in response to the rotation of the high speed shaft 690 is described hereinafter, but the mechanism for driving the shaft 690 will be seen in FIG. 15. As seen in FIG. 15, the left end of the high speed shaft 690 which passes through the left main frame 652 has a small gear 691 pinned thereto. Gear 691 is in mesh with a gear 692 pinned to the stub shaft 657 to which the gear 656 is pinned. Thus it will be seen that the motor 650 will serve to drive the high speed shaft 690 in a counterclockwise direction.

The machine also has a relatively low speed driveshaft 693, the purpose of which is described hereinafter. As seen in FIG. 15 the left end of the shaft 693 extends through the left frame 652 and has a relatively large gear 694 pinned thereto. Gear 694 is in mesh with the gear 692 which is continuously driven clockwise by the motor and therefore the low speed shaft 693 will be continuously driven in a counterclockwise direction (clockwise in FIG. 15).

*Add rack drive*

The machine is provided with thirteen add racks 68 (FIGS. 15 and 16) which are adapted to move rearwardly during amount entering cycles of operation to positions determined by the indicator and limiting bars 60. The mechanism for moving the add racks 68 rearwardly is provided by the main driveshaft 225 and is similar to the add rack drive apparatus disclosed in U.S. Patent No. 2,693,906 to Butler.

Figure 49:
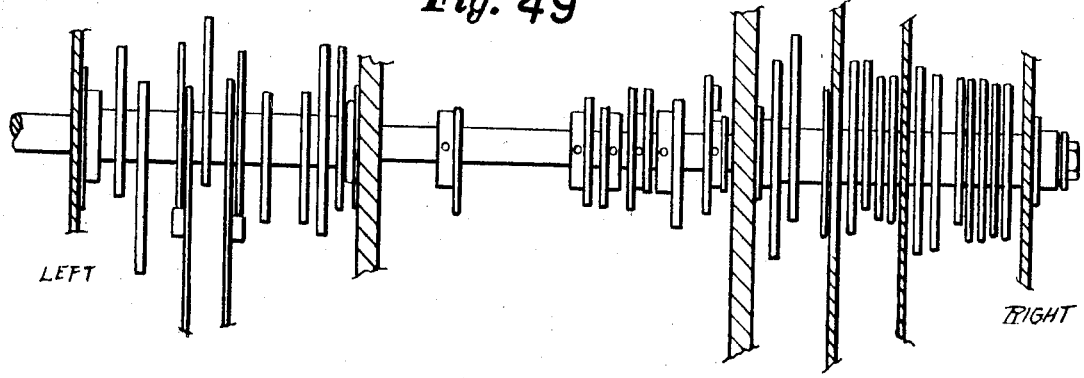
FIG. 49 is a front view of the main driveshaft showing the various cams thereon.
Figure 49A:
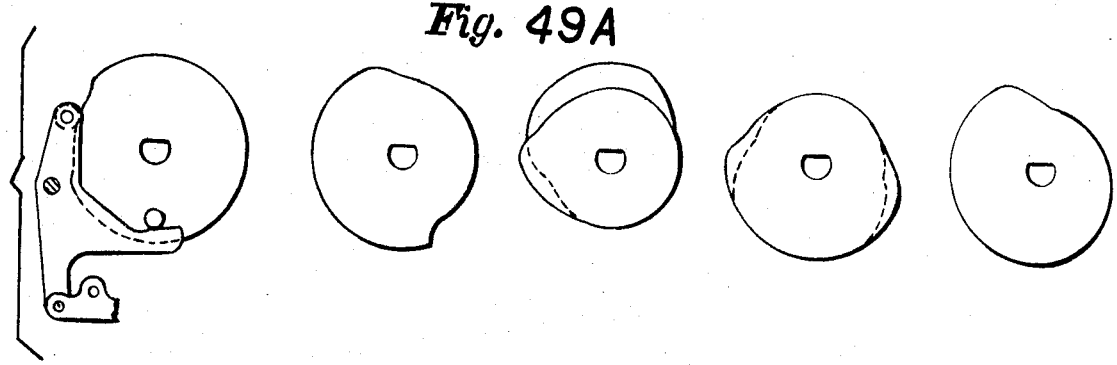
FIG. 49A is a composite of a first group of cams on the main driveshaft showing in detail the shape of the cams.
Figure 49B:
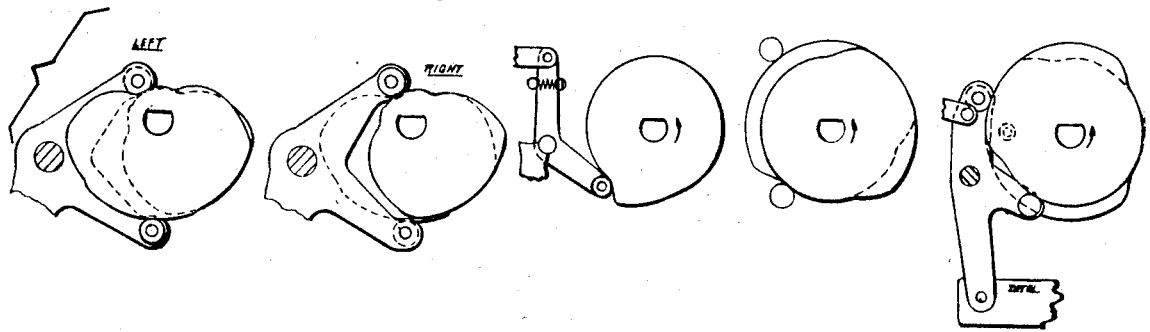
FIG. 49B is a composite drawing of a second group of cams on the main driveshaft together with four levers and associated rollers engaged with selected cams.
Figure 49C:
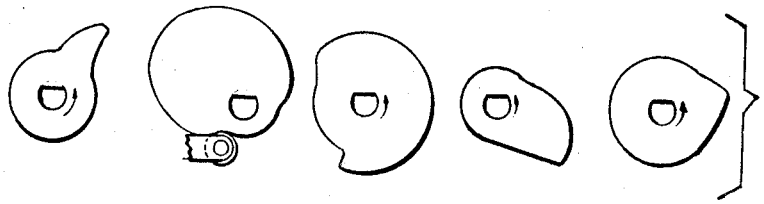
FIG. 49C is a composite illustration of a third group of cams on the main driveshaft illustrating the contour of the cams.

The drive apparatus for the add racks is illustrated in FIGS. 4, 16 and 49. As seen in FIG. 16, each of the add racks 68 has a small rectangular plate 760 supported on the right side thereof by means of the studs 761 and 762 extending to the right from each add rack and passing through associated horizontal slots in the plates 760. A small spring 763 connected to each add rack and to the downwardly extending front end of the associated plate 760 serves to maintain the plate 760 in its forward position on the add rack. Each plate 760 has a coupling member 764 pinned at 766 on the right side thereof, said coupling member 764 having a slot or opening 764A provided in the downwardly extending rear end thereof. As seen in FIGS. 4 and 26A, each of the add racks has a third rightwardly extending stud 767 which passes through an arcuate slot provided near the upper center of each associated coupling member 764. When the plates 760 are in their forward positions on the add racks (FIG. 4) the studs 767 will be located in the upper ends of the slots in the coupling members 764. Hence the opening 764A in each coupling member 764 will be disposed above, and forwardly with respect to, the ten small stationary shafts 768 which extend beneath the thirteen add racks.

A small shaft 769 (FIGS. 4 and 16) extends through horizontal slots provided in the lower half of each of the plates 760, and when the add racks are in their forward home positions said shaft 769 is disposed within the rectangular openings 764B provided in the front portion of each of the coupling members 764. The shaft 769, as seen most clearly in FIG. 4, is carried by a pair of small levers 771 (one of which is seen in FIG. 16) pinned to the lower ends of a pair of driving levers 772 and 773 (FIG. 49B). As seen in FIG. 49B the levers 772 and 773 are supported by a pair of studs extending outwardly from the central main support frames. Each of the levers 772 and 773 has a pair of rollers 772A, 772B and 773A, 773B, respectively. The rollers 772A and 772B are engaged with the cams 774 and 776 on the main driveshaft 225, and in like manner rollers 773A and 773B are respectively engaged with the cams 777 and 778 on the main driveshaft 225. The pairs of cams are "complemental" cams and are so shaped that as the main driveshaft rotates, the levers 772 and 773 will be positively rotated first in a counterclockwise direction and then clockwise back to their home positions. The timing of the operation of the levers 772 and 773 is such that the shaft 769 carried by the small levers 771 on the lower ends of levers 772 and 773 will be driven rearwardly during the first half of the cycle of the main driveshaft 225 and then will be returned forwardly to its home (FIG. 4) position during the second half of each machine cycle. For a reason to be described hereinafter, the shape of the cams 774, 776, 777 and 778 is such that the left end of the shaft 769 will lead the right end by a small amount as the shaft 769 is being translated rearwardly.

Referring now to FIG. 4 it will be seen that as the shaft 769 is driven rearwardly it will be in driving engagement with the rectangular openings 764B of the coupling members 764 and hence will drive each of the plates 760, on which the coupling members 764 are pivoted, rearwardly. As long as the add racks 68 are free to move rearwardly the studs 767 thereon will be disposed in the upper ends of the arcuate slots in the coupling membrs 764. As seen in FIGS. 4 and 16 the small levers 771 pinned to the lower ends of the power levers 772 and 773 carry a horizontal plate 779 therebetween, said plate 779 serving as an anchor for a plurality of add rack springs 780 connected to the front ends of the add racks. Hence as the shaft 769 and plate 779 move rearwardly the add racks will be moved rearwardly.

When an add rack engages a lug 67 on the associated indicator and limiting bar 60, the add rack is held against further rearward movement and as a result thereof the continued rearward drive of the shaft 769 will cause the coupling member 764 to be cammed clockwise about its pivot point 766 on the plate 760. This camming action takes place since the stud 767 which passes through the arcuate opening of the coupling member 764 is stationary while the coupling member is being driven rearwardly. Hence the opening 764A provided in the rear end of the coupling members 764 will be rocked into engagement with one of the small stationary shafts 768 and serve to hold the respective add rack in a fixed position. The parts are shown in FIG. 16 in the positions assumed when an add rack 68 has been limited to three steps of rearward movement. It will be seen in FIG. 16 that the shaft 769 has moved rearwardly with respect to the coupling member 764 and the add rack, and in undergoing such rearward movement serves to hold the coupling member 764 against counterclockwise movement. As a result thereof the add racks are positively held in a fixed position, said position being determined by the extent of rearward movement which each add rack can undergo prior to engagement thereof with an indicator and limiting bar 60.

During a second portion of a machine cycle the main driveshaft will move the shaft 769 forwardly to its home position. It will be seen in FIG. 16 that as the shaft 769 returns forwardly it will engage the coupling member 764 on an angled surface thereof, the arrangement being such that as the shaft 769 moves forwardly it will engage the coupling member 764, cam it counterclockwise, and hence be positioned within the rectangular opening 764B and serve to drive each of the add racks back to their forward positions. Thus it will be seen that during each machine cycle the add racks 68 will be moved rearwardly by a selected number of steps and then will be returned to their home positions. The manner in which this movement of the add racks is used to enter amounts into each of the various sections of the machine and to derive totals therefrom is described hereinafter.

*Product register*

As previously described the machine includes a product register having twenty individual pinions or accumulating wheels carried by a common shaft therein, said shaft being in turn supported by and forming part of a rotatable apparatus referred to as a drum. Multiplication is performed by repeatedly rotating the drum so that the product pinions move through an arc which includes selected pins in the multiplicand unit. Since the product pinions are free to rotate while the multiplicand pins are stationary the product pinions will be advanced by a number of steps corresponding to a number of pins in the multiplicand unit which have previously been moved to their forward pinion engaging positions. After the pinions have left the portion of the drum revolution during which they are engaged with the multiplicand unit they come into alignment with a tens transfer mechanism. The necessary movement for the tens transfer operations is derived from the drum rotation, means being provided to cause the simultaneous occurrence of a "carry on a carry" or a run through carry. Since a pinion in the product register can pass from its "9" to its "0" position at any time during the engagement thereof with the multiplicand unit the tens transfer initiating mechanism is carried by the product register drum and is constantly responsive to the rotation of the product pinions.

Referring now to FIGS. 21 and 20 it will be seen that the product register includes a shaft 701 supporting the product register pinions 702. This shaft 701 is supported by the end plates 703 and 704 (FIG. 19) of the drum which is in turn supported by a central shaft 706. The shaft 706 is supported for rotation within the frames 707 and 708 (FIG. 19) and is adapted to be selectively rotated in a counterclockwise direction in a manner described hereinafter. Each of the pinions 702 has a sleeve secured to the left side thereof which includes a cam surface 702A. A tens transfer trip latch 712 is associated with each of the pinions 702 and has a rightwardly extending lug 712A thereon which renders the latch 712 responsive to the passage of the associated pinion 702 from its "9" to its "0" position. Each of the trip levers 712 is supported on a shaft 713 carried by the drum 700. As seen in FIG. 20 each of the trip levers 712 is urged in a clockwise direction about the shaft 713 by a spring 716 so that the lug 712A thereon will be in a position to be engaged by the lug 702A. A latch 717 supported on a shaft 718 carried by the drum 700 is provided for each of the levers 712 and each latch 717 is urged in a clockwise direction to maintain its leftwardly extending lug 717A against the end of the associated lever 712. As seen in FIGS. 21 and 20 the end of each lever 712 is provided with a rectangular notch, the parts normally assuming the positions illustrated in FIG. 20. As seen in FIG. 21 the outer end of the levers 712 which leads during the counterclockwise rotation of the drum is chamfered to provide a transfer cam surface 712B which is adaptable to a chamfered lug 720A carried on the lower surface of a transfer pawl 720 (FIG. 20). Each of the pawls 720 is supported by a pair of frame members 721 and 722 held in position by a stationary block 723. Pivoted at 724 on the left side of each of the transfer pawls 720 is an interconnecting pawl 726. Each interconnecting pawl 726 is urged in a counterclockwise direction by means of an associated spring 727 which is anchored to a slot provided in a stationary cross shaft 728. It will be seen in FIG. 21 that the springs 727 are disposed at an angle such that the associated interconnecting pawl 726 is urged counterclockwise in a substantially vertical plane and the transfer pawl 720 associated therewith is urged in a clockwise direction in a horizontal plane about the opposed rectangular lugs on the front ends of the pawls 720 which are disposed within the frames 721 and 722. The arrangement is such that the lugs 720A are normally positioned to the right of the path of travel of an associated pinion 702 as said pinions translate in a circular path. However, if a lug 720A is moved to the left it will then be in the path of the pinion and hence the pinion will be advanced by one tooth as the drum rotates. In this way a tens transfer can be made to take place merely by moving a proper one (or ones) of the lugs 720A into the path of travel of the pinions prior to the arrival of the pinions in the transfer area.

As seen in FIG. 20 each of the interconnecting pawls 726 has a first upwardly extending lug 726A which is disposed to the right of the upper end of the associated transfer pawl 720. In addition, each interconnecting pawl 726 carries a leftwardly extending transfer lug 726B which is normally disposed above the chamfered end 720C on the associated transfer pawl 720. The arrangement is such that if a transfer pawl 720 is moved counterclockwise (as viewed from above) the leftwardly extending lug 726B on the associated interconnecting pawl 726 will normally pass above the chamfered end 720C of the adjacent higher order transfer pawl. However, if an interconnecting pawl 726 is held in a clockwise position with the right end of the lug 726B in a lowered position the counterclockwise movement of the associated transfer pawl 720 will cause the left end of the lug 726B to engage the adjacent higher order transfer pawl 720 and move the same in a counterclockwise direction. The downwardly extending portion of the transfer pawls 720 which carries the chamfered lugs 720A will therefore be in the path of a pinion and cause said pinion to be advanced by one step in the clockwise direction as the drum rotates. Thus a tens transfer will take place in an adjacent higher order.

As seen in FIGS. 20 and 22 the spring 716 connected to the trip lever 712 and latch 717 serves to hold the lug 717A against the end of the lever 712 and to hold the lever 712 in a clockwise direction so that the lug 712A thereon will be engageable by an associated lug 702A when a pinion passes from "9" to its "0" position. With the parts in the positions illustrated in FIG. 20 it will be seen that the chamfered cam surfaces 712B on the levers 712 lie within the circumference of the drum. However, when a pinion passes from "9" to "0" the associated lever 712 will be rocked counterclockwise and latched in such counterclockwise position by the associated latch 717. In such position the outer chamfered end of the lever 712B will extend beyond the circumference of the drum so that as the drum rotates the chamfered cam surface 712B will engage a lug 720A associated with the adjacent higher order pinion and cam the adjacent higher order transfer pawl 720 to the left to a position where the lug 720A will be coplanar with the adjacent higher order pinion. Accordingly, as the drum rotates through the area in which the transfer pawls are located a transfer operation will be accomplished. The position of the parts when a pinion has passed from its "9" to its "0" position to trip its associated lever 712 is illustrated by the left-hand order of pinions in FIG. 21.

If a pinion which is receiving a tens transfer stands in a "9" position it is seen that the tens transfer will cause said pinion to move from its "9" to its "0" position and accordingly make necessary a tens transfer into its adjacent higher order pinion. Therefore, there is provided a nines sensing pawl 732 adjacent to each of the pinions 702. Each sensing pawl 732 has an arcuate lug 732A thereon which is aligned with the lug 702A associated with its pinion. Springs 733 urge each of the sensing pawls 732 radially inwardly. A slotted plate 734 (FIG. 20) supports the inner ends of the sensing pawls 732 while a cross shaft 736 which passes through the openings near the outer ends of the pawls 732 serves to support the outer ends thereof. It will be seen in FIG. 20 that when the sensing pawls 732 are held in their inward positions the outer ends thereof will be on or within the circumference of the drum. (As seen in FIG. 22 the end of pawls 732 and 712 pass through a slotted plate or comb 725 which is part of the drum.) Accordingly, the rotation of the drum through the tens transfer area will have no effect on the interconnecting pawls 726. The length of the arcuate surfaces on the lugs 732A corresponds to the space occupied by the "9" tooth on each of the pinions 702. Therefore, as long as a given pinion is in its "9" position the associated sensing pawl 732 will be held radially outward so that the outer end thereof will be engageable with the downwardly extending nose 726C on the interconnecting pawl 726 of the adjacent higher order (see FIG. 20). Since there is no latch provided for the sensing pawls 732, as soon as a pinion 702 moves into its "0" position from its "9" position the associated sensing pawl 732 will be returned to its inward position. Thus it will be seen that the interconnecting pawls 720 are only rocked clockwise (FIG. 20) if an associated pinion is in its "9" position as the pinion passes through the tens transfer area.

The operation of the tens transfer mechanism is as follows. When a pinion moves into its "9" position the associated sensing pawl 732 is cammed outwardly and therefore as the drum rotates the outer end of the moved pawl 732 will engage a lug 726C and thereby cam an interconnecting pawl 726 clockwise to a position where the left end of the lug 726B thereon is aligned with a higher order transfer pawl 720. In the event that the pinion continues to rotate from its "9" to its "0" position during the time that the pinions are engaged with the multiplicand pins the associated sensing pawl 732 will return to its inward position prior to the time that the pinions 702 reach the tens transfer area. The passage of a pinion from its "9" to its "0" position not only releases the associated sensing pawl 732 for inward movement but will simultaneously cause the associated transfer trip lever 712 to be rocked counterclockwise to a "set" position. Thereafter as the product register rotates through the tens transfer area the outer end of the set trip lever will cause the adjacent higher order pawl 720 to be moved in a counterclockwise direction to bring the transfer lug 720A thereon into the plane of the adjacent higher order pinion. Since the outer ends of the levers 712 lead the pinions 702 during the rotation of the drum 700 it will be seen that the necessary parts in the tens transfer area will be moved to their proper positions prior to the time that the product register pinions 702 become aligned with the transfer lugs 720A. It should be noted that if the lowest order pinion passes from "9" to "0" in response to the rotation of the product register through the multiplicand unit area and that if each of the other pinions stands in its "9" position after the product register leaves the multiplicand unit, the units order trip lever 712 will be in a latched condition (FIG. 21) while each of the higher order sensing pawls 732 will be held radially outward. Accordingly, when the transfer pawl 720 disposed between the units and tens order pinions is cammed counterclockwise by the outer end of the first or lowest order trip lever 712 each of the other higher order transfer pawls 720 will be simultaneously rocked counterclockwise since each of the other interconnecting pawls 726 will have been rocked clockwise to bring the left ends of their lugs 726B into alignment with the adjacent higher order transfer pawl 720. Accordingly, it will be seen that the passage of the units order product pinion from its "9" to its "0" position while engaged with the pins of the multiplicand unit will cause a tens transfer to occur simultaneously in each of the other orders of the product register as the register is moved through the tens transfer area.

In summary it might be stated that: (1) the trip levers 712 are adapted to be latched with their outer ends extending beyond the circumference of the drum if an associated pinion goes from "9" to "0" while moving through the area occupied by the multiplicand unit; (2) the outer ends 712B of said lever 712 when thusly held outwardly will cause a transfer pawl 720 to be cammed counterclockwise prior to the arrival of the pinions in the tens transfer area; (3) the length of the outer ends 712B is sufficient to hold such transfer pawl 720 and lug 720A thereon in the path of a pinion during movement through the transfer area and hence cause a tens transfer to take place. If a pinion 702 is moved into its "9" position and remains in that position as the pinions approach the tens transfer area the associated nines sensing pawl 732 will be held radially outward and will therefore cause an interconnecting pawl 726 to be moved clockwise (FIG. 20). Therefore the subsequent movement of a transfer pawl 720 in a counterclockwise direction will cause the simultaneous movement of the adjacent higher order transfer pawl 720 into the proper position for causing a tens transfer.

As seen in FIGS. 21 and 23 a stationary bar 740 is provided immediately adjacent to the lugs 720A on the transfer pawls 720. The bar 740 has chamfered surfaces 740A (FIG. 23) which are so positioned that a V-shaped opening is provided for the leading chamfered ends 712B of trip levers 712. This insures proper alignment and engagement of the levers 712 with the pawls 720 as the drum rotates.

Figure 25:
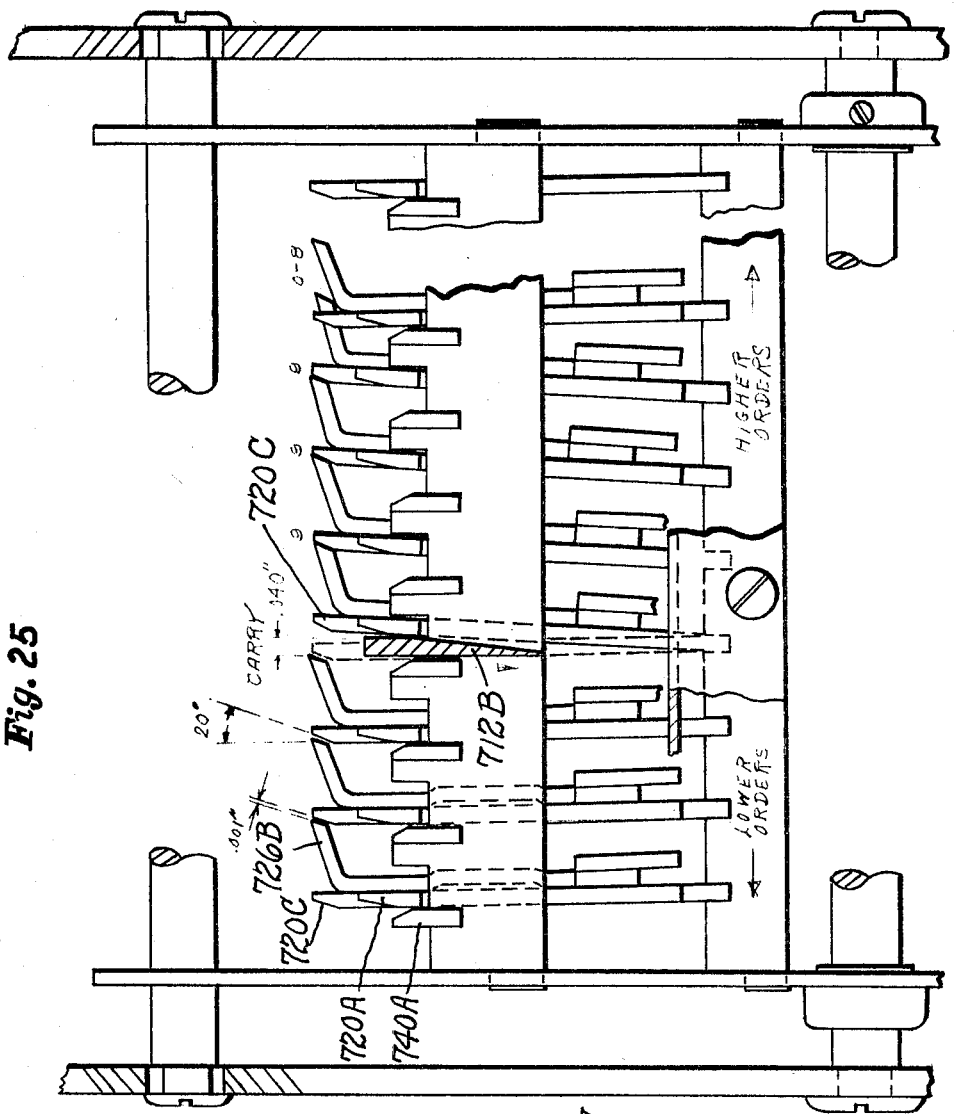
FIG. 25 is a view from the bottom showing the manner in which simultaneous tens transfers through a large number of orders is accomplished.

To make certain that sufficient movement is imparted to each higher order transfer pawl 720 when a large number of pinions are in "9" position and hence a run through carry required, the ends of the lugs 726B on the sensing pawl 726 are chamfered and so are the surfaces 720C engaged thereby on the transfer pawls 720. In FIG. 25 the parts of the transfer apparatus are illustrated as seen from below with the "thousands" order pinion having passed from "9" to "0" and with the three adjacent higher order pinions standing in their "9" positions. In FIG. 25 it will be seen that the end 712B of the thousands order (or fourth order) trip lever 712 has engaged the fifth order transfer pawl 720 and cammed the lug 720A thereon into the path of the fifth order pinion. As illustrated, the fifth, sixth and seventh order pinions all stand in "9" position so that the associated sensing pawls 732 have operated the interconnecting pawls 726 and therefore the movement of the fifth order transfer pawl 720 will cause simultaneous movement of the sixth, seventh and eighth order transfer pawls. Therefore, the fifth, sixth, seventh and eighth order pinions will each have a tens transfer occur therein as the drum rotates through the tens transfer area.

FIG. 26 illustrates the manner in which sufficient movement of each higher order transfer pawl 720 is insured, even when a large number of simultaneous carries is taking place. Thus in FIG. 26 it will be seen that when the members 746 and 747 are initially spaced "A" units apart and then member 746 is moved clockwise (FIG. 26), the parts are then spaced "B" units apart with "B" being greater than "A." This illustrates the fact that the higher order transfer pawls 720 can be made to undergo a sufficient amount of movement in those cases where a number of simultaneous carries is taking place. In the example shown in FIG. 26 the members 746 and 747 can in fact be alternate embodiments of the transfer pawls 720 and interconnecting pawls 726. In the embodiment of FIG. 26 the angled block 746B corresponds to the ends of the lugs 726B and the angled face 747A corresponds to the lugs 720A.

To further insure sufficient movement of the transfer pawls a strip of spring steel 748 (FIG. 21) having downwardly extending portions 748A may be provided, said portions 748A being engaged with the ends of lugs 720D on the pawls 720. The arrangement is such that once the pawls 720 are cammed slightly counterclockwise (as seen from above) the portions of spring steel 748A will act as "booster" springs to act against the springs 727.

As seen in FIG. 20 a relatively heavy counterweight 749 is carried by and forms part of the drum 700 in order to provide proper balance. It should also be noted in FIG. 29 that a leaf spring 750 is provided for each pinion 702 to prevent overthrow thereof as the drum rotates. A blocking bail 751 (FIG. 20) is supported by a pair of levers 752 (one of which is seen in FIG. 20) supported by the central shaft 706. The levers 752 have three teeth thereon which are engaged with mating teeth on the ends of levers 753 pivoted on shaft 754 carried by the drum. The levers 753 carry rollers 754 which are disposed within associated closed cam grooves provided in the stationary end cylinders 756 and 757 seen best in FIG. 19. The arrangement is such that the levers 753 are rocked as the drum rotates and hence the blocking bail 751 is held in engagement with the pinions 702 except during the time that the pinions are passing through the tens transfer area, the area occupied by the pin carriage, and the area occupied by the read-in and read-out racks (described hereinafter).

A shaft 758 carried by the arms 753 (FIG. 19) is disposed in engagement with the latches 717. The shaft 758 is therefore rocked as the drum rotates, the timing being such that when the trip levers 712 are responsive to the movement of a pinion from "9" to "0" as the pinions are rotated the latches will be active. Then at a later portion of the drum revolution the movement of the shaft 758 will serve to reset the latches 717 and hence permit return of any tripped-off lever 712 to its initial position.

*Multiplicand unit*

The multiplicand unit is in the form of a movable pin carriage having a plurality of columns of individually movable pins disposed therein. Each of the pins can be moved from an inactive position to an active position where the movement of the product register in passing the multiplicand unit will cause engagement of a pinion in the product register and a pin in the multiplicand unit. As the register pinion continues its movement it will be advanced by one step in response to the relative movement thereof with respect to the pin. The multiplicand unit is adapted to receive an eleven digit multiplicand and therefore as seen in FIGS. 28 and 24 it has eleven rows of individually movable pins 800. Each of the pins 800 has a rightwardly extending stud 800A (FIG. 28) near the rear end thereof which is disposed within a control slot 801A is an associated rack 801. The rear surface of each rack 801 is provided with teeth which are constantly in mesh with a gear or pinion 802 supported on a stationary shaft 803. A plurality of multiplicand add racks 804 (FIG. 30) are pivoted on the forwardly extending arms of the vertical add racks 806 which are coupled by means of the transfer gears 807 with the main horizontal add racks 68. As previously disclosed the horizontal add racks 68 move rearwardly during the first half of each machine cycle to positions determined by the amount entered into the numerical indicator and add rack limiting section through the operation of the numerical keys. As a result of such rearward travel of the horizontal racks 68 the vertical racks 806 move downwardly and during such downward movement of the racks 806 the multiplicand add racks 804 are held disengaged from the gears 802. During the second half of the machine cycle the multiplicand add racks 804 are engaged with the gears 802 and hence the forward drive of the horizontal add racks 68 will cause the amount set therein to be transferred to the multiplicand section by driving each of the racks 804 upwardly. Each of the racks 801 (FIG. 28) is in its uppermost position when the multiplicand unit is in a zero condition so that the cam slots 801A in the respective racks 801 will hold each of the pins 800 in its rearward position. It will be seen in FIG. 28 that as a multiplicand add rack 804 moves upwardly the associated rack 801 will be driven downwardly and as a result thereof a number of pins 800 corresponding to the multiplicand digit for that order will be cammed forwardly to a position where engagement will be made therewith by the product register pinions during the multiplication operation.

The machine is adapted to perform multiplication by the short cut method and therefore means is provided for setting the nines complement of the multiplicand digits in the multiplicand register simultaneously with the setting of the multiplicand digits therein. Accordingly, as seen in FIGS. 31 and 28 there is provided a set of complemental multiplicand pins 810 to the right of each of the multiplicand pins 800. The pins 810 each have rightwardly extending studs 810A which are disposed in the cam slot 811A provided in associated ones of the complemental racks 811. A transfer gear 812 supported by a shaft 813 is engaged with the rear surface of an associated complemental rack 811 as well as with an associated one of the gears 802. Thus it will be seen (FIG. 28) that when a multiplicand add rack 804 is moved upwardly the associated rack 801 will be moved downwardly and the complemental rack 811 will be moved upwardly. It should be further noted that when the multiplicand unit is in a zero condition each of the complemental racks 811 will be in their lowermost positions and therefore each of the complemental pins 810 will normally be in their most forward positions. As seen in FIG. 28 each of the various pins 800 and 810 are supported for horizontal movement by means of the slotted spacing plates 814 disposed between each of the racks 811 and 801. The spacing plates 814 each have rectangular openings 814A cut in the tops and bottoms thereof to receive one of the racks 811 or 801. The spacing plates 814 are supported by the shafts 816 and 817 at their lower and upper ends respectively, said shafts being secured to the multiplicand main frames 818R and 818L. The arrangement is such that when the parts are assembled within the frames 818R and 818L the racks 801 and 811 can move upwardly and downwardly but are held against any forward or rearward movement. Accordingly, the position of each of the pins 800 and 810 is accurately controlled by the position of the associated rack 801 and 811. Thus it is seen that means is provided for simultaneously entering into the multiplicand unit the true value of a multiplicand as well as the nines complement thereof.

In connection with the multiplicand unit it should be made clear that when the term "complement" is used the "nines" complement is intended whereas in the multiplier unit the "tens" complement is used. The reason for this is that when a number, for example 6, is to be multiplied using the shortcut method by a multiplier digit which is greater than 5, as for example 8, the 6 is subtracted in the units order by a number of times equal to the tens complement of the multiplier and is then added once in the tens order. Thus when 6 is multiplied by 8 the first operation would involve the subtraction of 6 twice giving a minus 12 and then the adding of 60. The result would be 60 minus 12 or 48. However, in connection with the use of the addition of complements to perform subtraction the nines complements must be used to accommodate the tens transfers which occur in each of the higher orders of the product register. For example, if 14 is to be subtracted from 23 to give an answer of 9 the result can be achieved by adding to 23 the nines complement of 14. The result would be 23 plus 85 or 108. However, the nines complement of zero in each of the higher order pinions is 9 and therefore a tens transfer would occur between each of the higher order units since the value actually being added is 99999985 with there being a 9 for each order in the complemental section of the multiplicand unit, and the product register having as many pinions as there are in the multiplicand unit. It should be noted that in a conventional product register the passage of the highest order pinion from 9 to 0 causes an "end around" carry to take place so that the units order is advanced by one. To eliminate the need for such end around carry mechanism the present invention incorporates an additional pin in the complemental pin section 810 of the units order. Therefore, in the above problem the amount added to 23 would be 99999986 so that the result obtained upon addition is 0000009. This feature is of express importance when the machine is to perform multiplication at the highest possible speeds since the time needed in conventional mechanism for the operation of the end around carry mechanism is completely eliminated. It should therefore again be noted that in the rightmost column of complemental pins there are ten pins 810 while in each other order of complemental pins there are only nine pins 810. The tenth pin 810 in the rightmost column is always in its forward position.

As previously set forth the present machine has a product register which includes 20 pinions while the multiplicand unit is adapted to receive an 11 digit multiplicand. Therefore, from the above description of the manner in which subtraction is performed by the addition of complements it is seen that means must be provided during such addition of complements for adding 9 into each of the nine product pinions disposed to the left of the highest order column of movable pins in the multiplicand unit. To avoid the cost which would be incurred through the use of movable pins in the nine higher orders of the multiplicand section a solid block of steel is cut so that nine columns each having nine individual stationary toothed surfaces therein corresponding in shape to the ends of the pins 810 is provided. This block 820 is seen in FIG. 28 to be supported by the shafts 816 and 817 and is manufactured by first milling the arcuate slots 820A therein and then cutting the various toothed surfaces by means of horizontal milling. Since the product pinion can only be aligned with one or the other of the two sets of pins in the multiplicand register it is seen that there is no need for any pins or toothed surfaces in the block 820 corresponding to the true value of the multiplicand digits in the nine higher orders since said nine higher orders are always equal to zero.

The mechanism for controlling the entry of amounts into the multiplicand section is illustrated in FIG. 20 and includes the coupling interposer 648 which is moved downwardly by the multiplicand control slide 563 during the cycle of operation initiated by the multiplicand key. The downward movement of the interposer 648 causes the lug 828A on the lever 828 to become coupled with the power driven add slide 636. Accordingly, the forward movement of the slide 636 during the second half of a machine cycle serves to pull the lever 828 forwardly and rock the lever 830 connected thereto in a clockwise direction against the urge of the restoring spring 831. The lever 830 is pinned to a shaft 832 supported for rotation by a stationary frame and having a cam lever 833 pinned thereto. The cam lever 833 has a cam slot cut therein which receives the stud 834A extending to the left from the upper end of a lever 836 pinned to a cross shaft 837.

A pair of identical levers 838R and 838L are also pinned to the shaft 837 and each is provided with a slot in the upper end thereof which receives a slotted cross bar 839 which passes through the elongated slots in each of the multiplicand add racks 804. A small plate 840 is screwed to the side of each of the levers 838L and 838R and has an inwardly extending lug 840A which serves to hold the bar 839 within the slots of the levers 838L and 838R. Thus it will be seen that the shaft 837 is normally in its clockwise position where the multiplicand add racks 804 will be held disengaged from the gears 802. During the second half of a cycle of operation initiated by the multiplicand key the shaft 837 will be rocked counterclockwise to bring each of the multiplicand add racks 804 into mesh with the gears 802 so that the forward movement of the horizontal add racks 68 will transfer the amount previously set in the machine by the operation of the numerical keys into the pins of the multiplicand unit. Since the racks 801 and 811 are moved in opposite directions by the multiplicand add racks 804 the multiplicand unit will have set therein not only the true value of the multiplicand (in pins 800) but also the nines complement thereof (in pins 810). It should be noted that in addition to the complement of the multiplicand which is set in the complemental pins 810 there is provided an additional pin 810B in the units order of the complemental section so that an end around carry mechanism is not required.

As described hereinafter the multiplicand section is positively driven to the right to its home position during the second cycle of the main machine driveshaft which occurs automatically (as described hereinafter) to total the product from the product register. Since the multiplicand unit at the time that it reaches its rightward home position has an amount set therein, means must be provided for clearing said amount prior to the time that a new multiplicand is entered therein. In the use of a calculating machine it is often desirable to retain a multiplicand as a constant factor so that a series of multiplier numbers can be multiplied by the multiplicand. Therefore, in the machine of the present invention the multiplicand remains set in the multiplicand unit at the end of a multiplying operation after the product has been totaled from the product register. Therefore, the same multiplicand can be used for a subsequent multiplication operation merely by the entry of a new multiplier into the multiplier unit by the operation of the multiplier key.

When a new multiplicand is entered into the machine by the operation of the multiplicand key the multiplicand unit is zeroized during the first half of the multiplicand entry operation and prior to the time that the multiplicand add racks 804 are moved downwardly to positions determined by the amount set through the operation of the numerical keys. The multiplicand clearing mechanism is illustrated in FIGS. 27 and 31 and includes a lever 850 pivoted at 851 and having a leftwardly extending lug which is disposed beneath a stud carried by the coupling lever 828 shown in FIG. 30 as being coupled with the slide 829 in response to the operation of the multiplicand key. Since the slide 829 moves forwardly during the second half of the machine cycle a different means must be provided for zeroizing the multiplicand unit during the first half of the multiplicand entering cycle of operation. To this end a power driven slide 852 is driven rearwardly during the first half of each machine cycle to provide power to clear the multiplicand unit. To this end the bellcrank lever 850 (FIG. 27) has a leftwardly extending stud 850A which is positioned beneath the rear end of a coupling lever 853 pinned to a horizontal rack 854. The lever 853 has a rightwardly extending lug 853A which is moved into an opening in the slide 852 when the coupling lever 853 moves counterclockwise. Accordingly, slide 854 is positively driven rearwardly during the first half of a multiplicand entering operation.

As seen in FIG. 21 the upper rear geared surface of the rack 854 is engaged with a first gear 857 pinned to a shaft 858 supported by a stationary frame and having a gear 859 secured thereto. Gear 859 is in turn engaged with a geared slide 860 supported by stud and slot connections on the right side of the frame 863 in a manner such that when the shaft 858 is rotated counterclockwise by the rearward movement of the slide 854 slide 860 will be driven downwardly. The upper front surface of slide 860 is geared and is in mesh with a gear 861 which is free to rotate on a shaft 862 which passes through the frame 863 and is secured to the right frame 818R of the multiplicand unit. A three-pronged coupling member 864 is secured to the right side of gear 861 and has three studs therein which engage the three splines provided in the right end of the shaft 862. The arrangement is such that the shaft 862 can move in a horizontal direction along with the multiplicand unit but yet the angular position of the shaft 862 will be controlled by the gear 861. A small bracket 866 screwed to the frame 863 holds the coupling member 864 and the gear 861 against lateral movement and is provided with a hole therethrough to permit lateral movement of the shaft 862.

The left portion of the shaft 862 has a flat cut thereon and a gear 868 supported thereby in a manner such that the angular position of the gear 868 will be controlled by the shaft 862 and yet the shaft 862 can move laterally independently of the gear 868. A gear 869 pinned to the shaft 813 which supports the gears 812 is constantly in mesh with the gear 868. The shaft 813 will be seen in FIG. 32 to have a V-shaped opening cut therein throughout the length thereof so that the individual restoring members 870 disposed between adjacent ones of the gears 812 will be rotated in response to the rotation of shaft 813. As seen in FIG. 32 each of the restoring members 870 has an inwardly extending driving surface 870A which is disposed within the V-shaped slot in shaft 813 but is of a smaller dimension than the slot so that there can be a small amount of relative movement between the shaft 813 and the restoring members 870. As seen in FIG. 31 each of the gears 812 has a rightwardly extending rectangular lug 812A which is coplanar with the rectangular lug 870B on the associated restoring member 870. The arrangement is such that when the shaft 813 is rotated in a counterclockwise direction the lugs 870B will engage the lugs 812A and thereby restore each of the gears 812 to their zero positions. Since the gears 812 are effectively coupled with each of the racks 801 and 811 it will be seen that each of the orders of the multiplicand unit will be zeroized in response to the counterclockwise rotation of the shaft 813, said counterclockwise rotation being provided by the downward movement of the slide 860.

To avoid any movement of the pins 800 and 810 which might tend to occur during the time that the product pinions are engaged therewith and undergoing movement with respect thereto, a blocking bail 880 pivoted at 881 and 882 on the multiplicand frame and urged in a counterclockwise direction by spring 883 is provided (FIG. 31). This bail 880 extends across and is engageable with each of the gears 812 and hence serves to normally hold each of the gears in a fixed position. Since the gears must be free to rotate during the entry of the multiplicand digits the blocking bail 880 is provided with a downwardly extending nose 880A at its left end which is engaged by a rightwardly extending lug 840A on the upper end of the plate 840 secured to the lever 838L (FIG. 30). Therefore, when the multiplicand add racks 804 are moved forwardly into engagement with the gears 802 the blocking bail 880 will be rocked in a clockwise direction away from the gears 812 to permit free rotation thereof.

The gears 812 must also be free to rotate during the zeroizing operation and therefore the right end of the bail 880 carries a rightwardly extending stud 880B (FIG. 31) which overlies a pair of cams 886 and 887 on the flatted portion of the shaft 862. The flatted portion of the cam 886 is matched with the flatted surface on the shaft 862 and therefore there is no relative movement between the shaft 862 and the cam 886. Accordingly, as soon as the shaft 862 starts to rotate in a clockwise direction the stud 880B will be cammed upwardly to cause the bail 880 to be rocked clockwise and release the gears 812 for the zeroizing operation. Since the shaft 862 rotates through 360° it will be seen that if the cam 886 were the only means holding bail 880 in an inactive position the stud 880B would fall back into the low portion of the cam 886 as the shaft 862 approached its most clockwise position. This return of the bail 880 to its gear blocking position would interfere with the zeroizing operation and must be prevented. To this end the shape of the center portion of the cam 887 with respect to the flat on the shaft 862 is as illustrated in FIG. 33. It will be seen in FIG. 33 that the shaft 862 undergoes a small degree of rotation independently of the cam 887 until the left end of the flatted portion thereof comes into engagement with the notched surface 887A on the cam 887. Accordingly, the cam 887 will lag the cam 886 during the clockwise rotation of shaft 862 and hence will be in a position to hold the stud 880B in its elevated position during the time that the shaft 862 is completing its clockwise rotation and at the time that the cam 886 is ineffective to hold the stud 880B elevated. Likewise, when the shaft 862 starts its counterclockwise movement to its home position as the rack 860 is driven upwardly the cam 886 will lead the cam 887 and will return to an effective position for holding the stud 880B elevated during the time that relative movement takes place between the cam 887 and the shaft 862. After the shaft 862 has undergone a sufficient degree of counterclockwise rotation toward its home position to engage the flatted portion of the central cut in cam 887 the two cams 886 and 887 will move in synchronism to their initial home positions of FIG. 31.

From the above it will be seen that during the first half of each cycle of operation of the main driveshaft which is initiated by the multiplicand key the multiplicand section will be zeroized. During the second half of such multiplicand entering cycle of operation the cams 886 and 887 will hold the bail 880 in an ineffective position so that the entry of the new multiplicand into the multiplicand unit can be effected as the horizontal add racks are driven forwardly to their home positions.

*Multiplier*

As described previously, the machine of the present invention is provided with a register 900 (FIG. 4) which is used for storing multiplier digits and includes ten individual multiplier pinions 901. As described in connection with the entry of a multiplicand, the add racks 68 serve to drive the vertical racks 806 (FIG. 4) downwardly during the first half of a machine cycle to positions corresponding to an amount indexed on the keyboard. Then during a second portion of a machine cycle the racks 68 are power driven forwardly and hence the vertical racks 806 are driven upwardly. Prior to such upward movement of the racks 806 the multiplier pinions 901 are engaged therewith and hence this movement of the racks 806 is utilized to transfer amounts into the multiplier pinions 901. The apparatus which controls the movement of the pinions 901 into engagement with and away from the racks 806 is illustrated most clearly in FIGS. 38, 41 and 42.

Referring now to FIG. 41 there will be seen a portion of the power driven add slide 636 together with the means for controlling the entry of multiplier digits into the multiplier register. It should be noted that FIG. 41 is a view taken from the left side of the apparatus and further that the terms clockwise and counterclockwise are used throughout with respect to the motion observed by a person viewing the apparatus from the right-hand side, above, or in front of the machine. As described in connection with the operation control mechanism the interposer 646 (FIG. 41) is moved downwardly in response to the downward drive of the multiplier function control slide 564. The lower horizontal surface 646A of the sensing interposer 646 will be seen to overlie the nose of a small lever 911 pinned to the bottom end of a lever 912 supported for rotation by means of a pin 912A extending from a vertical main frame. A small spring connected to the levers 911 and 912 serves to constantly urge lever 911 in a clockwise direction and hence normally maintains the interposer 646 in its upward position. When the interposer 646 moves downwardly the lug 911A will be moved into the rectangular opening provided in the upper surface of the power slide 636. Thus it will be seen that the subsequent movement of the slide 636 during the second half of a machine cycle (in a forward direction) will cause the lever 912 to be driven clockwise (counterclockwise in FIG. 41). The upper end of the lever 912 is coupled with the downwardly and rearwardly extending end of a lever 913 pinned to lever 913A and hence said lever 913 will be rocked counterclockwise in response to such forward movement of the slide 636. The forwardly extending arm of lever 913 has a cam slot therein which encompasses a stud 914A carried on the lower end of a lever 914 pinned to a shaft 915. Shaft 915 is further seen in FIG. 42 as having a pair of power arms 1483 and 1485 pinned thereto. These arms in turn carry the multiplier pinion supporting shaft 916. Thus it will be seen that when shaft 915 is rocked counterclockwise (clockwise in FIG. 41) the multiplier pinions 901 will move rearwardly into mesh with the vertical racks 806. Accordingly, the multiplier digits indexed on the keyboard will be entered into the multiplier pinions during the second half of the first cycle of operation initiated by the multiplier key. Following the entry of the multiplier digits into the multiplier register a high speed driveshaft will be coupled with the product register shaft under the control of a multiplier sensing pawl in the manner to be described. Each time the product register completes a revolution the active one of the multiplier pinions then controlling a high speed clutch mechanism is stepped one unit toward its zero position in a manner now to be described.

As mentioned earlier, the machine is adapted to perform multiplication using the "shortcut" method wherein if a multiplier digit is greater than 5 the multiplicand is subtracted by a number of times corresponding to the "tens complement" of the multiplier digit and then added ten times. The addition of the true amount ten times is actually accomplished by changing the physical relationship of the product register and the multiplicand by one step and adding the multiplicand once.

To facilitate this shortcut system of operation the multiplicand unit has stored therein each multiplicand digit together with the "nines" complement thereof. Accordingly, the subtraction of the multiplicand from the product register is accomplished by adding the "nines" complements of the multiplicand digits to the product register. This method of storing the complements of the multiplicand digits in the multiplicand unit is of particular value in the machine of the present invention since it enables uninterrupted movement of the multiplicand unit and eliminates the need for reversing the direction of rotation of the product register. This in turn makes possible an extremely high speed multiplication and division apparatus.

Figure 42:
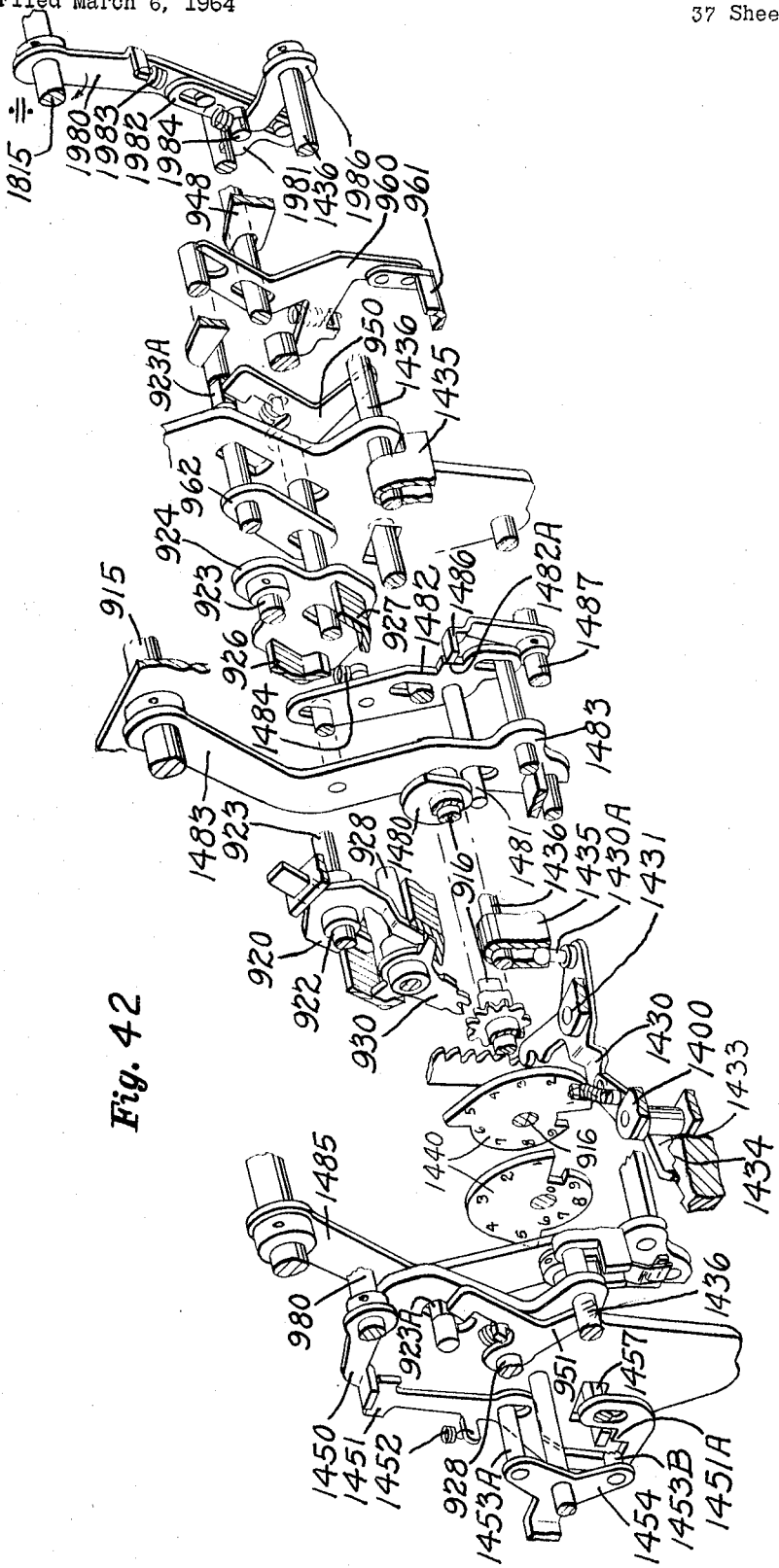
FIG. 42 is a left front perspective view of the multiplier-quotient counting apparatus with the parts separated illustrating the manner in which the counting takes place and the manner in which location of the pin carriage is controlled.

After the multiplier digits have been stored in the multiplier register the mechanism illustrated in FIGS. 38, 41 and 42 is utilized to sequentially step the multiplier pinions to their zero positions as the multiplication takes place. It should be noted that when a multiplier digit is equal to or less than 5 the pinion must be stepped to its zero position and cause the product register to rotate by a number of times equal to that digit. Accordingly, in those orders having a digit which is equal to or less than 5 the pinions are stepped in a clockwise direction toward their zero positions (which requires a number of steps equal to the value of the multiplier digit). When a multiplier digit is greater than 5 the pinion is stepped in a counterclockwise direction to its home position so that the number of steps required to bring the pinion to its zero position will be equal to the "tens" complement of the multiplier digit. It should be noted that when the term "complement" is used in connection with the multiplier digits the "tens" complements are intended.

The machine is provided with a single multiplier pinion restoring pawl 920 (FIGS. 38 and 42) which is coupled with a sliding block 1400 and plate 1400A attached thereto by means of a small bracket 921 screwed to the bracket 1400A in the manner illustrated in FIG. 34. The arrangement is such that the restoring pawl 920 is free to reciprocate upwardly and downwardly but cannot move in a lateral direction independently of the sliding block 1400. Accordingly, the lateral position of the restoring pawl 920 is controlled by the sliding block 1400 which is in turn under the control of a multiplier sensing pawl described hereinafter. The restoring pawl 920 is carried by a sleeve 922 which is free to slide upon a movable supporting shaft 923 (FIGS. 38 and 42). The shaft 923 is carried by a pair of movable frame members 924 (one of which is illustrated in FIG. 42) which are interconnected by the opposed guide plates 926 and 927. Disposed beneath the shaft 923 which carries the restoring pawl 920 is a second movable shaft 928 carried by a pair of driving arms 948 (one of which is shown in FIGS. 41 and 42). The arrangement is such that the two shafts 923 and 928 can be moved simultaneously during a first portion of the rotation of the product register and thereafter the shaft 923 can be given an additional downward movement to cause the restoring pawl 920 to come into engagement with a selected one of the plurality of driving interposers 930 which are supported on the shaft 928 for independent rotation thereon. It should be noted that the pawl 920 has first and second downwardly extending driving arms 920A and 920B which are disposed in different vertical planes (see FIG. 38). The spacing of the two arms 920A and 920B is such that only one of the two arms can ever be aligned with the driving surfaces on the interposers 930. Referring now to FIG. 38 it will be seen that when the arm 920A is aligned with a driving interposer 930 the downward movement of the shaft 923 when the shaft 928 is held stationary will cause that driving interposer to be rocked in a counterclockwise direction as viewed from the right side of the machine (in a clockwise direction in FIG. 38). In a similar manner the downward movement of the shaft 923 when the shaft 928 is held stationary and the arm 920B is aligned with a driving interposer will cause said interposer to be rocked in a clockwise direction (counterclockwise in FIGS. 38 and 38A).

The means for driving the shafts 923 and 928 is seen in FIG. 41 and includes a pair of cams 940 and 941 carried by the product register shaft 706. A first lever 942 pinned to a shaft 943 carries a roller 942A which is engaged with the cam 940. The upper rearwardly extending arm of the lever 942 overlies the shaft 923 and therefore each time the product register rotates the lever 942 will be rocked clockwise (counterclockwise in FIG. 41) and thereby drive the shaft 923 downwardly. A second lever similar to the lever 942 is pinned to the shaft 943 near the left end of the multiplier unit and overlies the left end of the shaft 923 to provide a uniform parallel drive for the shaft 923. A lever 948 carrying a pair of rollers 948A and 948B which are engaged with the cam 941 is pinned to the shaft 949 so that when the product register rotates the lever 948 will be moved first clockwise and then counterclockwise. As seen in FIGS. 41 and 42 the rearwardly extending arm of the lever 948 is slotted and encompasses the right end of the shaft 928. A lever similar to the lever 948 is pinned to the shaft 949 near the left end of the multiplier unit and is similarly forked and carries the left end of the shaft 928. The shape of the cams 940 and 941 is such that as the product register rotates the shafts 928 and 923 will move downwardly in unison until each of the driving interposers 930 comes into mesh with an associated one of the multiplier pinions. After the driving interposers 930 are engaged with the multiplier pinions the shaft 928 is held stationary by means of a constant radius on the cam 941 while the radius of the cam 940 continues to increase and thereby drive the shaft 923 downwardly by an additional amount sufficient to cause one of the driving interposers 930 to be rocked either clockwise or counterclockwise about the shaft 928 depending upon which one of the arms 920A or 920B is aligned with the active multiplier order. Accordingly, it is seen that the active one of the multiplier pinions will be restored by one step toward its home position each time the product register undergoes a revolution. It should be noted that the guide frames 926 and 927 carried by the frames 924 which support the shaft 923 hold the driving interposers in proper alignment for proper meshing with the multiplier pinions as the shafts 923 and 928 move downwardly toward said pinions. Since the frames 926 and 927 move with the shaft 923 they move away from the driving interposers after the shaft 928 has reached its lowermost position and therefore the selected one of the driving interposers will be free to rotate under the drive provided by the restoring pawl 920.

It will be seen in FIG. 42 that the outer ends of the shaft 923 are cut to provide rectangular surfaces 923A on the outer sides of the multiplier main frames. A pair of spring urged latches 950 and 951 are adapted to move over the top of the shaft 923 when it reaches its lowermost position after having driven a selected one of the driving interposers in a clockwise or counterclockwise direction. Thereafter as the cam 941 returns the lever 948 to its home position and in so doing elevates the shaft 928 the shaft 923 will be held against upward movement. Such holding of the shaft 923 against upward movement prevents the active driving interposer 930 from returning to its central normal position and therefore the pinion which was rotated by the downward movement of shaft 923 will remain in its rotated position. It will be seen that the latches 950 and 951 are supported by the shaft 928 and therefore as the shaft 928 moves upwardly the latches 950 and 951 will also move upwardly. Each latch 950 and 951 has a forwardly extending nose which underlies a shaft 1436 (described hereinafter) (FIG. 42) and therefore after the shaft 928 has moved upwardly by an amount sufficient to move the driving interposers away from the pinions the noses on the latches will engage the shaft 1436. This rocks the latches counterclockwise and releases the shaft 923 which then returns to its uppermost position. In this manner a selected one of the pinions is positively driven stepwise toward its home position without any tendency for said pinion to bounce back to the position which it was in prior to the drive thereof by the restoring pawl 920.

It should be noted that the shaft 923 which carries the restoring pawl 920 passes through the frames by means of elongated slots provided therein and also that the drive means for said shaft includes the levers 942 which overlie the top edge of the shaft. Therefore, additional means in the form of the two levers 960 (one of which is shown in FIG. 42 on the right side of the main frame) which have elongated slots in their upper ends are provided for receiving and guiding shaft 923. There two levers are interconnected by means of a bail 961 which passes in front of the multiplier register. An additional pair of plates 962 (one of which is shown in FIG. 42) serves to further couple the shafts 923 and 928. The lower openings in the plates 962 are elongated to allow relative movement between the shafts in the manner described above.

In summary the mechanism is seen to operate in the following manner: shafts 923 and 928 move downwardly until the driving interposers 930 are in mesh with the pinions; shaft 928 is stopped; shaft 923 continues downwardly to rotate one of the interposers 930; latches 950 and 951 lock the shafts 923 and 928 together; shaft 928 is driven upwardly and shaft 923 moves therewith until the interposers 930 have cleared the pinions; and then the latches 950 and 951 are released to permit shaft 923 to return to its uppermost position under the urge of a spring seen in FIG. 41. Therefore, it is seen that the multiplier pinions are sequentially stepped to their zero positions in response to the rotation of the product register, the active one of the multiplier pinions being determined in accordance with the operation of the sensing pawl 1430 described hereinafter.

During the performance of shortcut multiplication it is necessary that when a multiplier digit is greater than five the adjacent higher order multiplier digit be increased by one. Therefore, means is provided for adding one into an adjacent higher order when a given multiplier pinion is rotated from its nine position to its zero position during the restoration of the pinion to its zero position by the driving pawl 920. The mechanism for so advancing an adjacent higher order pinion is shown in FIGS. 39 and 39A and includes a cam plate 970 having a plurality of upstanding cam surfaces 971 positioned between adjacent orders of the multiplier pinions 901. A transfer element 972 made of spring steel is riveted on the left side of an individual plate 1440 associated with and secured to each pinion 901. Each transfer element 972 is provided with first and second leftwardly extending surfaces 972A and 972B. The arrangement is such that when a pinion is driven in a counterclockwise direction from its "eight" position to its "nine" position a cam surface 971 will engage a lug 972A and cause the transfer member 972 to be cammed to the left so that the lug 972B is engaged with one of the rightwardly extending portions 901A of the adjacent higher order pinion. Thereafter when the lower order pinion is driven from its "nine" position to its "zero" position the lug 972B will cause the adjacent higher order pinion to be advanced counterclockwise by one step. Therefore, the necessary transfer from a lower order pinion having a value set therein greater than five to an adjacent higher order pinion to accommodate the shortcut multiplication feature will be accomplished. It should be noted that the shape of the cam surfaces 971 and lugs 972A are such that the transfer operation will occur only when a given pinion is moving in a counterclockwise direction and from its "nine" position to its "zero" position and will have no effect on an adjacent higher order pinion when a lower order pinion moves in a clockwise direction from its "one" to its "zero" position.

It has been previously mentioned that when the machine performs a multiplication operation the depression of the multiplier key not only causes the necessary machine cycle for entry of the multiplier digits into the multiplier register but also causes an automatic machine cycle for the printing of the product. It should be emphasized at this point that when the term "machine cycle" is used reference being made to a cycle of the main machine driveshaft 225. It should also be emphasized that the shaft which supports the product dividend register is rotated at a substantially higher speed than is the main machine driveshaft.

Since the actual multiplication requires rotation of the product register following the entry of the multiplier digits it will be seen that the second cycle of operation of the main driveshaft 225 required for the printing of the product must be held in abeyance until the actual multiplication process has been completed. The manner in which the multiplier key serves to cause the two cycles of operation of the main driveshaft with the second cycle being held in abeyance until completion of the multiplication process is most easily understood in connecton with FIGS. 14 and 15.

Figure 14:
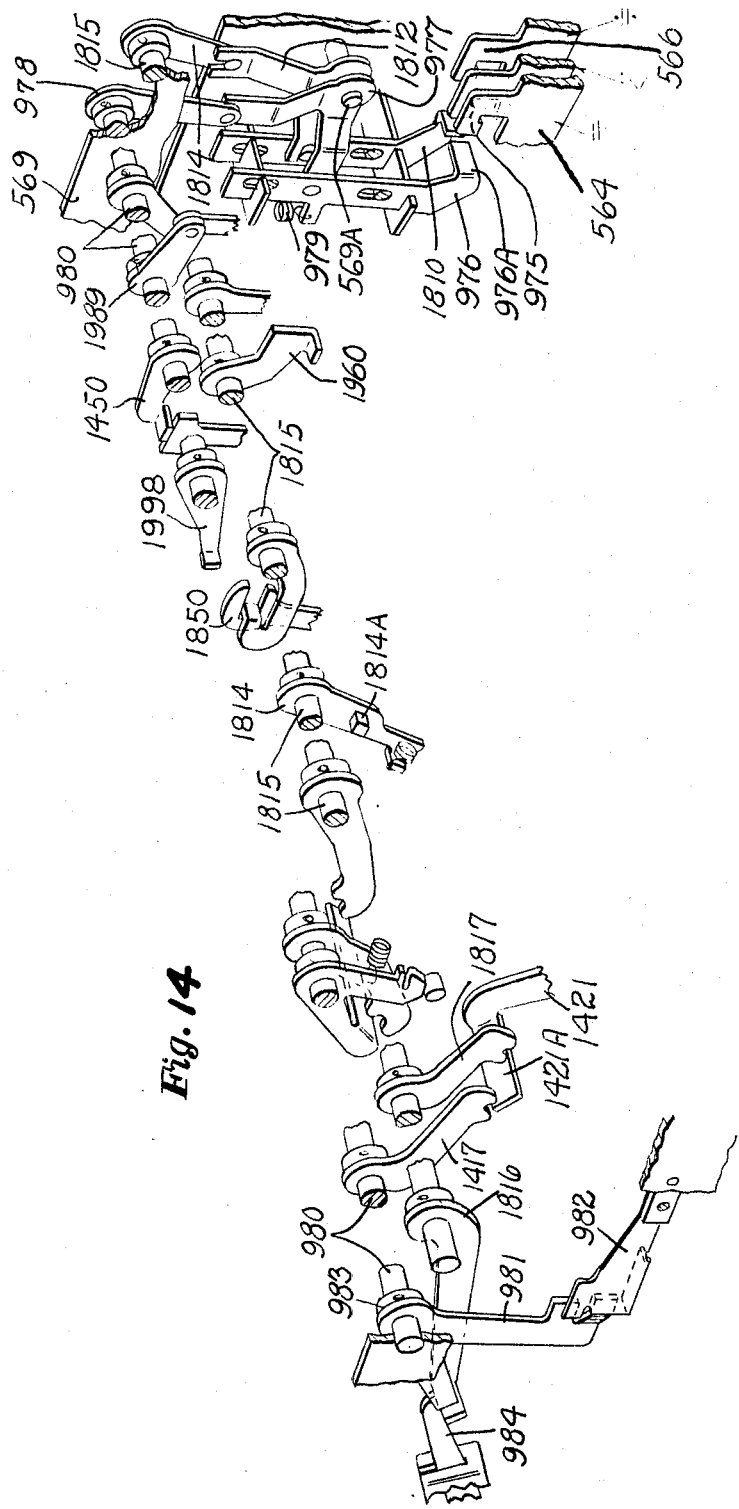
FIG. 14 is a perspective view from the front left showing two of the shafts and associated levers which are moved by the function control apparatus for controlling a plurality of parts at various locations throughout the machine.

Referring now to FIG. 14 it will be seen that the function control slide 564 which moves rearwardly upon depression of the multiplier key is provided with a rearwardly extending lug 975 which upon rearward movement of the slide 564 to its rearmost position becomes disposed over the top of the rightwardly extending lug 976A on the lower end of a connecting link 976. The connecting link 976 is supported by means of studs extending to the left from the frame 569 and is guided by means of a pair of slotted guide plates also secured to the frame 569. The link 976 is pinned to a rearwardly extending arm of a lever 977 pivoted on a stud 569A extending to the lever from the frame 569. The upper end of the vertical arm of the lever 977 is slotted and has disposed therein a stud carried at the end of a lever 978 pinned to a shaft 980. A small spring 979 connected to the link 976 serves to urge the link upwardly and hence tends to maintain the shaft 980 in clockwise position.

From the above it will be seen that during the first cycle of operation of the main driveshaft 225 which occurs in response to the operation of the multiplier key the downward movement of the function slide 564 will cause the link 976 to be driven downwardly and hence the shaft 980 will be driven counterclockwise. A lever 981 is pinned to the left end of the shaft 980 and is normally in engagement with a flat spring member 982 which acts as a latch as soon as the shaft 980 is rocked counterclockwise. That is, as seen near the left side of FIG. 14 the lever 981 is so shaped that the left-hand surface thereof is normally engaged with the end of the spring latch 982. However, as soon as the shaft 980 rocks counterclockwise the spring latch 982 moves clockwise and hence becomes engaged with the front edge of the lever 981 to thereby hold the shaft 980 in its counterclockwise position. The shaft 980 is held in its counterclockwise position by the spring latch 982 until the multiplication process has been completed at which time means described hereinafter operates to move the spring latch 982 counterclockwise and hence release the shaft 980 for return to its clockwise normal position.

An additional lever 983 will be seen to be pinned to the left end of the shaft 980 immediately adjacent the lever 981. The rear end of the lever 983 is bent over to form a lug which is disposed beneath the upper front end of a lever 984 which is seen in FIG. 15 to be supported for rotation on the shaft 687. Referring to FIG. 15 it will be seen that the lever 984 is provided with a rightwardly extending stud 984A which is disposed in front of the vertical surface provided on the rear arm of a bellcrank lever 985 supported by the stud 679. A small spring 986 connected to the stud 984A and to the rear arm of the lever 985 serves to maintain the lever 985 under the control of the lever 984. The front arm of the bellcrank lever 985 is provided with a latching nose similar to that on the lever 678 previously described in connection with the machine drive apparatus. It will be seen in FIG. 15 that the latching surface on the lever 678 is normally in engagement with the lug 677A on the lever 677 whereas the latching nose on the lever 985 is normally disposed rearwardly of the lug 677A. Therefore, the lever 985 when in its normal position (as illustrated in FIG. 15) has no effect on the lever 677 and hence has no effect on the cycling of the main driveshaft 225.

From the above it will be seen that when the shaft 980 (FIG. 14) is rocked counterclockwise the lever 984 (FIG. 15) is rocked clockwise and hence the bellcrank lever 985 moves counterclockwise to a position where the latching surface thereof is adaptable to the lug 677A upon the lever 677. As seen in FIG. 9 and as described in connection with the manner of operation of the multiplier key, the cycle initiating shaft 517 is held in a clockwise position as long as the operated function control slide is in a rearward position. Thus it will be seen that after the main driveshaft 225 has completed the first cycle of operation initiated by the depression of the multiplier key the function control slide 564 will still remain one step rearwardly of its home position and hence the shaft 517 remains in its clockwise cycle initiating position. That is, as described in connection with FIG. 15, the bellcrank lever 678 which normally serves to latch the lever 677 in a position such that the motor is not connected with the driveshaft 225 is held in a nonoperative position. However, since the second latching bellcrank lever 985 is moved to its counterclockwise position in response to the movement of the shaft 980 to its counterclockwise position it will be seen that near the end of the first cycle of operation of the main driveshaft 225 the lever 677 will become latched by the bellcrank lever 985. Accordingly, a second cycle of the main driveshaft 225 is prevented even though the shaft 517 (FIGS. 7 and 15) is held in a position such that a second cycle of operation of the main driveshaft 225 would normally take place. In this way the second cycle of the main driveshaft 225 required for printing of the product is held in abeyance until the multiplication process has been completed in the manner to be described below.

*Multiplier sensing and control*

After the multiplier has been stored in the multiplier register and the multiplicand has been stored in the pin carriage the position of the pin carriage with respect to the product-dividend register must be controlled in accordance with the various values established in the multiplier register. Accordingly, as seen in FIG. 34 the restoring pawl 920 which sequentially returns the multiplier wheels to their zero positions is coupled with the multiplicand section. To this end the multiplier sensing and drive mechanism includes a heavy sliding block 1400 supported on a fixed guideway 1401. A coupling pin 1402 is supported in the right end of plate 1400A secured to the rear surface of the sliding block 1400 and is adapted for movement in a vertical plane for selectively coupling the block 1400 with an escapement member 1403 secured to and part of the upper frame of the multiplicand section (see FIG. 28). Normally the coupling pin 1402 is in its downward position disposed within one of the nine horizontal slots provided in the upper right end of the escapement member 1403, and therefore the multiplier sensing and restoring mechanism and the multiplicand carriage will move together as a unit. As further seen in FIG. 34 a cable 1405 secured to the left end of the multiplicand carriage and to a coil spring 1404 serves to constantly urge the multiplicand carriage to the left. The escapement member 1403 is provided with a first set of heavy escapement teeth 1403A which are adaptable to the heavy escapement pawls 1406 and 1407 (FIG. 43B) supported on stud 1408A of the lever 1408. When the pin carriage is in its rightmost position the escapement pawl 1406 will be engaged with the heavy teeth 1403A and will hold the carriage against leftward movement. Once the multiplication operation has been initiated the position of the carriage must be controlled by the multiplier unit, and therefore as described hereinafter the heavy pawls 1406 and 1407 are disabled during a multiplication operation and a third pawl controlled by the multiplier unit serves to control the position of the pin carriage.

As seen in FIG. 14 the shaft 980 previously described has a lever 1417 pinned thereto just to the right of the lever 983. Lever 1417 has a forwardly extending portion which overlies the leftwardly extending lug 1421A on the lever 1421 (FIG. 43A) pivoted on the stationary stud 1422. Lever 1421 is spring urged counterclockwise and carries a rightwardly extending lug near its lower end which is disposed between first and second vertical lugs on a small control slide 1423 supported for forward and rearward movement by means of slots therein which encompass studs on a lever 1427. The slide 1423 is positioned immediately adjacent a power driven lever 1424 having a cam surface at its front end which is engageable with a stud 1425 carried by a cam on the main driveshaft. From FIG. 43A it will be seen that near the end of every cycle of operation of the main driveshaft the lever 1424 will be rocked clockwise. The lever 1424 is provided with a rightwardly extending lug 1424A near its rear end which overlies the slide 1423. When the slide 1423 is in its rearward position the lug 1424A is disposed above an opening in the slide 1423 and therefore movement of lever 1424 normally has no effect on slide 1423. However, when the slide 1423 is moved forwardly by the lever 1421 the upper surface thereof will be aligned with the lug 1424A and hence the first cycle of operation of the main driveshaft resulting from depression of the multiplier key will cause the slide 1423 to be rocked clockwise about the shaft 1426. The studs which support slide 1423 are carried by a lever 1427 having a rearwardly extending lug 1427A (FIG. 43B) which overlies the left ends of the heavy pawls 1406 and 1407. Thus it is seen that when the slide 1423 is rocked clockwise the lever 1427 will likewise be moved clockwise and thereby lift the pawls 1406 and 1407 away from the heavy escapement teeth 1403A which are part of the multiplicand section. A latch pawl 1428 is spring urged in a clockwise direction in a manner such that as soon as the lever 1427 is rocked clockwise the latch pawl can move to its most clockwise position where its downwardly extending lug will overlie the lug 1427A and hold the pawls 1406 and 1407 ineffective.

From the above it will be seen that near the very end of the first cycle of operation which is initiated in response to the depression of the multiplier key the heavy escapement pawls 1406 and 1407 will be moved to inactive positions and held in such inactive positions throughout the multiplication operation. As previously described the operation of the multiplier-product key causes the high speed driveshaft to be rotated. However, the multiplication operation cannot be initiated until the proper relationship between the multiplicand storage and the product register has been established. Therefore, the clutch which couples the high speed shaft to the product register shaft remains disabled and under the control of the multiplier sensing and restoring mechanism illustrated in FIGS. 37, 42 and 43A.

Figure 36:
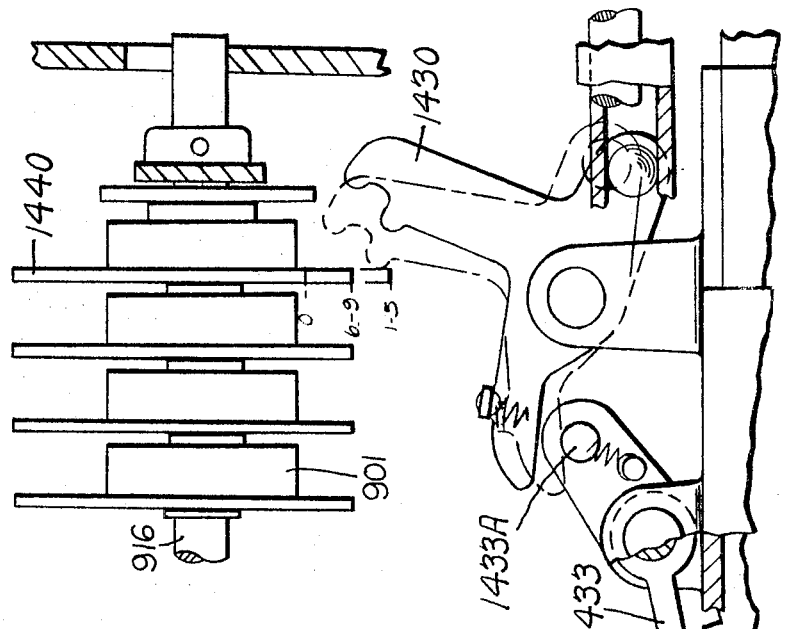
FIG. 36 is a top view of the multiplier sensing and pin carriage position control apparatus in its normal home position.
Figure 37:
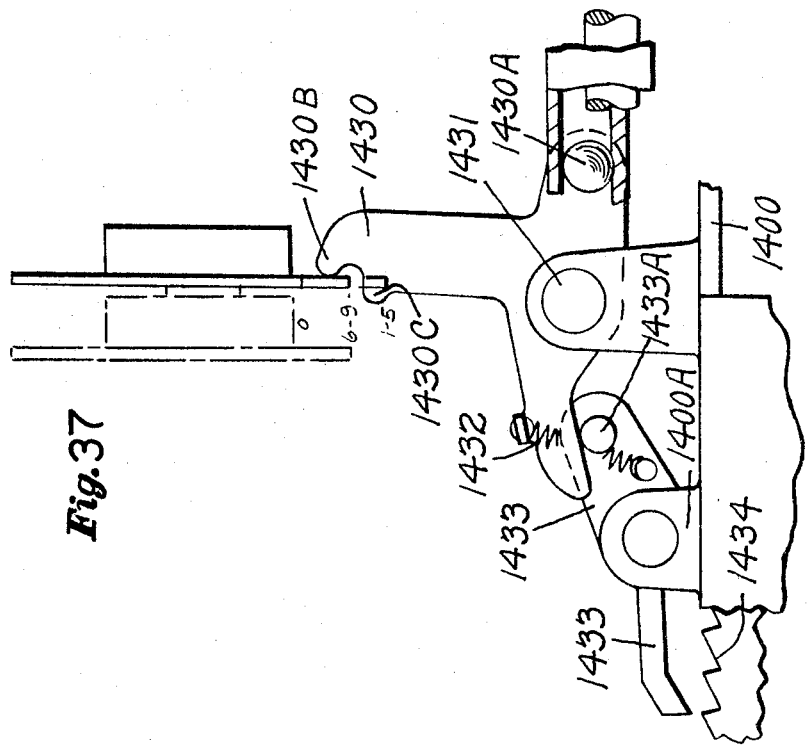
FIG. 37 is a top view of the same parts shown in FIG. 36 but with the parts moved to their respective positions occupied when a digit is being sensed in the multiplier-quotient unit.

Referring now to FIGS. 36, 37 and 42 there will be seen a sensing pawl 1430 pivoted on a bracket 1431 carried by the heavy block 1400 (FIG. 34). A spring 1432 connected to the left end of the pawl 1430 and to the right end of a small escapement pawl 1433 similarly pivoted on a small bracket carried by the block 1400 urges the sensing pawl 1430 counterclockwise and the escapement pawl 1433 clockwise. The left end of the pawl 1433 is selectively engageable with the teeth 1434 on the stationary escapement rack or guideway 1401, said pawl 1433 being held away from the teeth 1434 when the multiplicand unit and multiplier sensing pawl 1430 are in their rightmost positions. This is illustrated in FIG. 37 wherein the parts are illustrated with the multiplicand section in its rightmost position. In this drawing it will be seen that the nose of the pawl 1433 is positioned slightly to the right of the teeth 1434 while the heavy escapement pawl 1406 is engaged with the heavy teeth 1403A on the escapement rack 1403 which is part of the multiplicand pin carriage. Therefore, when the carriage is in its rightmost position the heavy pawl 1406 serves to hold it against the leftward force applied thereto by the heavy spring 1404. This prevents undue stress upon the relatively light pawl 1433. This is of great importance since the pawl 1433 during the time that it moves into engagement with the stationary rack 1434 is under the urge of the light spring 1432 which is the only force being provided to position the sensing pawl 1430 as well as the pawl 1433.

The sensing pawl 1430 as seen in FIGS. 37 and 42 carries a vertical stud 1430A having a spherical portion on the upper end thereof disposed between the sides of a U-shaped member or tunnel shaft 1435 connected to and disposed about a shaft 1436. The arrangement is such that the sensing pawl 1430 is free to move in a horizontal direction with the heavy block 1400 independently of the shaft 1436 but the angular position of the shaft 1436 will be controlled by the sensing pawl 1430. That is, the stud 1430A being disposed within the U-shaped member 1435 will render the shaft 1436 responsive to the position of the sensing pawl 1430. As described in connection with the multiplier register each pinion therein has associated therewith a control plate 1440. Each plate 1440 has a high portion corresponding to the multiplier digits 1 through 5 (inclusive), an intermediate surface associated with the digits 6 through 9, and a low portion aligned with the zero position of the associated pinion. In FIG. 37 it will be seen that the sensing pawl 1430 has a first nose 1430B which is engageable with the intermediate surface on the plates 1440 associated with the digits 6–9 and a second nose 1430C which is adapted to be engageable with the outer surface corresponding to the digits 1–5. The extreme end of the pawl 1430 is of such length that when a given plate 1440 and associated pinion are in their zero positions the end of the sensing pawl 1430 will pass through the opening in the cam without being affected thereby. The spacing of the left ends of the noses 1430B and 1430C corresponds to the space between two adjacent teeth 1434 on the stationary escapement rack 1401. Therefore when the sensing pawl 1430 is being displaced laterally the engagement of the nose 1430C with a plate 1440 will cause the pawl 1430 to be rocked clockwise prior to the time that the engagement of the nose 1430B with a plate 1440 would cause such clockwise rotation of the pawl. Therefore, if the nose 1430C engages a plate 1440 the pawl 1430 will be rocked clockwise and hence the pawl 1433 counterclockwise to engage a given tooth on the rack 1434 while control by the nose 1430B will allow the pawl 1433 to move one additional space to the left before engaging the teeth 1434.

To allow for a free movement of the pawl 1433 into engagement with the teeth 1434 the product-dividend register carries a cam 1441 at its right end (FIG. 34) which is adaptable to each of the circular cams 1442 spaced along a shaft 1443 extending to the right from the multiplicand pin carriage. The position of the cam 1441 on the product-dividend register shaft is such that near the end of each rotation of the product-dividend register the cam 1441 engages one of the cams 1442 and moves the multiplicand unit to the right by a small distance. Since the pawls 1430 and 1433 are carried along with the multiplicand section this allows the pawl 1433 sufficient clearance to move into and out of the teeth on the stationary rack 1434 without being under pressure because of the leftward urge of the escapement spring 1404.

Prior to the operation of the multiplier-product key the multiplicand section as well as the multiplier sensing pawl 1430 are in their extreme right-hand positions. That is, the heavy escapement pawl 1406 will be engaged with one of the heavy teeth 1403A on the escapement slide 1403 secured to and made part of the multiplicand storage section. The connecting pin 1402 (FIG. 34) will be in its lowermost position and therefore the sliding block 1400 as well as the plate 1400A secured to the rear surface thereof and which carries the connecting pin 1402 will be in their rightmost positions. The plate 1400A further carries the sensing pawl 1430 and the escapement pawl 1433 (FIG. 37) the arrangement being such that the sensing pawl 1430 is to the right of the lowest order multiplier pinion (FIG. 36). However, it should be noted in FIG. 37 that the spring 1432 would tend to hold the sensing pawl 1430 counterclockwise and the escapement pawl 1433 in a clockwise position. Therefore, means is provided for holding the sensing pawl 1430 in the clockwise position shown in solid lines in FIG. 36 which in turn urges the pawl 1433 counterclockwise.

Referring now to FIG. 42 a portion of the shaft 980 will be seen which as described in connection with FIG. 14 is rocked counterclockwise during the first cycle of operation initiated by the multiplier key. The lever 1450 pinned to the shaft 980 has a leftwardly extending lug which overlies the upper end of a slide 1451 which is urged upwardly by a spring 1452 and is supported by the studs 1453A and 1453B extending to the right from the right end of a bellcrank lever 1454. As seen in FIG. 43 the left forwardly extending arm of the bellcrank lever 1454 serves as a latch and is normally engaged with the upper rightwardly extending portion of a lever 1456 pinned to the shaft 1436. A spring 1456A connected to lever 1456 urges the shaft 1436 counterclockwise. Thus it will be seen that the bellcrank lever 1454 is normally effective to hold the shaft 1436 in a clockwise position and hence the sensing pawl 1430 is held in the position illustrated in FIG. 36. It will also be seen that the slide 1451 will be held in its lowered position of FIG. 42 where the stepped surfaces 1451A on the lower end thereof will be so positioned with respect to the leftwardly extending lug 1457 carried by the multiplier frame that movement of the multiplier frame will have no effect on the slide 1451. However, when the shaft 980 is rocked counterclockwise as a result of the operation of the multiplier key the slide 1451 will be released for upward movement to a position such that the lower stepped portion thereof will be in alignment with the rectangular lug 1457. Thus as the multiplier unit moves forwardly away from the multiplier add racks following the entry of the multiplier digits therein (such movement of the multiplier unit in the forward direction occurring in the manner previously described and very near the end of the multiplier entering operation) the lug 1457 will engage the slide 1451 and rock the bellcrank lever 1454 clockwise to release shaft 1436.

It should be noted that, as seen in FIG. 36, the heavy escapement pawl 1406 serves to hold the multiplicand unit to the right against the urge of the spring 1404 (FIG. 34). The pawl 1406 is released near the end of the first cycle of the main driveshaft after the tunnel shaft has been released (as described above). From FIG. 36 it will be seen that if the first order of the multiplier unit has a digit therein of five or less the pawl 1433 will not be moved in response to release of the shaft 1436 (and hence of the sensing pawl 1430). In such event it will be seen that when the heavy pawl 1406 is released the multiplicand unit will remain substantially in its rightmost position with the "true" value pins aligned with the product pinions. It will also be seen in FIG. 36 that if the unit order in the multiplier had been a digit of six through nine the nose 1430B would have engaged the plate 1440 and hence the pawl 1433 would have been disabled. As a result thereof the multiplicand unit would move to the left. Such leftward movement would cause the sensing pawl to be rocked clockwise and hence the pawl 1433 would drive back into the teeth 1434. The spacing is such that the multiplicand unit would have moved to the left by the spacing between two adjacent ones of the teeth 1434, said space corresponding to the space between adjacent columns of pins in the multiplicand unit. Therefore, the complemental pins in the multiplicand unit would be aligned with the product pinions and the first cycles of the product register would therefore be subtracted operations.

It will also be seen in FIG. 36 that if the units order in the multiplier had been a zero the nose 1430B would pass through the low spot in the plate 1440 and hence the multiplicand unit would move to the left by two or three of the teeth 1434 (depending upon which of the noses 1430B or 1430C engaged the second order plate 1440 in the multiplier unit).

It should be noted at this point that although the high speed driveshaft for the product register is in operation the high-speed clutch mechanism is held non-operative and therefore the product register is not rotated. The control for the clutch comes from the shaft 1436 which is in turn responsive to the position of the sensing pawl 1430. That is, as seen in FIG. 43 the left end of the shaft 1436 carries a pair of upwardly extending pointed levers 1460 and 1461 which are engageable with a bail 1462 pivoted at 1463 on a lever 1464. Lever 1464 is in turn supported on the left end of a stationary shaft 1466. A spring 1467 connected to a stud extending to the left from a connecting link 1468 and to the left end of the shaft 1466 urges said link 1468 rearwardly and the lever 1464 clockwise. The bail 1462 is spring urged by means of a spring 1469 in a counterclockwise direction on the stud 1463. The arrangement is such that the clockwise movement of shaft 1436 will bring levers 1460 and 1461 into engagement with the bail 1462 to rock lever 1464 counterclockwise and drive link 1468 forwardly. However, the spring connection provided by spring 1469 between lever 1464 and bail 1462 permits counterclockwise movement of shaft 1436 without affecting the position of the lever 1464.

When the link 1468 is driven forwardly a latch 1470 will be rocked counterclockwise and hence a heavy spring 1471 will be effective to move a clutch engaging lever 1472 clockwise about its supporting shaft 1473. The lever 1472 has a downwardly extending portion which is disposed behind a rightwardly extending stud 1474A on a bellcrank lever 1474 pivoted on the shaft 1473. The bellcrank lever 1474 carries a leftwardly extending stud 1474B which is disposed behind the upwardly extending end of the clutch control lever 1475 urged clockwise by a spring 1476. As described hereinafter in connection with FIG. 17, movement of the lever 1475 will engage clutch and cause rotation of the product-dividend register. It will thus be seen that when the link 1468 moves forwardly in response to the clockwise movement of shaft 1436 the main shaft of the product register will be coupled with the high-speed driveshaft. As described in connection with the drive mechanism of FIG. 17 the high speed shaft will cause the product register to rotate at approximately 1200 r.p.m. and thereby repeatedly add the amount in the multiplicand unit into the product register. As previously described the product register main driveshaft carries cam means adapted to reciprocate the multiplier counting device during each rotation of the product register and thus steps the active one of the multiplier pinions toward zero position. The restoring of the active multiplier pinion to its zero position in turn causes the sensing pawl 1430 to be released for clockwise movement (see FIGS. 36 and 37). As a result thereof the pawl 1433 is disengaged from the teeth 1434 and multiplicand unit steps to the left to bring the pins therein into alignment with the product pinions in the adjacent higher order.

Figure 43B:
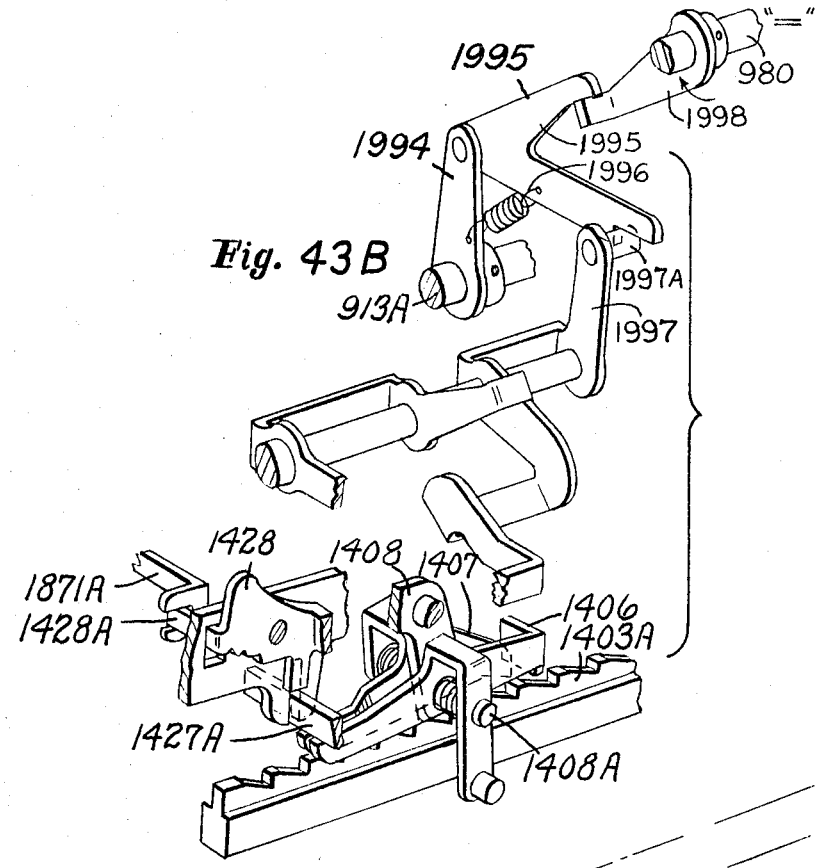
FIG. 43B is a front left perspective view of the apparatus used for selectively disabling the pawls associated with the pin carriage.
Figure 43A:
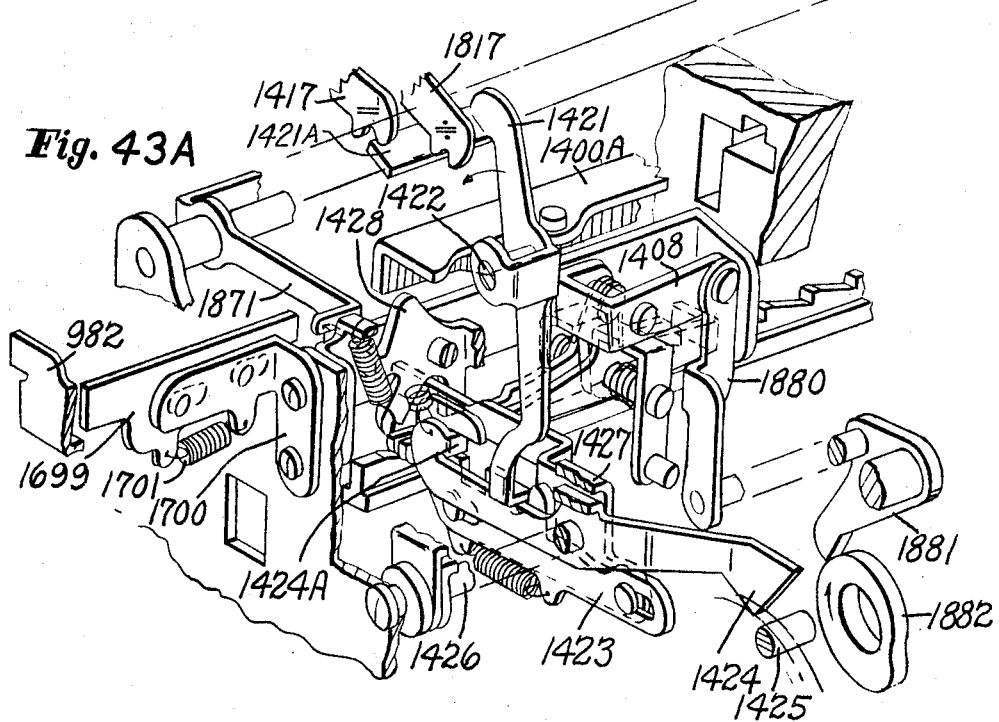
FIG. 43A is a front left perspective view of the apparatus which serves to release the pin carriage holding and driving pawls with FIG. 43A being so illustrated that it is adapted to alignment with FIG. 43 when positioned on the left side thereof.

Referring to FIGS. 42, 43 and 43A wherein the means for controlling the clutch mechanism is illustrated it should be noted that when the sensing pawl 1430 is in its FIG. 36 position the shaft 1436 is in its most clockwise position with the upper ends of the levers 1460 disposed to the rear of the bail 1462. When the shaft 1436 is initially released by the upward movement of the slide 1451 it will be seen that shaft 1436 first rocks counterclockwise which brings the levers 1460 and 1461 in front of the bail 1462. Thereafter when the sensing pawl 1460 engages a cam 1440 and is rocked clockwise by the continued movement of the pin section (and heavy block which carries the sensing pawl) the levers 1460 and 1461 will be moved clockwise to initiate the machine cycling as described above.

In the event the units order of the multiplier contains a digit of from 1-5 it will be seen in FIGS. 36 and 37 that the pawl 1430 will never be rocked in a clockwise direction to release the high speed clutch nor will the escapement pawl 1433 be removed from the teeth of the stationary escapement frame 1434. Accordingly, additional means is provided for operating the high speed clutch when the lowest order of the multiplier section has a digit of from 1 through 5. This means includes a cam 1480 (FIG. 42) secured on the right-hand side of the units order multiplier pinion. The shape of this cam is such that when the units order multiplier digit is less than 6 the low portion of the cam will be engaged with the stud 1481 extending to the left from the slide 1482 supported on the studs extending to the right from the lever 1483. A spring 1484 urges the slide 1482 upwardly to maintain a first vertical surface 1482A thereon in alignment with the lug on the lever 1486 pinned to the shaft 1487. As previously described the lever 1483 rocks counterclockwise to bring the multiplier pinions into engagement with the multiplier add racks and clockwise to remove the pinions therefrom prior to each multiplication operation. It will be seen that if the slide 1482 is allowed to remain in its upward position by the cam 1480 the surface 1482A will engage the lever 1486 when the multiplier unit moves forwardly away from the multiplier add racks and hence will rock the shaft 1487 in a counterclockwise direction. The left end of shaft 1487 carries a lever 1488 connected by stud and slot connections with the downwardly extending right end of the previously described lever 1461 (which is a bellcrank lever) and therefore when the multiplier section returns to its forward position the shaft 1436 will be moved clockwise if the units order of the multiplier has a digit of 1 through 5. As seen in FIG. 42 the shape of the cam 1480 is such that the positioning of the units order pinion to a value of 6 through 9 will move the slide 1482 downwardly so that movement thereof will have no effect on shaft 1487 and hence no effect on shaft 1436.

From the above it will be seen that the operation of the multiplier key will cause the high-speed shaft to be coupled with the product register in one of two ways to initiate a multiplication operation: (1) If the units order multiplier is 1–5 the shaft 1487 will be rocked and the multiplicand unit will remain in a position with the true value of the multiplicand aligned with the product pinions: (2) If the units order multiplier contains a digit of 6–9 the escapement pawl 1433 will be released (FIG. 37), the multiplicand unit will move to the left by a distance equal to the space between two adjacent teeth 1434 on the stationary rack 1401, nose 1430B will engage the units order cam 1440 causing the pawl 1430 to rock clockwise, and hence rotate shaft 1436 clockwise to operate the high-speed clutch apparatus.

Figure 44:
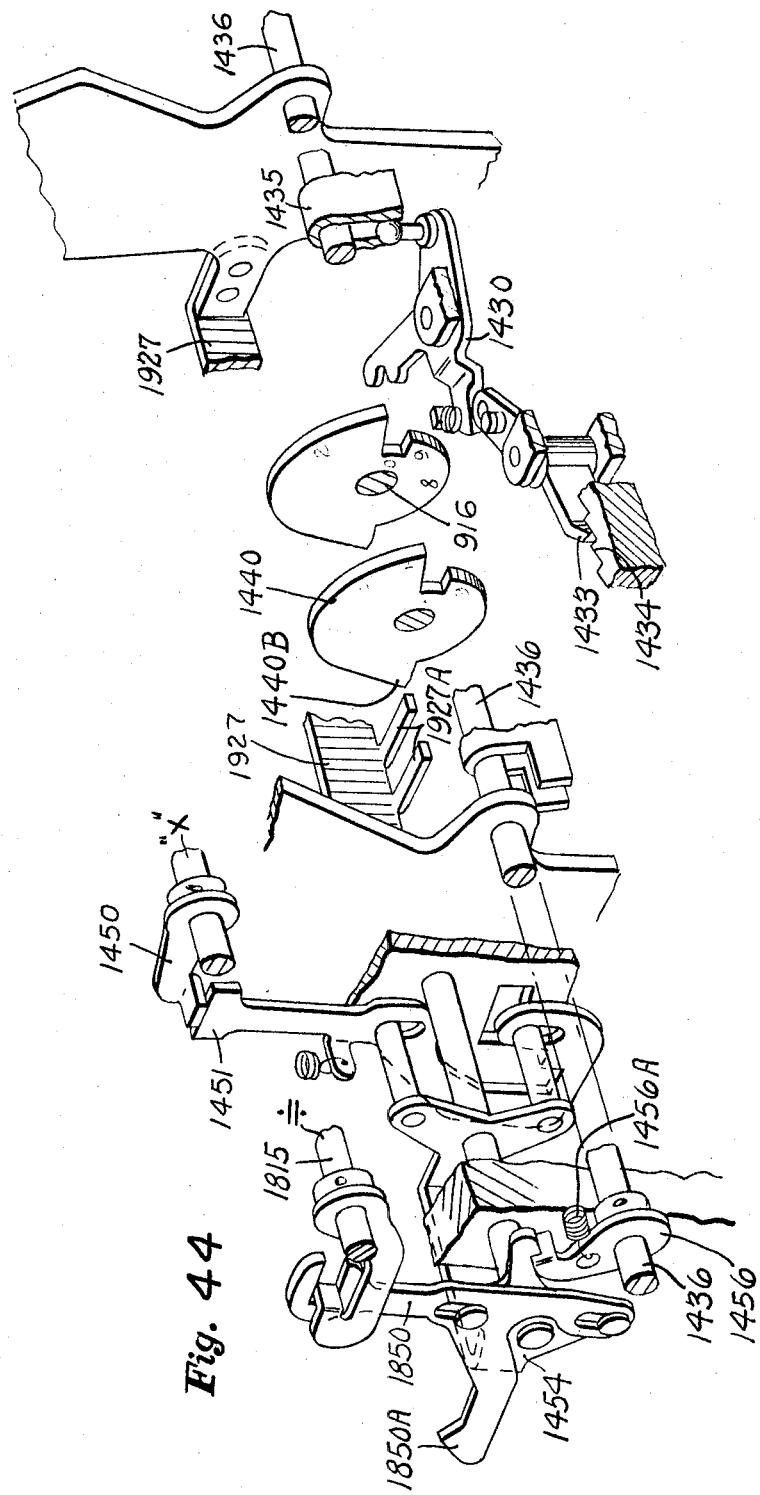
FIG. 44 is a front left perspective view of the multiplier sensing apparatus together with the control devices for rendering the sensing apparatus operable with the parts being shown in a somewhat separated position.

It will be seen in FIGS. 43 and 43A that the bellcrank 1474 which is selectively pulled clockwise by the spring 1471 acting through lever 1472 to release the clutch control bail 1475 has a rightwardly extending portion adaptable to a latch 1490 pivoted on the stationary shaft 1491. Latch 1490 is coupled by means of a link 1492 with the upper end of a lever 1493 pivoted on shaft 1466. The lower arm of lever 1493 carries a rightwardly extending stud which is disposed in front of an upstanding lever 1496 pinned to shaft 1436. A spring 1497 connected to a lug on the latch 1490 urges said latch 1490 in a counterclockwise direction so that when the bellcrank 1474 is once rocked clockwise to couple the high speed shaft with the product register said bellcrank lever 1474 will be held in its clockwise position. As a result thereof the heavy lug 1475A will be held away from the path of the control lugs on the clutch housings (described hereinafter) and the power drive will remain connected to the product register for the required number of cycles of operation. As long as the sensing pawl 1430 has one of its noses 1430B or 1430C engaged with a surface on one of the plates 1440 the high speed drive will continue to rotate the product register (FIG. 37). However, as the active one of the plates 1440 is restored to its zero position the opening therein aligned with the zero position of the pinion will allow the sensing pawl 1430 to rock counterclockwise (FIG. 44). Such counterclockwise movement of the pawl 1430 will cause the latch 1490 to be moved clockwise. This releases the bail or lever 1474 for counterclockwise movement to its home position under the urge of a spring 1498. When the lever 1474 returns to its counterclockwise position, means is rendered operable to disengage the power drive from the product register (as described hereinafter). During each rotation of the product register, cam means disclosed hereinafter operates a heavy rectangular lug 1499 in a manner such that the lever 1472 is rocked counterclockwise against the relatively strong urge of the spring 1471 and therefore is reset and under the control of the latch 1470 (FIG. 43). It should be noted that the lever 1472 is reset during the first cycle of the product register even though the bellcrank lever 1474 is in a latched condition by means of the latch 1490.

From the above it will be seen that when the active cam 1440 (see FIGS. 36 and 37) reaches its zero position the clutches coupling the power drive to the product register will be disabled and simultaneously the escapement pawl 1433 will be moved away from the teeth on the stationary rack 1434. It should be noted that the active cam 1440 is restored to its zero condition prior to the time that the product register completes the last rotation necessary for restoring that order of the multiplier unit to zero. It should be further noted that as previously described in connection with FIG. 34 the cam 1441 on the product register shaft holds the multiplicand unit a few thousandths of an inch to the right during the completion of each cycle of operation of the product register to enable free movement of the escapement pawl 1433 into and out of engagement with the escapement teeth 1434.

Since the product pinions are in mesh with the pins of the multiplicand unit only during approximately 70° of the rotation of the product register it is seen that if the multiplicand unit is only to escape by one or two orders, sufficient time will be available to allow such escapement to occur during the time that the product register is completing the last portion of the last cycle of operation for a given multiplier order. Accordingly, it is advantageous to design the mechanism in a manner such that the high-speed drive remains connected to the product register without necessitating the repeated stopping and starting of parts as is necessary in conventional multiplication devices. It has been found that with the product register shaft rotating at 1200 r.p.m. sufficient time is available after the product pinions leave the multiplicand pins to move the multiplicand unit by at least three orders to the left prior to the time that the product register completes its rotation. From FIGS. 37 and 43 it will be seen that if the immediately adjacent one of the plates 1440 is displaced from its zero position the multiplicand unit and the sensing pawl 1430 will escape to the left only a short distance before the sensing pawl 1430 is again rocked clockwise. This in turn moves the shaft 1436 clockwise and moves the heavy lug 1475A away from the path of the clutch housings prior to the time that the high speed shaft brings said housings into engagement with said lug. Accordingly, the multiplicand unit will have been stepped to the left to the proper position for multiplication by the next higher order multiplier digit and the product register can continue its rotation without any interruption in the smooth operation thereof. An important advantage of this inter-relationship of the multiplier sensing unit and the drive for the product register is that it is self-controlled. That is, the multiplier sensing unit will continue its leftward movement by as many orders as is possible for the speed at which the product register is being driven prior to the time that the movement thereof would cause an interference to occur between the product register pinions and the multiplicand unit pins. For example, if there were 8 or 9 zeros in the multiplier unit (a multiplier such as 50000008) there would be insufficient time for the multiplicand unit to move from the first to the eighth order during the time that the product register is completing the last rotation for multiplication by the units order multiplier digit. Accordingly, the shaft 1436 controlled by the sensing pawl 1430 would not be reoperated prior to the arrival of the clutch control lugs at the heavy lugs 1475A and the clutches would be disengaged. Accordingly, the drive for the product register would be interrupted while the multiplicand unit and sensing pawl 1430 continue their leftward movement until the pawl 1430 engages the eight order plate 1440. Such engagement of the sensing pawl 1430 with the eighth order plate 1440 causes the clutches to again be released in the manner previously described. If the multiplier were a number such as "35" the multiplicand unit and sensing pawl 1430 would have completed their leftward movement prior to the time that the clutch housings reach lug 1475A and therefore the lug 1475A would be removed from the path of the clutch housing lugs and the drive for the product register would be uninterrupted.

*Product register drive*

If the machine of the present invention the product register rotates through 360° to cause the multiplicand to be added or subtracted once into the product register. To make certain each rotation is complete the product register shaft is positively driven up to a final limit position without depending upon momentum for carrying said shaft through the final portion of the 360°. Thus a high-speed-low-speed drive assembly shown in FIG. 17 is utilized to drive the product register at a high speed up until the final revolution at which time the low-speed drive becomes operable. In addition, a brake mechanism 1509 is rendered operable near the end of the final 360° to prevent rebound of the shaft and drum. The control for the brake 1509 is illustrated in FIG. 43 and includes a lever 1510 pivoted on the left side of a main frame and urged in a counterclockwise direction by a spring 1511. The clutch control lever 1474 carries a third rightwardly extending stud 1474C which is disposed behind the upwardly extending arm of the lever 1510. The arrangement of the brake control lever 1510 with respect to the brake mechanism is such that when the lever 1510 is moved clockwise by the spring 1511 the brake is applied to the product register shaft. However, when the lever 1474 is rocked counterclockwise to release the clutches for coupling the drive to the product register shaft the lever 1510 is rocked counterclockwise to thereby release the brake. Since the lever 1474 undergoes an intermittent operation when the multiplicand unit is moving from one order to the next in the manner described above it will be seen that such intermittent operation would tend to cause the brake to be intermittently applied to the product register shaft. This would of course inhibit the smooth uninterrupted operation of the product register. Therefore a cam 1513 is provided on the product register shaft and is adaptable to the roller carried by a bellcrank lever 1514 having a rightwardly extending stud disposed between two of the arms on the lever 1510. The shape of the cam 1513 is such that during the major portion of the rotation of the product register shaft the brake control lever 1510 is positively held in a counterclockwise position to maintain the brake in a disabled condition. Therefore, even if the control lever 1474 moves counterclockwise to its home position and is then returned to its clockwise position the brake 1510 will remain in a disabled condition and will not interfere with the rotation of the product register. In the event that the lever 1474 remains in its counterclockwise home position (as shown in FIG. 43) the roller on the lever 1514 will enter a low portion of the cam 1513 near the end of the rotation of the product register shaft to thereby release the lever 1510 so that the brake will be applied to the product register shaft. The brake assembly 1509 can be of any conventional slipping brake type commercially available and well known in the art. The apparatus which operates a clutch for selectively providing power to the central shaft 706 of the product-dividend unit is seen most clearly in FIG. 17. Referring now to FIG. 17 the right end of the high-speed driving shaft 690 will be seen to be axially aligned with the central shaft 706 of the product-dividend unit. The lower speed shaft 693 will also be seen disposed below the shaft 690. The shaft 693 has a gear 1515 pinned thereto which is engaged with an intermediate gear 1516 which is in turn engaged with a larger gear 1517 supported for free rotation on a shaft 1519. For purpose of clarification the shaft 1519 is illustrated in FIG. 17 displaced to the left from the left end of the shaft 706. When the apparatus is assembled it will be seen that the opening 1519A mates with the lug 706A on shaft 706 so that shaft 1519 and shaft 706 are locked together and hence rotate as a single unit.

A first high-speed clutch includes a first helical spring (or coil spring) 1520 which is commonly referred to in the art as a "clutch" spring. The left half of the spring 1520 is disposed about a hub 1521 having an enlarged left end 1521A which is provided with two leftwardly extending studs 1521B. In a similar manner the right end of the shaft 690 is provided with an enlarged portion 690A having a pair of rightwardly extending studs 690B thereon. When the apparatus is assembled the studs 690B and 1521B each are disposed within holes provided in a coupling plate 1525. Accordingly, the hub 1521 will be connected to the shaft 690 and will be driving thereby. The right half of the spring 1520 is normally disposed about a hub 1522 secured to the left end of the shaft 1519. The left end of spring 1520 is bent radially outward and is connected to a first spring housing 1523. The right end of spring 1520 is bent radially inward and is disposed within a rectangular opening 1522A in the hub 1522 secured to shaft 1519. The spring 1520 is wound in a direction such that if the housing 1523 is released for rotation the clockwise rotation of shaft 690 and hence the hub 1521 (as viewed from the left end) will tighten the spring 1520 about the hubs 1521 and 1522 and thereby couple the high-speed driving shaft 690 to the shaft 1519 which is to be driven. The clutch control member in the form of the bell-crank lever 1475 pivoted on a stationary post 1526 has, as previously described, a leftwardly extending arm 1475A which is adaptable to the lug 1523A on the spring housing 1523. When the control member 1475 is in its most counterclockwise position it will serve to hold the housing 1523 against counterclockwise rotation and therefore the left end of spring 1520 will be held stationary. This in turn will prevent the high-speed shaft 690 from driving the shaft 1519.

A second clutch mechanism includes a second clutch spring 1530 which is so positioned that its left end is disposed about the right end of the hub 1522 pinned to the shaft 1519 and its right end is disposed about the hub 1518 supported for independent rotation on the shaft 1519. It will be seen in FIG. 27 that the spring 1530 is wound in a direction opposite to that of the spring 1520 and has its left end adaptable to the rectangular opening 1522B disposed in the rightmost portion of the hub 1522 secured to shaft 1519. The right end of the spring 1530 is disposed within an opening provided in a second spring housing 1533 which encompasses the spring 1530. It will be seen that since the left end of spring 1530 is positively connected to the hub 1522 carried by shaft 1519 the counterclockwise rotation of shaft 1519 by the high-speed shaft 690 will cause the spring 1530 to rotate therewith. Since the spring 1530 is wound in a direction opposite to that of the spring 1520 the rotation thereof will cause the spring 1530 to move in a direction tending to expand the coils thereof as the right end thereof rotates about the hub 1518. Accordingly, the spring 1530 will have no effect on the shaft 1519 as the shaft 690 drives shaft 1519 at a high speed. The second spring housing 1533 is provided with a lug 1533A engageable by the arm 1475A on the clutch control member 1475.

It should be noted that the hubs 1518, 1521 and 1522 have enlarged portions thereon for supporting the spring housings 1523 and 1533. This prevents the clutch springs from riding the hubs during the time that the hubs are being rotated but the product register is stationary. That is, as will be described hereinafter, the two clutch springs are held slightly expanded when they are disengaged from the hubs.

The operation of the apparatus is as follows. When the lever 1475 is moved counterclockwise in the manner previously described the clutch spring 1520 will grip the hubs 1521 and 1519 and hence cause the product register to rotate at the speed of the high-speed shaft 690. It should be noted that the clutch spring 1530 is simultaneously released but since the hub 1522 will be driven at the speed of the high-speed shaft the spring 1530 will merely slip on the hub 1522.

As previously described with reference to FIG. 43 the lever 1475 is rocked clockwise when active one of the multiplier digits is restored to zero, thus indicating that the last cycle of the product register is taking place prior to shifting of the multiplicand unit. As seen in FIG. 43 the lever 1475 has a leftwardly extending stud 1475B which passes through a slot in the upper end of a link 1477 pinned at its lower end to a lever 1478. The lever 1478 is pivoted on a stud extending to the left from a small stationary plate. The lever 1478 is spring urged clockwise but is under the control of the link 1477. That is, when the lever 1475 is in its counterclockwise position the link 1477 will be forced downwardly and lever 1478 will be held counterclockwise in a position where its lug 1478A (FIG. 18) is away from the path of travel of the lug 1523A on the spring housing 1523. Therefore, the lever 1478 will not affect the high speed clutch as long as the lever 1475 is held counterclockwise. Then when the lever 1475 moves clockwise (at approximately 180° of the last rotation of the product register) the lever 1478 will move clockwise into the path of the lug 1523A on the housing 1523. This disengages the right end of the spring 1520 from the hub 1519. Simultaneously the previously described brake is applied to the shaft 1519 and hence the hub 1522 starts to slow down. As soon as the speed of the hub 1522 reaches the speed of the hub 1518 the spring 1530 grips the hub 1522 and positively causes the hub 1522 to be driven at the lower speed of hub 1518. As seen in FIGS. 27 and 27A the hub 1522 has a cam 1522C disposed thereabout, a heavy pin passing through the cam 1522C, hub 1522, and shaft 1519 so that the hub and shaft rotate as a unit. It will further be seen that the cam 1522C has a small spring 1535 secured to the left side thereof which is engageable with the lug 1523B on the right side of housing 1523. The arrangement is such that while the housing is held stationary by lever 1478 the spring 1535 bypasses lug 1523B and then moves back to the left to its normal position where it serves to hold the housing 1523 slightly clockwise. That is, with the spring 1535 ahead of the lug 1523B the clutch spring 1520 will be held expanded and hence not operate to drive the shaft 1519.

After the spring 1535 gets ahead of the lug 1523B the cam 1522C engages a lug 1478A on the lever 1478 and rocks the lever 1478 away from the housing 1523. Therefore the low speed driveshaft serves to drive not only the shaft 1519 during the final portion of the last cycle but also in effect holds the high speed drive disengaged through its control of the speed of hub 1522.

The lug 1475A is at this time disposed in the path of the lugs 1523A, 1533A and the cam 1522C and thus it will be seen that both clutch springs will be disengaged when the shaft 1519 reaches its home position. During the last degree or two of rotation of the shaft 1519 the flat spring 1535 on the left side of the cam 1522C engages a stationary member 1536 and is cammed to the right. This releases the housing 1523 from the control of spring 1535 so that the apparatus is now in condition for initiation of a new cycle when the lug 1475A is elevated.

As seen in FIG. 43 a latching lever 1479 is pivoted on the stud which supports lever 1478 and is spring urged in a counterclockwise direction so that the lever is in engagement with the cam 1522C. The arrangement is such that the end of the lever falls in behind the trailing radial surface on the cam 1522C as the shaft 1519 reaches its home position. This prevents "back-up" of cam 1522C and hence tends to hold the clutch springs in an expanded condition to prevent wear thereof.

*Multiplication*

The manner of operation of the above set forth combination of parts to perform multiplication is as follows. The multiplicand is first stored in the multiplicand pin section in response to the operation of the multiplicand key. The subsequent operation of the multiplier key sets the main drive mechanism of the machine for the performance of two cycles of operation, the second of which is held in abeyance. During the first of such cycles the multiplier is entered into the multiplier register. During that cycle of operation the return movement of the multiplier register away from the vertical racks 806 to its forward position causes the high-speed drive to be coupled with the product register shaft 706 in the manner described in connection with FIGS. 42 and 43. The product register continues to rotate under the control of the various plates 1440 in the multiplier section and as a result of such rotation of the product register the plates 1440 and pinions associated therewith are sequentially stepped to their zero positions. As each plate 1440 reaches its zero position the sensing pawl 1430 is allowed to pass through the opening provided therein and hence the multiplicand section together with the multiplier restoring pawl 920 moves to the left. The distance which the multiplicand unit steps to the left will be either a "full step" to bring the "true value" multiplicand pins into alignment with the product register pinions for the addition of the multiplicand therein, a "half step" or a "step and a half" to cause the complement of the multiplicand to be added into the product register. The distance which the multiplicand section steps is controlled by the various surfaces on the adjacent higher order cam 1440 in the multiplier section through its cooperation with one or the other of the two noses 1430B or 1430C on the sensing pawl 1430. The distance which the multiplicand unit and the multiplier restoring pawl 920 move to the left further determines whether the arm 920A or the arm 920B will be aligned with one of the driving interposers 930 to cause the pinion aligned therewith to be rotated in a counterclockwise direction for digits in the multiplier section having a value greater than five and in a clockwise direction for multiplier digits having a value which is less than six. When a given one of the multiplier pinions having a value greater than five stored therein is returned to its zero position in a counterclockwise direction the transfer member associated therewith will cooperate with the cam surface 971 disposed to the left thereof to cause the adjacent higher order pinion to be advanced in a counterclockwise direction by one additional step. This procedure is repeated until the highest order multiplier pinion has been restored to its zero position at which time the multiplication process will have been completed. When the multiplier digit restoring pawl 920 reaches its leftmost position the plate 1400A secured to the heavy sliding block 1400 engages slide 1699, which in turn engages the spring latch 982 (FIG. 43A) to release the machine drive for the performance of the second cycle of operation which has until this time been held in abeyance. As a result thereof the machine automatically performs the second cycle of operation during which the product in the product register is totaled and printed on the record material. During such totaling cycle of operation the multiplicand unit as well as the multiplier restoring pawl 920 are returned to their right-hand home positions to be in a condition for the initiation of a subsequent multiplication operation. The mechanism for restoring the multiplicand unit and the multiplier restoring pawl 920 to the right is illustrated in FIG. 34.

Referring now to FIG. 34 it will be seen that the interconnecting pin 1402 which serves to couple the heavy block 1400 with the multiplicand unit has a horizontal rectangular opening cut therein to receive the stud 1680A extending to the left from the arm 1680 pinned to the bellcrank lever 1681. During each cycle of operation of the main driveshaft of the machine the bellcrank lever 1681 is rocked in a counterclockwise direction (after approximately 40° rotation of the main driveshaft) to thereby cause the interconnecting pin 1402 to be elevated. During the time that the pin 1402 is held in an elevated position the restoring mechanism shown near the left end of FIG. 34 is driven by a cam on the main driveshaft and positively returns the sliding block 1400 and multiplier restoring pawl 920 carried thereby to its right-hand home position. It will be seen in FIG. 34 that the lower right end of the sliding block 1400 is positioned to the left of the upwardly extending right end of the multiplicand unit. Hence when the sliding block 1400 is driven to the right the multiplicand unit will be carried therewith to its home position. After the sliding block 1400 and the multiplicand unit have been returned to their home positions the bellcrank lever 1681 is rocked back to its clockwise position so that the interconnecting pawl 1402 is again engaged with one of the nine slots provided in the upper surface of the heavy rack 1403 carried by the multiplicand unit. As seen in the timing diagram of FIG. 50 the coupling pin remains elevated from 40° to 300° of rotation of the main driveshaft while the restoring apparatus functions to restore the pin carriage by 140 and then returns to its initial condition by 300°.

The restoring mechanism includes a driving lever 1690 pivoted on the left side of a stationary frame and carrying a roller 1691 which is adaptable to a cam 1692 on the main driveshaft. A link 1693 connected to a rectangular block 1694 at the upper end of the lever 1690 and to a similar block 1695 carried by a lever 1696 causes the lever 1696 to be driven in a counterclockwise direction in a horizontal plane in response to the counterclockwise movement of the lever 1690 in a vertical plane by the main driveshaft. The lever 1696 carries a rectangular sliding block 1697 near its front end which encompasses a shaft 1690 extending to the left from the heavy quarter plate. The right edge of the sliding block 1697 is aligned with the left end of the plate 1400A secured to the heavy block 1400 and therefore the counterclockwise movement of lever 1696 will bring the block 1697 into engagement with the plate 1400A and positively drive the block 1400 to its right-hand home position. Such rightward movement of the block 1400 in turn carries the multiplicand unit to its right-hand home position.

As previously described the heavy escapement pawls 1406 and 1407 remain disabled during the time that the multiplicand unit and the multiplier restoring pawl are moving to the left for the performance of the multiplication operation and therefore said pawls must be reactivated upon the completion of the multiplication operation. To this end the latch 1428 (FIGS. 43A, 43B) is provided with an upwardly extending cam surface which is disposed in the path of the left end of the plate 1400A. Accordingly, when the plate 1400A reaches its most leftward position following the restoration of the highest order multiplier pinion to zero the latch 1428 will be rocked counterclockwise to release the pawls 1406 and 1407. Hence when the heavy block 1400 and the multiplicand unit have been returned to their rightward positions the heavy pawls 1406 and 1407 will be operative to engage the escapement rack 1403A and thereby hold the multiplicand unit in its rightward position against the urge of the escapement spring 1404 (shown in FIG. 34).

The means for initiating the second cycle of operation of the main driveshaft when the highest order pinion of the multiplier unit has been returned to its zero position is illustrated in FIG. 43A and includes a small slide 1699 held by stud and slot connections on the bracket 1700 secured to a stationary frame and urged to the right by the spring 1701. The left end of the slide 1699 is aligned with the spring detent or latch 982 and the right end thereof is aligned with the left end of the plate 1400A carried by the heavy sliding block 1400. As previously described in connection with FIG. 14 the operation of the multiplier key causes the shaft 980 to be rocked counterclockwise, thereby permitting the spring latch 982 to move in a clockwise direction to engage the lever 981 and hold the shaft 980 in its counterclockwise position. When the plate 1400A engages slide 1699 the spring latch 982 is moved back to its counterclockwise position so that the shaft 980 is returned to its clockwise home position. As a result thereof the lever 983 pinned to shaft 980 releases the arm 984 which in turn initiates the second cycle of operation of the main driveshaft in the manner previously described by reference to FIG. 15.

Figure 12:
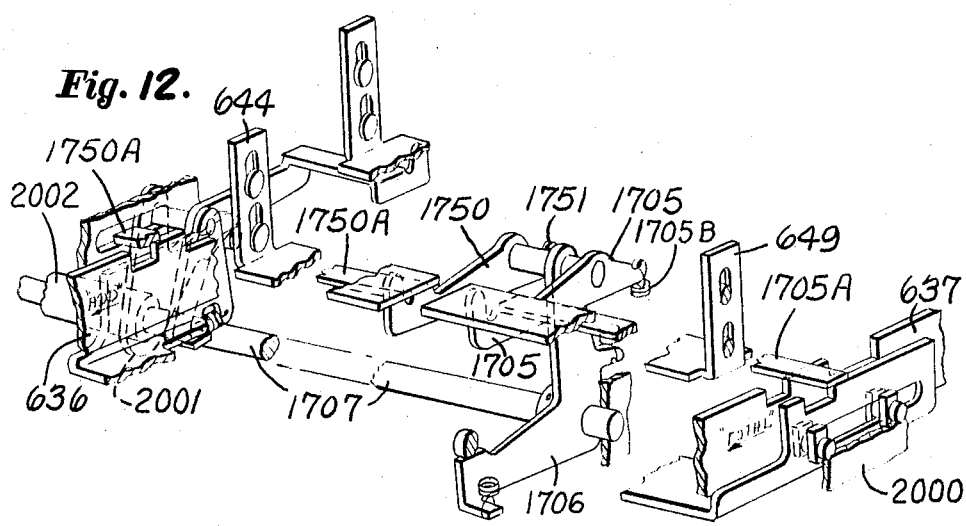
FIG. 12 is a perspective view of the power operated apparatus which is responsive to the operation controls to transmit power to the devices of FIG. 11.

From FIGS. 10 and 12 it will be seen that the control slide 564 will only be one step to the rear of its most forward position when the second cycle of operation is initiated. The slots in the bottom of slide 564 are such that when the second cycle takes place and slide 564 is driven downwardly the interposer 649 is driven downwardly. As seen in FIG. 12 the interposer 649 overlies the upper end of the coupling lever 1705 which is constantly urged clockwise by a small spring 1705B. When the interposer 649 is driven downwardly it will be seen that the lug 1705A on the lever 1705 will become disposed within a rectangular opening in the top edge of the power total slide 637. The coupling lever 1705 is carried at the upper end of a lever 1706 pinned to a shaft 1707 and therefore it will be seen that when the power total slide is driven forwardly the shaft 1707 will be driven counterclockwise.

Figure 11:
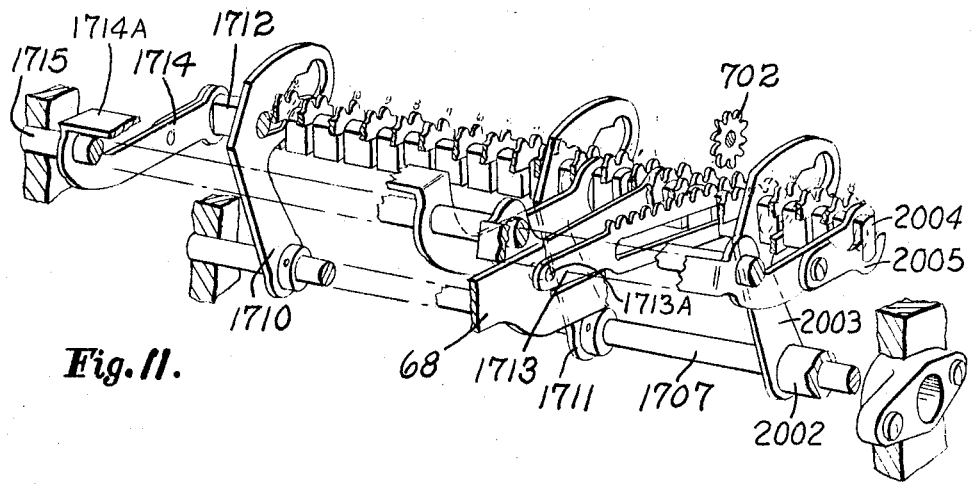
FIG. 11 is a perspective view of the power driven levers used to control engagement of add racks with the product-dividend pinions.

In FIG. 11 it will be seen that the shaft 1707 has first and second levers 1710 and 1711 pinned thereto, the upper ends of said levers having cam openings formed therein through which a slotted shaft 1712 is disposed. As seen more clearly in FIG. 20 the shaft 1712 supports the rear ends of a plurality of short actuator racks 1713 each pinned at 1713A to an associated actuator or add rack 68. As seen in FIG. 11 the shaft 1712 is further supported by a pair of arms 1714 interconnected by a member 1714A and supported by a shaft 1715. The shapes of the cam openings in the levers 1710 and 1711 are such that when the shaft 1707 is rocked counterclockwise in response to forward movement of the power total slide 637 (see FIG. 12) the short racks 1713 will be elevated into mesh with the pinions 702 in the product-dividend register. The add racks 68 are released for rearward travel during a total taking cycle of operation and therefore the add racks 68 will be limited in their rearward travel by the pinions 702. As seen in FIGS. 20 and 30 the pinions 702 will be stopped in their zero positions by the sensing levers 732, the shape of the levers 732 being such that when the pinions are rotated counterclockwise during a total taking cycle the wide cam surfaces 702A will limit against the levers 732 in a manner analogous to that common in the art. In this way the product obtained from the multiplication is transferred to the add racks and hence to the printing apparatus so that a printed total is provided. As described earlier, such total will have the proper punctuation marks printed automatically in the proper places as a result of the depression of the decimal key during the entry of the factors.

To prevent rotation of the product-dividend drum assembly during the taking of a total therefrom or the entry of an amount therein the apparatus illustrated in FIG. 48 is provided. As seen in FIG. 48, the bellcrank lever 1681 which serves to elevate the coupling pin for the sliding frame and pin carriage has a connecting link 1682 pinned thereto which is connected at its other end to a lever 1683 having a downwardly extending portion disposed to the rear of a roller 1684A on the upper end of an aligning lever 1684. A very heavy spring 1685 constantly urges lever 1684 counterclockwise and hence the coupling pin previously described is constantly urged upwardly. The lever 1683 carries a roller 1683A which is engaged with a cam 1686 secured to the main driveshaft 225. The lever 1684 carries an aligning roller 1684B which is adaptable to an opening provided in the right end of the product dividend frame assembly. The arrangement is such that the aligning roller 1684B is normally disengaged from the aligning slot or opening in the drum when the main driveshaft 225 is in its home position. However, from the timing chart of FIG. 50 it will be seen that after 40° of rotation of the main driveshaft 225 the drum aligner has moved into a position for holding the drum against rotation and remains so positioned until 300° of rotation of the main driveshaft 225 at which time the aligner starts to be removed and is completely removed by 330°. Since the cam 1686 serves to control the aligning roller 1684B as well as the coupling pin 1402 it will be seen in FIG. 50 that the drum aligner and the coupling pin operate simultaneously.

In the above manner the product-dividend register is held against translation in a circular path (i.e. the drum is held against rotation) throughout the major portion of each cycle of operation of the main driveshaft 225.

A particular advantage of the arrangement of the previously described parts should be pointed out at this time. It will be noted in FIGS. 20, 21 and 31 that when an amount is entered into the multiplicand unit the top pins in each order are the first pins moved. That is, the sequence of movement of the pins in response to vertical movement of the racks 801 and 811 is such that the top pin associated therewith moves forwardly prior to the time that the bottom pins are moved. For example, it will be seen in FIG. 28 that when a "one" is entered into a given order of the multiplicand unit the top pin 800 in that order will be moved forwardly for engagement with the product-dividend pinions. The same thing is true with respect to the complemental pins in that the top pin 810 is the last pin to be moved rearwardly in response to the entry of an amount in the multiplicand unit. Thus it will be seen that as the product-dividend register rotates the pinions will all be engaged with pins in the multiplicand unit at the same time that the product-dividend register is leaving the multiplicand unit. This makes possible an extremely high speed apparatus since a blocking bail can be driven into the product-dividend pinions immediately after the pinions have departed from engagement with the pins of the multiplicand unit. This is true not only during a multiplication but also, as will be seen hereinafter, during division. This means that overthrow of the product-dividend pinions which might tend to occur as a result of the pinions being rotated on their supporting shaft during translation in a circular path is obviated. In most, if not all, of the prior art calculating machines commonly referred to as "pin-wheel" machines, such an arrangement is not possible and hence the speed of operation is limited.

Division

As previously described the machine is provided with a pin carriage having sets of individually movable pins disposed therein, adjacent columns of pins being selectively set to represent a given number and its "nines" complement. During multiplication the product-dividend register is rotated to repeatedly add the amount set in the multiplicand unit into the product register pinions. To accomplish short cut multiplication and avoid the necessity of reversing the direction of rotation of the product register, the complement of the multiplicand is added to the product register to perform the necessary subtract operations needed in short cut multiplication. Thus it is seen that the machine is inherently adapted to accomplish high-speed subtract operations. This capability of the machine is utilized to provide an extremely high-speed division apparatus in which a divisor is repeatedly subtracted from a dividend. That is, the dividend is set in the product-dividend pinions and the divisor and its complement are set in the pins of the pin carriage. Thereafter the pin carriage is moved to the left to a position where the highest nonzero order thereof is aligned with the highest order pinion of the product-dividend register. With the complemental sets of pins in the pin section aligned with the rotating register pinions the register containing the dividend is rotated through the pins. Such rotation causes repeated subtraction of the divisor from the dividend. When the rotating register has rotated a number of times sufficient to cause an "over subtraction" in the product-dividend register a signal is provided which causes the divisor pin carriage to move to the right by "one-half" step. This brings the positive sets of pins into alignment with the dividend pinions so that during the next rotation of the dividend register the divisor will be added once back into the dividend to correct for the previous over subtraction. Without stopping the rotation of the dividend register the divisor pin section is then moved to the right by an additional "half-step" to bring the complemental pins therein into alignment with the rotating register pinions. The subtraction routine is then continued with the divisor being repeatedly subtracted from the dividend until another over subtraction occurs. This procedure of subtracting until an over subtraction occurs, moving to the right by one-half step to add the divisor to the dividend once, and moving the divisor to the right to thereby decrease the magnitude of the divisor by a magnitude of 10 is repeated until the divisor unit has been returned to its right-hand position. If the dividend is an even multiple of the divisor it will be seen that the dividend register will stand at zero when the division routine ends. In the event the divisor is not an even multiple of the dividend a remainder will remain in the dividend register upon the completion of the division routine.

During the repeated subtraction of the divisor from the dividend the multiplier-quotient driving pawl is reciprocated to advance the proper one of the multiplier-quotient pinions, said pawl being coupled with and moving laterally to the right in response to the rightward movement of the divisor unit. Thus upon the completion of the division routine the multiplier-quotient pinions will have set therein the quotient, and the product-dividend register will have therein the remainder resulting from such division routine. Thereafter a total-taking cycle of operation is automatically performed with the total being derived from the multiplier-quotient unit. In the event a remainder is in the product-dividend register an additional total-taking cycle of operation may be performed to remove such remainder and cause printing thereof.

Dividend entry

The first step in the performance of a division operation in the machine of the present invention is to sequentially operate the numerical keys for the entry of the dividend. After the numerical keys have been operated and the dividend is established in the visible indicator unit the dividend key (÷) is operated. As seen in FIG. 10 and as previously described, such operation of the dividend key causes the power slide 562 to first move rearwardly (by one step as indicated in FIG. 10) and to then be driven downwardly in response to the cycle of operation of the main driveshaft initiated in the manner previously described. It will be seen in FIG. 10 that such downward movement of slide 562 will cause the sensing interposer 644 to be driven downwardly. As seen most clearly in FIG. 12 the interposer 644 overlies the upper front end of a lever 1750 pinned to the upper end of the previously described lever 1706. Lever 1750 has a leftwardly extending lug 1750A which is normally disposed above a rectangular opening in the top of the previously described power driven slide 636 since a small spring 1751 connected to the rear end of lever 1750 constantly urges said lever clockwise. As previously described, the power driven slide 636 moves forwardly during the early part of the second half of each cycle of the main machine driveshaft, such movement occurring at that time since the power provided by slide 636 is used primarily to control the entry of amounts into various parts of the machine. Accordingly, it will be seen that when the dividend key is operated the shaft 1707 (FIGS. 11 and 12) to which lever 1706 is pinned will be rocked counterclockwise at a time such that the racks 1713 carried by the main add racks 68 will be elevated into engagement with the product-dividend pinions 702 after having been moved rearwardly to positions representing the dividend. As a result thereof the subsequent forward drive of the racks 68 to their home positions will cause the dividend to be entered into the pinions 702. As previously described, the power slide 636 returns to its rearward position after the add racks 68 have been returned to their forward home poistions and hence the racks 1713 are disengaged from the pinions 702 prior to the end of the dividend entering operation. Accordingly, the dividend will be set in the product-dividend pinions 702 in response to the operation of the dividend key.

Divisor entry

After the dividend has been entered into the dividend register in the manner described above, the numerical keys are sequentially operated so that the divisor will be set in the visible indicator unit. The divisor key is operated which causes three cycles of operation of the main driveshaft: the first for divisor entry, the second for quotient printing, and the third for remainder printing. The entry of the divisor is substantially identical to the operation performed for the entry of the multiplicand during a multiplication operation.

As previously described the operation control slide 566 (FIG. 10) moves rearwardly by three steps when the divisor key 506 (FIG. 7) is depressed. The first cycle of operation which takes place after the slide 566 reaches its rearmost position will cause the sensing pawl 648 (FIG. 30) to be driven downwardly so that the lug 828A on the lever 828 will be coupled with the power driven slide 636. Therefore in the manner previously described in conection with the entry of the multiplicand, the divisor will be entered into the divisor pin carriage. Furthermore, as previously described in connection with the multiplication operation the apparatus illustrated in FIG. 27 is rendered operable during the first half of the divisor entering cycle of operation to cause the pin carriage to be zeroized. Near the end of this first cycle of operation the division routine will be initiated, with further cycles of the main driveshaft being held in abeyance in a manner similar to that described with respect to multiplication even though the divisor key remains latched down.

*Division*

During the first cycle of operation which takes place as a result of the divisor key having been depressed the control slide 566 (FIG. 10) will be driven downwardly in the manner previously described. As described above this not only causes entry of the divisor into the pin carriage but also causes the apparatus of FIG. 14 to be operated. As seen in FIG. 14 the power slide 566 which first moves rearwardly and then is driven downwardly by the operation of the divisor key (÷) is adapted upon such downward movement to pull a slide 1810 downwardly. The slide 1810 is pinned to a rearwardly extending arm on a bellcrank lever 1812 which has its upper end connected by stud and slot connection with a lever 1814 pinned to the division control shaft 1815. As seen near the left end of FIG. 14 the shaft 1815 has pinned thereto a rearwardly and downwardly extending lever 1816 which underlies the forwardly extending end of the cycle control lever 984, the operation of which was described previously in connection with the multiplication routine. It should be noted however that during the initiation of the multiplication routine the flat spring latch 982 was operable to hold the multiplication control shaft 980 in its counterclockwise position until the multiplicand unit reached its leftmost position signaling the end of the multiplication routine. During division the multiplicand divisor pin carriage moves to a leftward position prior to the start of the subtract routine and therefore a latch such as the spring latch 984 is not suitable for holding the division control shaft 1815 in its clockwise position. Referring to FIG. 46 it will be seen that the lever 1814 which is pinned to the division control shaft 1815 has a leftwardly extending square stud 1814A which is adaptable to a control latch 1819 urged in a clockwise direction on its pivot point 1820 by means of the light spring 1821. Normally the latching nose on the latch 1819 rests on top of the lug 1814A until the shaft 1815 is rocked counterclockwise in response to the operation of the divisor key at which time the latch 1819 moves clockwise to a position where it serves to hold the shaft 1815 in its counterclockwise actuated position. By means described hereinafter the shaft 1815 is released for return to its home position following the completion of the division routine.

As previously described in connection with FIGS. 43A and 43B the heavy pawl 1406 normally holds the pin section in an extreme right-hand position when the machine is in an initial condition and ready to perform either a multiplication or a division operation. It will be seen from FIGS. 14 and 43A that the division control shaft 1815 has pinned thereto a forwardly extending lever 1817 which overlies the leftwardly extending lug 1421A on the lever 1421 seen more clearly in FIGS. 14 and 43A. As previously described the clockwise movement of the lever 1421 caused by the rocking of either the multiplication shaft 980 or the division shaft 1815 will bring the escapement pawl disabling lever 1427 into operation so that when the main driveshaft undergoes its first cycle of operation in response to the operation of the divisor key pawls 1406 and 1407 will be moved momentarily to an inoperative position. With the pin carriage in its extreme right-hand position the small pawl 1433 (FIG. 44) is in a position where it will engage one of the notched surfaces 1434 as soon as the sensing pawl 1430 senses a nonzero one of the multiplier cams 1440. Also as seen in FIG. 44 the shaft 1436 carries near its left end the lever 1456 which is pulled forwardly by the spring 1456A and hence shaft 1456 is normally under a counterclockwise urge, counterclockwise movement being normally prevented by the latching bellcrank 1454. It will be recalled in connection with the initiation of the rotation of the high speed driveshaft that the shaft 1436 first moves in a counterclockwise direction to render the sensing pawl 1430 responsive to the various ones of the multiplier cams 1440. When the sensing pawl 1430 encounters a nonzero one of the cams 1440 the pawl 1430 will be rocked clockwise, such clockwise rotation causing the shaft 1436 to be moved clockwise. In response to such clockwise movement of the shaft 1436 the high speed clutch control mechanism of FIG. 43 is rendered operable to couple the high speed drive with the main shaft of the rotating register in the manner previously described.

Referring now to FIG. 44 is will be seen that when the division shaft 1815 is rocked counterclockwise by the operation of the divisor key a slide 1850 supported by stud and slot connections on the left side of the bellcrank 1454 will be elevated to the position shown. It will be seen that the slide 1850 has a rearwardly extending arm which is provided with a cam surface 1850A which is adaptable to the arm 1696A on the bellcrank lever 1696 seen in FIG. 36 to be part of the pin carriage restoring mechanism. Normally the arm 1696A passes above the cam surface 1850A and hence has no effect on the latching bail 1454. However, during the first cycle of the main driveshaft which is initiated by the operation of the divisor key the slide 1850 will be in an elevated position and hence during such cycle the counterclockwise drive of the lever 1696 for restoring the pin carriage to the right (which occurs during the first half of that cycle) the arm 1696A will cause the latching bail 1454 to be rocked clockwise and release the tunnel shaft 1436 for counterclockwise movement under the urge of the spring 1456A. It will be seen in FIG. 44 that when the tunnel shaft 1436 moves counterclockwise the sensing pawl 1430 will be moved counterclockwise to thereby remove the escapement pawl 1433 from engagement with the stationary escapement teeth 1434. Near the end of the first cycle of the main driveshaft initiated by the operation of the divisor key the lever 1424 (FIG. 43A) will be rocked clockwise and as a result thereof the heavy escapement pawls 1406 and 1407 (FIG. 43B) will be moved to inactive postions. The small latch 1428 (FIG. 43B) moves over the top of the lug 1427A to thereby hold the pawls 1406 and 1407 inactive. Since the pawls 1406 and 1407 as well as the pawl 1433 (FIG. 42) are each in an inactive position near the end of the cycle it will be seen that the pin carriage as well as the multiplier pinion driving assembly including the driving pawl 920 (FIG. 42) coupled therewith will be free for leftward movement.

Referring now to FIG. 45 it will be seen that each of the uppermost positive pins 800 in the pin section has a rectangular notch cut in the upper rear surface thereof. A sensing lever 1860 pivoted on the downwardly extending arm of a bellcrank lever 1861 is provided with a downwardly extending nose 1860A which is aligned with and disposed within the rectangular notches of the pins 800 as long as said pins 800 are in their rearward inactive positions. It will be seen in FIG. 45 that a lever 1862 pinned to the left end of the tunnel shaft 1436 is coupled with the right arm of the lever 1861 by means of the link 1863. As the pin carriage moves to the left the movement thereof will be unimpeded until the highest order one of the pins 800 which has been moved forwardly to an active position engages the end 1860A on the lever 1860. Such engagement of the highest order active pin 800 will cause the lever 1861 to be rocked clockwise and hence the tunnel shaft 1436 will be moved clockwise. Such clockwise movement of the tunnel shaft 1436 moves the pawl 1433 (FIG. 44) into active condition to engage one of the escapement teeth 1434 and stop the leftward movement of the pin carriage. In addition, as previously described in connection with the multiplication mechanism, such clockwise movement of the tunnel shaft 1436 serves to operate the high speed clutch to initiate rotation of the rotating register. It should be noted that although the lever 1860 (FIG. 45) is engaged by a positive pin 800 the position of the pin carriage at that time is such that the complemental pins 810 are aligned with the pinions of the product-dividend register. Therefore as the register rotates the divisor set in the pin carriage will be subtracted from the dividend register, the position of the pin carriage at that time being such that the highest nonzero order complemental pins are aligned with the highest order dividend pinion. This will be seen from FIG. 45 wherein it should be noted that the end 1860A of the lever 1860 is disposed in the same plane as the highest order tens transfer pawl 720 associated with the dividend register.

By means shown in FIG. 42 (and described hereinafter) the operation of the division shaft 1815 renders a part in the machine responsive to the first rotation of the product-dividend register to drive the tunnel shaft 1436 in a clockwise direction to its latched condition. As seen in FIGS. 43 and 43B the tunnel shaft 1436 has a lever 1870 pinned to the left end thereof which overlies the rightwardly extending lug on the bail 1871. The forwardly extending left end of the bail 1871 is provided with a forked portion 1871A which encompasses the rearwardly extending lug 1428A on the latching pawl 1428 which at this time is holding the escapement pawls 1406 and 1407 inactive. Thus it will be seen that when the tunnel shaft 1436 is driven clockwise to its initial position where it is latched by the bail 1454 (FIG. 44) the bail 1871 will be rocked counterclockwise to thereby disable the latching pawl 1428 (FIG. 43B). As a result the pawls 1406 and 1407 are free to move in a clockwise direction so that their latching noses are disposed in engagement with the heavy escapement teeth 1403A. It should be noted that during the rotation of the rotating register the cam plate 1441 (FIG. 34) carried thereby engages one of the cams 1442 carried by the shaft 1443 extending to the right from the pin carriage. Therefore, the pin carriage will be cammed slightly to the right when the pawls 1406 and 1407 are released for movement in a clockwise direction. Thus it will be seen that the pawls will be in a position for engagement with the heavy escapement teeth 1403A. It should further be noted that since the tunnel shaft 1436 is moved to its relatched condition the sensing pawl 1430 (FIG. 44) will be held in its extreme clockwise position so that the sensing noses thereon will not be disposed within the rectangular slots of the multiplier cams 1440. Accordingly, the driving pawl 920 will be effective to rotate the multiplier-quotient pinions as well as the cams 1440 associated therewith in response to the rotation of the dividend unit without interference by the pawl 1430.

As described in connection with FIG. 28 the multiplicand-divisor pin carriage includes a solid block 820 near its left end which is provided with solid teeth which are in the complemental positions of the carriage. That is, the orders including 12–20 in the pin carriage are provided with 9 teeth corresponding to the nines complement of zero for each of the higher orders in the pin carriage. Accordingly, as the product-dividend register rotates during the division routine with the complemental pins aligned therewith the 9 teeth provided in each of the higher orders of the pin carriage will be effective to add 9 to each of the higher orders in the product-dividend register. When subtract operations are performed by adding the complement of the subtrahend to the minuend, a "tens" transfer will occur in the highest order as long as the subtrahend is smaller than the minuend. For example, if 0024 is subtracted from 0065 by adding the complement of 0024 (9976) the result is: 0065+9976= 10041. It will be noted that the "1" at the left really represents a tens transfer and is merely allowed to exceed the capacity of the register so that the answer is "0041." It thus is seen that the highest order carry pawl 720 (FIG. 45) will be repeatedly cammed to the left each time the register rotates until an over subtraction occurs. When an over subtraction occurs the carry pawl 720 in the highest order will not be cammed to the left. This movement or lack thereof in the highest order carry pawl 720 is utilized to control the stepping of the divisor to the right in the manner to be described below.

It will be seen in FIGS. 43B, 43A and 45 that lever 1408 which supports the heavy escapement pawls 1406 and 1407 has a downwardly extending link 1880 pinned to the front right end thereof. As seen in FIG. 43A said link 1880 is pinned at its lower end to a lever 1881 which is adaptable to a cam 1882 on the high speed shaft 1519 of the product-dividend register. A spring 1890 (FIG. 45) serves to constantly urge the lever 1408 which carries the pawls 1406 and 1407 in a clockwise direction to maintain the end of the lever 1881 (FIG. 43A) against the cam 1882. The shape of the cam 1882 is such that during the time that the pin carriage is being held to the right by the cam 1441 (FIG. 34) the link 1880 moves downwardly so that the pawls 1406 and 1407 are moved to the left. Then during the time that the cams 1442 (FIG. 34) are disengaged from the cam 1441 carried by the rotating drum the cam 1882 serves to drive the link 1880 upwardly and hence drive the pawls 1406 and 1407 to the right. The throw of the cam 1882 is such that the pawls 1406 and 1407 are translated first to the left by a distance which is greater than one-half the distance between adjacent ones of the teeth 1403A and then back to the right by an amount sufficient to advance the pin section "one half" step to the right. It should be reiterated at this time that when the term "one half" step is used in connection with the movement of the multiplicand-divisor pin carriage, such terminology is utilized to describe the extent of movement required by the pin carriage to move from one of the small teeth 1434 (FIG. 37) to the adjacent one of the teeth 1434. As previously described the spacing of the teeth 1434 and the heavier escapement teeth 1403A (FIG. 45) is such that there are two of the teeth 1434 to one of the teeth 1403A. The term "one half" step therefore indicates a movement of the pin carriage by an amount sufficient to cause a change in the relationship of the pins with respect to the product-dividend pinions to cause a change from subtraction to addition or addition to subtraction. On the other hand, when the pin carriage moves a full step (that is from one of the teeth 1403A to the adjacent tooth 1403A) the arithmetic sign of the operation performed remains the same.

As seen in FIG. 45A the pawl 1407 is engaged with one of the teeth 1403A when the complemental pinions 810 are aligned with the product-dividend pinions so that when the pawl 1407 is in the active position shown in FIG. 45A subtract operations will be performed by rotation of the product-dividend register. When the pawl 1406 is in holding engagement with one of the teeth 1403A the positive pinions 800 in the pin section are aligned with the product-dividend pinions so that addition will be performed in response to rotation of the product-dividend register. As described in more detail hereinafter, the arrangement is such that the pin section will be stepped to the right by "half steps" with the pawls 1406 and 1407 being alternately operable for the driving of the pin carriage to the right and with the pawl 1433 (FIG. 37) cooperating with the teeth 1434 to prevent unwanted leftward movement of the pin carriage.

As seen in FIGS. 45 and 45A the highest order carry pawl 720 associated with the product-dividend register has a downwardly extending lug 720A which is aligned with the lower rightwardly extending end 1891A of a lever 1891 pivoted on a bracket on the stationary frame 707. A connecting rod 1893 adjustably secured to the upper end of the lever 1891 is fastened at its left end to the upper end of a bellcrank lever 1894 pivoted on a bracket on the left side on the heavy quarter frame 1895 The lever 1894 has an upwardly extending lug 1894A which is adaptable to a forwardly extending stud 1406B on the heavy escapement pawl 1406. A spring 1896 (FIG. 45) is connected to the frame 1895 and to the upper end of the lever 1891 so that the bellcrank lever 1894 is constantly urged toward its counterclockwise position of FIG. 45. In such counterclockwise position the lever 1894 has no effect on the pawl 1406. However, when a carry takes place in the highest order of the product-dividend register the highest order carry pawl 720 will be cammed to the left and therefore the lever 1894 will be moved to a clockwise position where its lug 1894A is in the path of the stud 1406B as the pawl 1406 is being translated leftwardly.

Referring now to FIG. 45A it will be seen that if the lever 1408 is rocked clockwise in response to the downward movement of the link 1880 the pawls 1406 and 1407 will be translated to the left by an amount sufficient to bring the bent-over lug 1406A on the pawl 1406 beyond the vertical surface of the tooth 1403A which the pawl 1407 is illustrated as engaging in FIG. 45A. However, if there has been a tens transfer in the highest order product-dividend pinion the highest order carry pawl 720 will be cammed to the left and hence the bellcrank 1894 will be positioned in the path of the stud 1406B on pawl 1406. Accordingly, even though the pawl 1406 moves to the left by an amount sufficient to bring the lug 1406A thereon beyond the surface of the next tooth 1403A the lever 1894 will prevent said pawl 1406 from engaging the next adjacent tooth. Therefore, it is seen that the reciprocation of the lever 1408 will not be effective to advance the pin carriage to the right as long as a carry occurs in the highest order product-dividend pinion. It should be noted that during the time that the lever 1408, and hence pawls 1406 and 1407, is being moved leftwardly the cam 1441 (FIG. 34) is operative to hold the pin carriage against leftward movement. In addition it should be noted that the pawl 1433 (FIG. 44) is in an active condition to prevent leftward movement of the pin carriage.

As described hereinafter, when an over subtraction occurs in the product-dividend register there is no movement of the highest order tens transfer pawl 720 and therefore during such rotation of the product-dividend register the lever 1894 will remain in its FIG. 45 position. As a result thereof when the pawls 1406 and 1407 are translated to the left the lug 1406A will be positioned to the left of the tooth 1403A which is engaged with the pawl 1407 in FIG. 45A. Thereafter when the pawls 1406 and 1407 are driven to the right the pin carriage will be moved to the right by pawl 1406 by an amount sufficient to bring the positive pins 800 into alignment with the product-dividend pinions. Accordingly, the next rotation of the product-dividend register will cause the divisor to be added once into the dividend. It should be noted that a tens transfer will occur in the highest order of the product-dividend register during such addition of the divisor thereto. However, the pawl 1407 is separate and distinct from the pawl 1406 and is therefore not affected by the position of the bellcrank lever 1894 (FIG. 45A). Accordingly, as the product-dividend register is completing the cycle of rotation in which the divisor is being added to the dividend the pawls 1406 and 1407 will be again reciprocated leftwardly and rightwardly and during such reciprocation it will be seen from FIG. 45A that the pawl 1407 will be moved to the left of the next adjacent tooth 1403A. Hence the subsequent rightward movement of the pawls 1406 and 1407 will cause the pin carriage to be stepped by an additional half step to the right to again bring the complemental pins 810 into alignment with the product-dividend pinions. Thereafter the divisor will again be repeatedly subtracted from the dividend (by the repeated addition of the nines complement of the divisor to the dividend). It should be noted that during the division process the tunnel shaft 1436 remains latched in its clockwise position and that no means is provided for disengaging the high-speed clutch. Accordingly, the product-dividend register rotates continuously without interruption once the division process has been initiated, with the pin carriage being stepped to the right by half steps during the time that the pinions of the product-dividend register are not engaged therewith.

It is evident that when the division process has been completed further rotation of the product-dividend register must be stopped and therefore means is provided for disengaging the high-speed clutch when the quotient counting pawl reaches its home position. As previously described in connection with FIG. 46 the division shaft 1815 is latched in its clockwise actuated position by a latching lever 1819. Referring now to FIG. 46 it will be seen that the cam 1882 on the high speed shaft is engaged with a roller 1900A on the left side of a bellcrank lever 1900 pivoted on the stationary shaft 1901. A spring 1902 connected to a driving link 1903 pinned to the front end of the lever 1900 serves to urge the roller 1900A against the cam 1882. The link 1903 carries a first leftwardly extending lug 1903A which is selectively engageable with the clutch latch 1490 which serves to hold the high speed clutch in an operated condition. The link 1903 has an enlarged opening 1903B near its upper end through which a stationary shaft 1904 passes. The upper end of the link 1903 is engaged with the leftwardly extending stud 1906A on a horizontal slide 1906 which is urged rearwardly by a light spring 1907 connected to a lug on the lever 1814 pinned to the division shaft 1815. The slide 1906 has a leftwardly extending lug 1906B which is disposed in front of the vertical stud 1908A carried on the left end of a bellcrank lever 1908 pivoted at 1909. The L-shaped frame 1400A which moves with the quotient driving pawl assembly carries an upwardly extending stud 1400B which is adaptable to the rearwardly extending arm of the bellcrank lever 1908. A heavy spring 1912 is connected to the left end of the lever 1908 and to the stationary shaft 1904 so that the bellcrank lever 1908 is constantly urged counterclockwise. When the frame 1400A is in its rightmost position the stud 1400B will be engaged with the lever 1908 and will serve to hold said lever in a clockwise position. However, as soon as the frame 1400A moves to the left from its home position the stud 1400B will move away from the lever 1908 and hence the spring 1912 will be effective to pull lever 1908 counterclockwise and move slide 1906 forwardly. When slide 1906 is in its forward position the upper end of the link 1903 will be held forwardly in a position such that the leftwardly extending lug 1903A will bypass the front end of the latch 1490 as the link is reciprocated upwardly and downwardly in response to each revolution of the product-dividend register. Therefore the latch 1490 will not be released and the high-speed clutch assembly will remain engaged.

When the slide 1906 is in its forward position a second rectangular lug 1903C on the link 1903 will bypass the front end of a lever 1913. The lever 1913 has a rightwardly extending stud 1913A which pivotably supports a rearwardly extending arm 1914. The arm 1914 is urged in a clockwise direction on the stud 1913A by the spring 1916 and is provided with a rectangular opening 1914A which are adaptable to the leftwardly extending rectangular lug 1819A on the latch 1819. The arrangement is such that when the lever 1913 is rocked clockwise the arm 1914 will move rearwardly so that the opening 1914A of the arm 1914 will become engaged with the lug on the latch 1819. The subsequent return of the lever 1913 to its initial counterclockwise position by the spring 1917 will then serve to rock the latch 1819 counterclockwise and release the division shaft 1815 for clockwise return to its home position (the shaft 1815 is shown in its counterclockwise operated position with the latch 1819 holding it in such position).

From the above it will be seen that when the frame 1400A is to the left of home position the slide 1906 will be held forwardly by the heavy spring 1912 acting through lever 1908. Hence the link 1903 will have no effect on the levers 1913 and 1490 and will not stop the division process. However, when the frame 1400A reaches its home rightmost position the stud 1400B thereon will engage the lever 1908 and cause the stud 1908A to move rearwardly. This then permits the slide 1906 to move rearwardly under the urge of the light spring 1907. Thereafter the next cycle of operation of the high speed shaft which serves to drive the link 1903 upwardly will cause disengagement of the high speed clutch and also release the division shaft 1815. It should be noted that the complemental pins of the divisor unit are disposed on the right-hand side of the pins 800 which are set to represent the divisor. As disclosed in connection with the description of the pin carriage and the quotient driving pawl, the complemental pins are disposed to the right of the product-dividend pinions when the pin carriage is in its rightmost position. Therefore, the last rotation of the product-dividend register which serves to disengage the high speed clutch and to release the division shaft 1815 will take place with the add pins 800 aligned with the product-dividend pinions. This last cycle is thus an add operation which corrects the over subtraction which occurs during the final subtract operation.

It should be noted in FIG. 46 that when the slide 1906 moves forwardly under the counterclockwise urge of the lever 1908 caused by leftward movement of the pin carriage the cam surface of the lug 1906C on the slide 1906 will engage the stud 1914B on the arm 1914. This causes disengagement of the arm 1914 from the latch 1819 so that the latch 1819 will again be adaptable to the lug 1814A on lever 1814 and therefore will serve to hold shaft 1815 in its counterclockwise position when the divisor key is operated.

*Quotient printing*

As previously described in connection with the entering of the multiplier into the multiplier-quotient pinions, the shaft 916 which supports the pinions 901 is moved rearwardly by the apparatus illustrated in FIG. 30 after the add racks have been moved to their multiplier representing positions. Accordingly, the subsequent forward drive of the add racks causes the multiplier to be entered into the pinions 901. In a similar manner the quotient is printed after the division routine has been ended (in a manner above described) by the movement of the pinions 901 rearwardly into engagement with the vertical racks 806 prior to the time that the add racks move rearwardly.

As seen in FIG. 10 and as previously described the operation control slide 566 which moves rearwardly when the divisor key is operated is adapted to undergo three steps of rearward movement. During the first cycle of the main driveshaft which takes place the divisor is entered and the division routine is initiated. As previously described the slide 566 is stepped forwardly by one step near the end of that cycle of the main driveshaft. Accordingly, when the division control shaft 1815 is released upon termination of the division routine the resulting cycle of operation previously held in abeyance by the apparatus shown in FIGS. 14 and 15 will take place with the slide 566 one step forwardly of its rearmost position. Accordingly, as seen in FIG. 10 this cycle of the main driveshaft will cause the slide 566 to be driven downwardly and as a result thereof the sensing interposer 647 will be driven downwardly. It will be seen in FIG. 10 that the sensing interposer 647 underlies the upper front end of the coupling interposer 1925 pinned to the lower end of the lever 1926 which is in turn pinned to the small shaft 912A which carries the lever 912 in FIGS. 10 and 41. The coupling interposer 1925 is provided with a rightwardly extending lug 1925A which enters into a rectangular opening in the upper surface of the power driven total control slide 638. Accordingly, when the slide 638 is driven forwardly during the early portion of the cycle of the main driveshaft (as previously described) the shaft 912A will be rocked clockwise and as seen in FIG. 41 and as previously described in connection with the entering of a multiplier the pinions 901 will be moved rearwardly into engagement with the vertical racks 806. As seen in FIG. 38A the cam plates 1440 secured to the pinions 901 are so shaped that the noses 1440B thereon are disposed at a greater radius than any other surface on the cam plates. The noses 1440B are engageable with the stationary abutment members 1927A which extend forwardly from the small frame 1927 seen most clearly in FIG. 44. The arrangement is such that when the pinions 901 and associated cam plates 1440 are in their forward positions the cam plates 1440 including the noses 1440B will clear the abutment members 1927A. However, when the shaft 915 is moved rearwardly to bring the pinions 901 into engagement with the vertical racks 806 the noses 1440B will cooperate with the abutment members 1927A so that as the pinions 901 are rotated clockwise by the downward travel of the vertical racks 806 the pinions 901 will be zeroized. Since the racks 806 are moved downwardly in response to the rearward travel of the horizontal add racks it will be seen that the add racks will be positioned in accordance with the amount established in the pinions 901 during the above described division routine. Therefore the quotient will be printed in the manner described in connection with the description of the printing apparatus.

Figure 40:
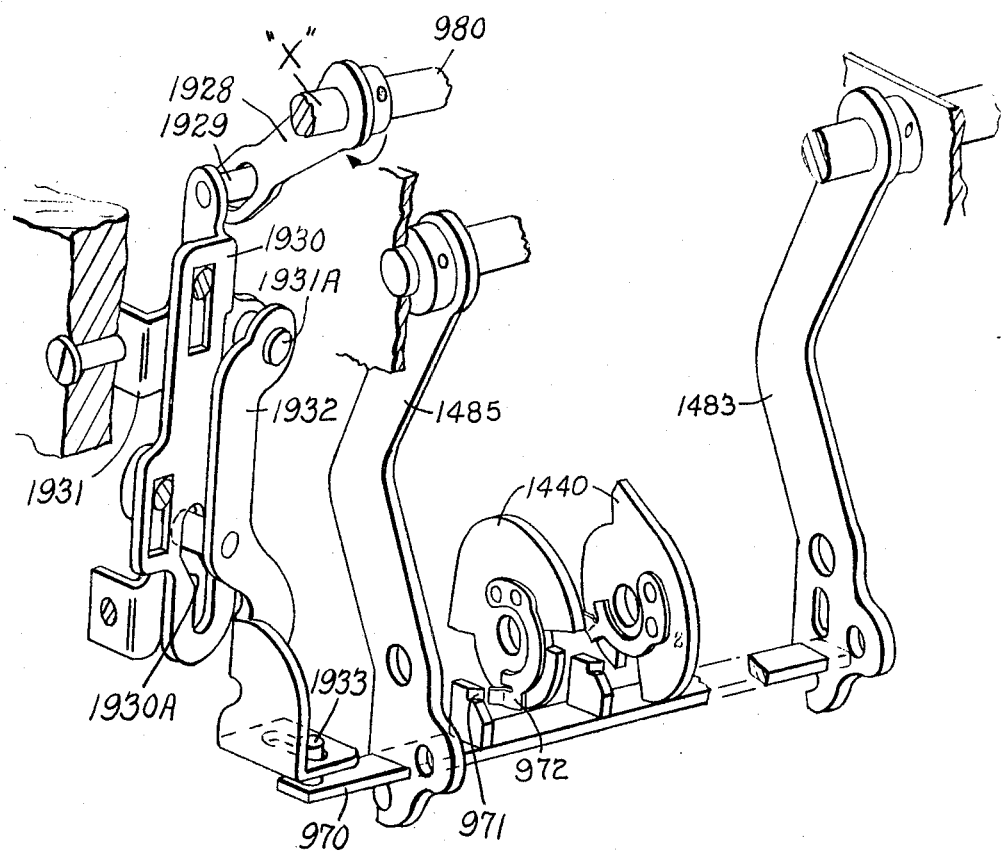
FIG. 40 is a left front perspective of the apparatus used for translating the multiplier-quotient unit forwardly or rearwardly.

It should be noted at this time that during a multiplication operation tens transfers take place within the multiplier unit to accommodate the shortcut procedure previously described. However, during division it is obvious that such tens transfers must not occur in the multiplier-quotient unit. Therefore as seen in FIG. 40 the cam plate 970 which carries the upstanding cam lugs 971 (see also in FIG. 39) is supported for lateral movement in a manner such that the cam lugs 971 can be aligned to cause tens transfers in the pinions 901 during multiplication operations and yet be moved to inactive positions during division operations. To this end it will be seen in FIG. 40 that the multiplication control shaft 980 has an arm 1928 secured thereto which encompasses a stud 1929 extending to the right from a vertical slide 1930 supported by stud and slot connections on a small stationary frame 1931. The slide 1930 is further provided with a cam surface 1930A in its lower end which is adaptable to a rearwardly extending stud carried by a lever 1932 pivoted at 1931A on the small stationary frame 1931. The lever 1932 has a lower horizontal section through which a vertical stud 1933 secured to the cam plate 970 passes. The arrangement is such that the cam plate 970 and the associated cam lugs 971 are normally disposed in their leftmost positions so that the lugs 971 do not interfere with the tens transfer apparatus of the pinions 901. Accordingly, the pinions 901 are free to be rotated in response to the operation of the quotient driving pawl during division operations. However, when the multiplication control shaft 980 is rocked counterclockwise it will be seen that the cam lugs 971 will be driven to the right to their proper positions for causing tens transfers to occur in the manner previously described in connection with the performance of a multiplication operation.

From the above it will be seen that after the division routine has been completed an automatic cycle of operation of the main driveshaft will take place during which the quotient will be printed.

*Remainder printing*

Since the divisor key causes the control slide 566 to undergo three steps of rearward travel it will be seen that when the slide 566 is moved forwardly by one step during the quotient taking cycle the divisor key will remain latched down and hence a third automatic cycle of the main low speed driveshaft will take place. This third cycle serves to remove any remainder from the product-dividend register and cause the same to be printed. The remainder taking cycle is substantially identical to the product taking cycle previously described.

As seen in FIGS. 10 and 12 and as described in connection with a product printing cycle, the sensing interposer 649 is driven downward when the slide 566 is driven downward (when one step to the rear of its forward home position). Therefore, the shaft 1707 (FIG. 12) will be rocked counterclockwise before the add racks are released for rearward travel and hence a total taking cycle of operation takes place with the amount in the product-dividend register being transferred to the add racks (and hence the print sectors). Therefore, the remainder is printed in a manner analogous to the printing of a product.

*Decimal division*

As previously described the machine is provided with a punctuation locating and printing mechanism including three separate punctuation control slides. This mechanism is coupled with the arithmetic portions of the machine in a manner such that the machine will divide two numbers each of which has a decimal therein and cause the quotient to be printed with the decimal located at the proper position.

Referring now to FIGS. 45 and 47 and in particular to FIG. 47, it will be seen that a rotatable decimal drum 1950 is provided, said drum having radially extending lugs 1950A disposed in a helix or spiral about the periphery thereof. As seen in FIG. 47 the drum 1950 is carried by a shaft 1951 having a gear 1952 secured thereto which is constantly in mesh with a vertical geared rack 1953. The lower end of the rack 1953 has openings 1953A provided therein which are adapted to receive the teeth of a gear 1954 secured to the shaft 351 which is power driven counterclockwise in a stepwise fashion in response to the operation of each numerical key following operation of the decimal key. It will be seen in FIG. 47 that the shaft 351 carries a gear 350 which is constantly in mesh with the decimal print control slide 312. Therefore, the angular position of the drum 1950 will correspond to the position of the decimal slide 312.

As previously described the interconnecting interposer 1402 is elevated by the bellcrank lever 1681 and bail 1680 each time the main driveshaft is rotated so that the sensing and driving pawl assembly carried by the frame 1400A as well as the pin carriage can be brought to their home positions. As seen in FIG. 47 the divisor control shaft 1815 has a forwardly extending lever 1960 pinned thereto which carries a leftwardly extending lug to which a spring 1961 is connected. The other end of the spring 1961 is connected to a leftwardly extending stud carried by a lever 1963 pinned to the shaft 1964 supported for rotation by the frame 1965. A shaft 1966 extends between the downwardly extending lever 1963 and a second lever 1967 which is pinned to the shaft 1964. The central portion of said shaft 1966 is disposed within the slot provided in the upper end of a lever 1968 secured to the right end of a cylinder 1969 having a forwardly extending rectangular lug 1969A. The cylinder 1969 is supported for rotation by means of a bracket 1970 secured to the upper right end of the frame 1400A. The spacing of the lug 1950A is such that each step of movement of the slide 312 to the left will cause successive ones of the lugs 1950A to be aligned with the lug 1969A. When slide 312 is in its rightmost position the rightmost lug 1950A on drum 1950 is aligned with lug 1969A.

A vertical slide 1971 is pinned to the rear arm of the bellcrank lever 1681 and is provided with a slot in its upper end which encompasses the shaft 1964. Slide 1971 has a cam surface 1971A which is adaptable to the right end of the shaft 1966 carried by levers 1963 and 1967. The arrangement is such that when the bellcrank lever 1681 is in its clockwise position (as illustrated in FIG. 47) the rearmost portion of the slide 1971 will serve to hold the levers 1963 and 1967 in their counterclockwise positions and hence the forwardly extending lug 1969A of the cylinder 1969 will be in a position such that there will be no interference with the lugs 1950A on the drum 1950 as the frame 1400A moves leftwardly.

From the above it will be seen that the angular position of the drum 1950 will have no effect on the lateral position of the frame 1400A and mechanism carried thereby unless the divisor shaft 1815 has been rotated to its counterclockwise position by the operation of the divisor key. It should also be noted that when the shaft 1815 (FIG. 47) is in its counterclockwise position the shaft 1966 carried by the levers 1963 and 1967 will be urged forwardly so that when the bellcrank lever 1681 is rocked counterclockwise the associated elevation of the link 1971 will permit the lug 1969A on the small cylinder 1969 to move into a position of engagement with one of the lugs on the cylinder 1950. The position of the cam surface 1971A on the link 1971 is such that the lug 1969A is moved into its active position prior to the time that the interconnecting coupling member 1402 is completely elevated. Accordingly, during those operations when the drum 1950 is to control the lateral position of the frame 1400A and associated mechanism the lug 1969A will be in its proper position prior to the time that the coupling member 1402 is completely elevated.

Figure 50:
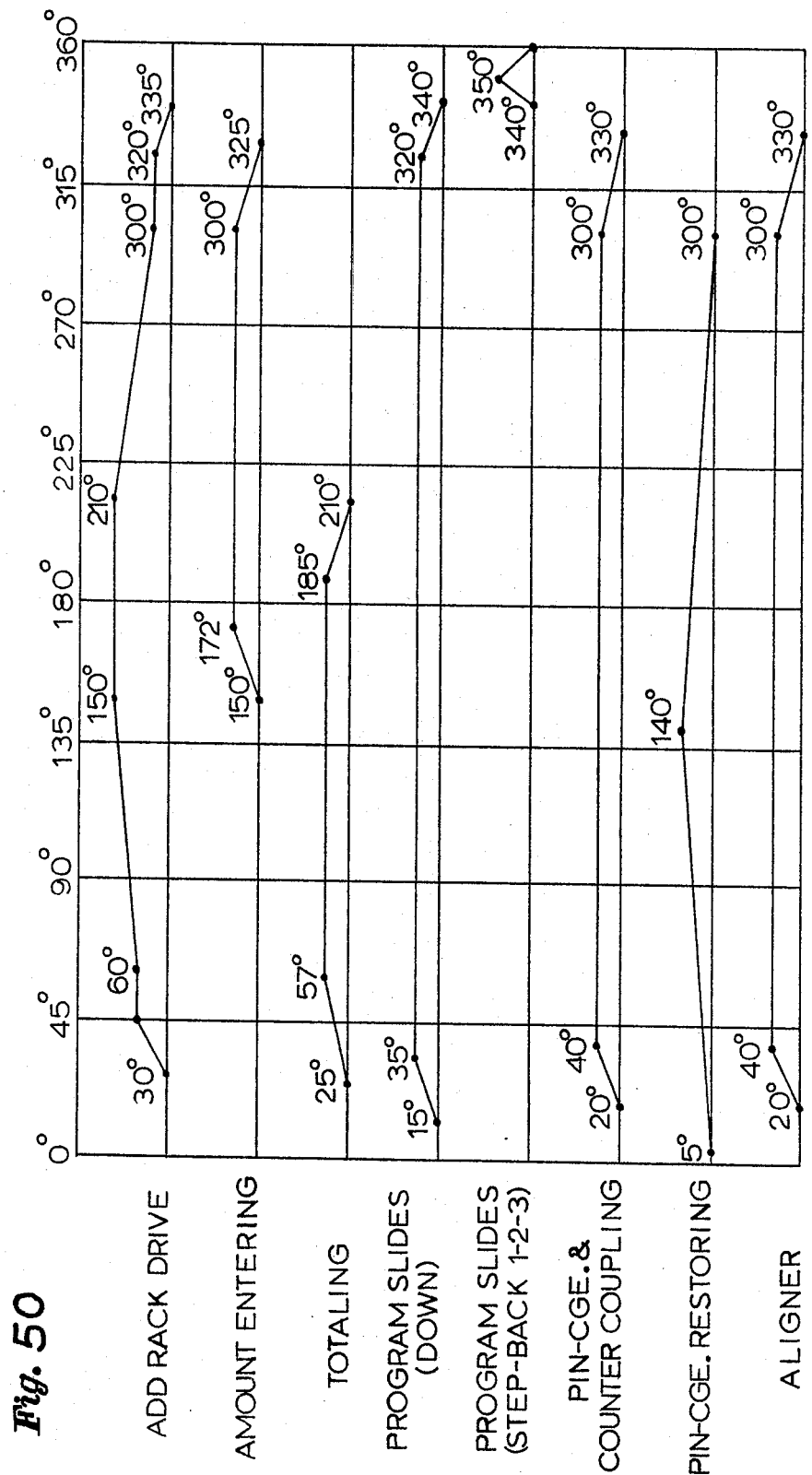
FIG. 50 is a timing diagram showing the time during which various devices are operated during the 360° of rotation of the main low speed driveshaft; and, FIG. 50A is a timing diagram showing the time of operation of various parts during rotation of the high speed product-dividend assembly.
Figure 50A:
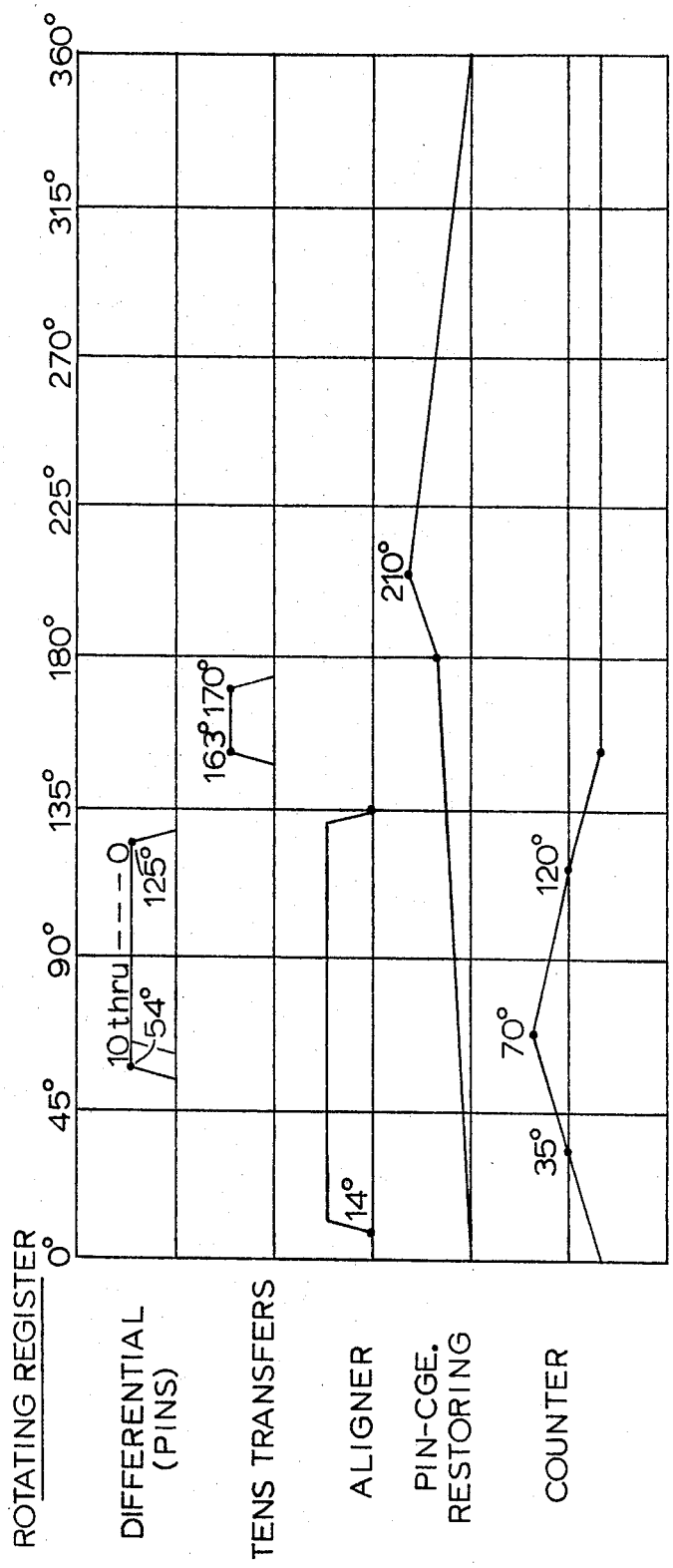

It might be well at this time to review the operation of the various escapement pawls and coupling members associated with the pin carriage and the quotient counter assembly. It should be recalled in connection with FIGS. 42, 43A, 43B and 44 that the heavy escapement pawls 1406 and 1407 are normally in their active positions of engagement with the escapement teeth 1403A carried by the pin carriage. In a similar manner the normal home position of the tunnel shaft 1436 prior to the operation of the divisor key is such that the escapement pawl 1433 which is carried by the frame 1400A is in its counterclockwise position ready to engage one of the escapement teeth on the stationary escapement rack 1434. As seen in FIG. 44 the latching bellcrank 1454 serves to hold the tunnel shaft 1436 in its clockwise position. During the cycle of operation of the main driveshaft which takes place during the entry of the dividend the pin carriage restoring mechanism of FIG. 34 is operated to drive the pin carriage to the right to its home position. In this connection it should be noted from FIGS. 50 and 50A that when the main driveshaft rotates the pin carriage and frame coupling member 1402 is elevated after approximately 40° rotation of the main driveshaft and remains in said elevated position until after approximately 300° of rotation of the main driveshaft. However, since the slide member 1850 of FIG. 44 is elevated only in response to the operation of the divisor key the tunnel shaft 1436 will not be released and hence the small escapement pawl 1433 will not be disabled during the dividend entry. Therefore even though the coupling member 1402 is elevated from 40° to 300° the small pawl 1433 will prevent leftward movement of the frame 1400A. During the entire dividend entry cycle the heavy escapement pawls 1406 and 1407 are in their active positions serving to hold the pin carriage against leftward movement, since as previously described the entry of the dividend has no effect on the pawls 1406 and 1407. As seen in FIG. 50 the coupling member 1402 is driven downwardly at approximately 330° of rotation of the main driveshaft.

It should be noted at this point that the pin carriage and frame 1400A are always returned to their home positions following a multiplication operation. For example, as previously described, when the pin carriage and the frame 1400A reach their most leftward positions upon the completion of a multiplication operation, the second cycle of operation of the main driveshaft which takes place for the printing of the product is automatically initiated. During such automatic cycle of operation the coupling member 1402 would be elevated, the restoring mechanism of FIG. 34 would operate to drive the frame 1400A to the right, and as a result thereof the heavy block 1400 would engage the upper right end of the pin carriage and cause the pin carriage to be driven to the right to its home position. Once the pin carriage and frame 1400A reach their home positions there would of course be a tendency for them to follow the sliding restoring block 1697 (FIG. 34) to the left as the restoring mechanism returns to its initial condition. However, the heavy escapement pawls 1406 and 1407 serve to hold the pin carriage against such leftward movement.

From the above it will be seen that prior to the operation of the divisor key the counting pawl 920 and the pin carriage will be in their home positions with the quotient counting pawl 920 aligned with the units order pinion in the quotient register and with the units order pins 800 in the pin carriage aligned with the units order pinions of the product-dividend register. Assuming the divisor has a decimal amount therein, it will be seen in FIG. 47 that the drum 1950 will be moved counterclockwise by a number of steps equal to the number of digits to the right of the decimal in the divisor (such movement of the drum 1950 taking place in response to the operation of the numerical keys in the manner previously described). During the first cycle of operation which takes place when the divisor key is operated the mechanism of FIG. 47 will be rendered operable by the rotation of the main driveshaft to cause the lug 1969A to move into a position of alignment with one of the lugs on the drum 1950 and to cause the coupling member 1402 to be elevated. Even though the coupling member 1402 is elevated relatively early in the cycle of the main driveshaft (at approximately 40°) it should be noted that leftward movement of the frame 1400A including the cylinder 1969 is prevented at that moment since the tunnel shaft 1436 is in its latched position and therefore the escapement pawl 1433 is operative to hold the frame 1400A against leftward movement. During the first half of the first cycle of the main driveshaft initiated by the operation of the divisor key the restoring mechanism of FIG. 34 operates.

As seen in the timing diagram the pin carriage restoring mechanism reaches its most rightward position after approximately 140° of rotation of the main driveshaft. As described in connection with FIG. 44 the rightward movement of the carriage restoring mechanism serves to release the tunnel shaft which moves counterclockwise under the urge of the spring 1456A. Such counterclockwise movement of the tunnel shaft causes the pawl 1433 to be moved clockwise away from the stationary escapement teeth 1434 and hence the frame 1400A and cylinder 1969 are released for leftward movement under the urge of spring 1400D. At the time that the tunnel shaft is released the carriage restoring mechanism is near its extreme right-hand position. As the restoring mechanism returns to its home position the frame 1400A will be in a released condition and hence will follow the restoring member 1697 (FIG. 34) as it moves leftwardly. This serves to control the rate of leftward movement of the frame 1400A and thus prevent heavy impact of the lug 1969A with one of the lugs 1950A.

Referring to FIGS. 34, 43B and 47 it will be seen that the extent of such leftward movement of the frame will be controlled by the engagement of the lug 1969A on the small cylinder 1969 with one of the lugs 1950A on the drum 1950. It should be noted that during such leftward movement of the frame 1400A the coupling member 1402 is in its elevated position and therefore there is relative movement between the frame 1400A and the pin carriage since the pawls 1406 and 1407 have not at this time been released. It should also be noted that if the divisor does not have any digits therein to the right of the decimal the lug 1969A on the cylinder 1969 will engage the rightmost lug 1950A on the drum 1950 and prevent leftward movement of the frame 1400A with respect to the pin carriage. As seen in the timing diagram of FIG. 50 the coupling member 1402 will be driven downwardly to its initial position after approximately 300° of rotation of the main driveshaft. The lower end of the coupling member 1402 is chamfered so that when the coupling member is driven downwardly the frame 1400A will be cammed to the right to relieve any pressure which might be exerted on the drum 1950. It should also be noted that when the coupling member 1402 is driven downwardly it will engage one of lugs 1403 in the top of the pin carriage prior to the time that the slide 1971 is moved downwardly by an amount sufficient to cam the shaft 1966 rearwardly. Accordingly the frame 1400A and the pin carriage will be interconnected in response to the downward movement of the coupling member 1402 before the lug 1969A on the small cylinder 1969 is moved away from the lugs 1950A on the drum 1950.

At this time the pawls 1406 and 1407 serve to hold the frame 1400A as well as the carriage against leftward movement. Since the small escapement pawl 1433 is being held in an inactive position due to the release of the tunnel shaft the heavy escapement pawls 1406 and 1407 will be the only thing holding the pin carriage and frame 1400A against leftward movement. Accordingly, when the stud 1425 (FIG. 43A) carried by a cam on the main driveshaft engages the lever 1424 near the end of the cycle of operation of the main driveshaft the release of the escapement pawls 1406 and 1407 caused thereby will permit leftward movement of the pin carriage and the frame having the quotient driving pawl associated therewith. As previously described, the heavy pawls 1406 and 1407 will be latched in their inactive positions as a result of the operation of the divisor key and hence the pin carriage will be free to continue its leftward movement even though the main driveshaft returns to its home position.

As previously described in connection with FIG. 45 the pin carriage and frame 1400A will continue their leftward movement until the highest order in the pin carriage having the top pin 800 therein displaced from its inactive position engages the lug 1860A on the lever 1860. Such engagement of the highest nonzero order of the pin carriage with the lever 1860 will render the escapement pawl 1433 active and also serve to rock the tunnel shaft back to its clockwise latched position. The return of the tunnel shaft to its clockwise position serves to render the high-speed clutch active. It should be noted that the heavy escapement pawls 1406 and 1407 were latched in their inactive positions by the latch 1428 in response to the operation of the lever 1424 (FIG. 43A) near the end of the first cycle of the main driveshaft initiated by the divisor key. When the small escapement pawl 1433 is rendered operable by the clockwise movement of the tunnel shaft it will serve to hold the pin carriage against leftward movement during the first rotation of the product-dividend register which takes place.

The first cycle of the product-dividend register during a division operation is used to make certain the tunnel shaft 1436 is reset and to render the escapement pawls 1406 and 1407 operable. The mechanism for performing this function is illustrated in FIG. 42 and includes a lever 1980 pinned to the divisor shaft 1815. It should be recalled in connection with the operation of the multiplier-quotient driving pawl 920 that the shaft 928 which carries the driving interposer 930 is reciprocated downwardly and upwardly in response to each cycle of the product-dividend register. As seen in FIG. 42 the rearwardly extending lug 1981 is provided on a small slide 1982 carried by stud and slot connections on the left side of the lever 1980. A spring 1983 serves to constantly urge the slide 1982 to its uppermost position. The slide 1982 carries a leftwardly extending stud 1984 which overlies a lever 1986 pinned to the right end of the tunnel shaft 1436. The arrangement is such that if the slide 1982 is driven downwardly by the shaft 928 in response to rotation of the product-dividend register the tunnel shaft 1436 will be driven clockwise by an amount sufficient to cause relatching thereof. The lug 1981 on the slide 1982 is normally positioned forwardly of the shaft 928. Therefore, the movement of shaft 928 has no effect on the tunnel shaft unless the lever 1980 is moved to its counterclockwise position as illustrated in FIG. 42. The lever 1980 is only moved to its counterclockwise position when the divisor shaft is in its counterclockwise position and thus it will be seen that when the shaft 928 is driven downwardly during the first cycle of operation of the product-dividend register during a division operation the tunnel shaft 1436 will be driven clockwise. As seen in FIG. 43 this clockwise movement of the tunnel shaft serves to move the lever 1456 into latching engagement with the bellcrank latch 1454. The extent of this movement of the tunnel shaft is also sufficient to bring the lever 1870 (FIG. 43) pinned to the left end thereof into engagement with the lug on the bellcrank lever 1871. As seen in FIG. 43B the bellcrank lever 1871 is provided with a forwardly extending arm having a forked end 1871A disposed about the rearwardly extending lug 1428A on the latching member 1428. Accordingly, the relatching of the tunnel shaft 1436 during the first cycle of operation of the product-dividend register causes the latching member 1428 to be disabled and hence causes release of the escapement pawls 1406 and 1407. At the instant that the escapement pawls are released the cam 1441 (FIG. 34) carried by the shaft which supports the product-dividend register is in engagement with one of the circular cams 1442 carried by the shaft 1443 extending to the right from the pin carriage. Therefore the pin carriage is held to the right by an amount sufficient to permit engagement of the pawl 1407 with one of the escapement teeth 1403A as illustrated in FIG. 45. As previously described the position of the pin carriage when the pawl 1407 is actively engaged with one of the teeth 1403A is such that the complemental pins in the pin carriage are aligned with the product-dividend pinions. Therefore, it will be seen that during the first cycle of operation of the product-dividend register the escapement pawls 1406 and 1407 will be released for their normal operation as described in connection with the performance of division operations.

It should be noted that since the tunnel shaft 1436 is relatched in its clockwise position in response to the first cycle of operation of the product-dividend register the small escapement pawl 1433 (FIG. 42) will be in its active position. However, since the heavy escapement pawls are used to positively drive the pin carriage to the right in the manner previously described it will be seen that the pawl 1433 will merely bounce over the stationary escapement teeth 1434 (FIG. 42) in response to such rightward movement of the pin carriage. It should also be noted that since the tunnel shaft remains in its relatched condition throughout the division routine the sensing pawl 1430 (FIGS. 36 and 37) will be held in its clockwise position and therefore the sensing noses 1430B and 1430C will be retained to the right of the various cams 1440 associated with the multiplier-quotient pinions. Since each of the multiplier-quotient pinions is in its zero position prior to the initiation of the division routine, sensing pawl 1430 will be aligned with and hence be able to pass through the rectangular openings provided in the cams 1440 at the zero positions thereof.

From the above it will be seen that the machine is adapted to perform division operations in which the dividend and the divisor each have decimal amounts therein. As described above the machines will automatically perform the necessary division routine, and then will cause the quotient to be printed with the decimal being properly located in the printed quotient. One point should be clarified however, since from the above it would appear that if the divisor is less than one but greater than zero with a number of zeros appearing between the decimal and the first nonzero digit thereof, difficulty would be encountered in regards the initiation of the division routine when a large dividend is involved. That is, it will be seen in FIG. 45 that if the divisor is a number such as ".00052" the quotient counter will be positioned five steps to the left of the normal home position thereof with respect to the pin carriage. Accordingly, as the pin carriage and quotient counter move to the left the coupling pin might reach its leftmost position prior to the time that the pin 800 in the pin carriage in the order having the "5" therein reached the end of the lever 1860. Movement of the lever 1860 is necessary to initiate the division operation and thus it will be seen that if additional means were not provided the machine might remain in an unoperated condition with the amounts set therein.

To prevent the above "machine lock-up" which might occur an additional sensing lever is provided which is responsive to the leftward movement of the quotient counting mechanism at the inception of the division operation to cause release of the tunnel shaft 1436. To this end, as seen in FIG. 45, a second lever 1983 similar to the lever 1860 is supported on the downwardly extending arm of a lever 1987 pivoted on a small stationary bracket and having its rightwardly extending arm coupled with a link 1988 pinned to the forwardly extending portion 1863A of the link 1863. The arrangement is such that if the coupling member 1402 is to the left of the highest nonzero order in the pin carriage (as for example when the divisor is an amount less than 1) the coupling member 1402 will engage the lug on the lever 1983 and cause the tunnel shaft 1436 to be rocked clockwise in a manner substantially identical to the manner in which the engagement of a displaced pin 800 with the lever 1860 serves to move the tunnel shaft 1436 clockwise. It will be seen that the two levers 1860 and 1983 together with the associated levers and linkages operate as a mechanical "OR" device in that the coupling member 1402 "OR" the highest order displaced pin 800 will cause the tunnel shaft 1436 to be reset depending upon which of the two is farthest to the left as the pin carriage and coupling member 1402 move leftwardly in the initiation of a division operation.

It is important that the levers 1983 and 1860 be disabled during multiplication and therefore as seen in FIG. 45 the multiplication control shaft 980 has a lever 1989 pinned thereto, the front of said lever 1989 being connected to a downwardly extending link 1990. The lower end of link 1990 is pinned to the left end of the lever 1860 and further carries an auxiliary link 1991 which is pinned to the left end of the lever 1983. The arrangement is such that when the multiplication control shaft 980 is rocked counterclockwise in the manner previously described the link 1990 will be driven downwardly and as a result thereof the levers 1860 and 1983 will be rocked counterclockwise to positions where their lugs 1860A and 1983A (respectively) will be removed from the paths of the pins 800 and the coupling member 1402 respectively. Accordingly, the levers 1860 and 1983 are rendered inactive during multiplication operations.

It should be noted that in those cases where the divisor contains a decimal amount the quotient counter and the coupling pin 1402 (FIG. 47) are disposed to the left of the right end of the pin carriage. Since the division routine is ended as a result of the frame 1400A reaching its rightmost position, which corresponds to alignment of the quotient counter with the lowest order quotient pinion, it will be seen that the pin carriage will be to be the *right* of its normal home position (the normal home position being with the lowest order pins aligned with the lowest order main add racks and the units order of the product-dividend register). It will be seen that the product-dividend register has 20 pinions therein, only 12 of which are used to accumulate a product and which are aligned with the print sectors. The other eight pinions are to the right of the lowest order print sector as well as to the right of the lowest order quotient pinion. Therefore, these additional eight pinions will permit proper operation of the mechanism during division even though the lowest order pins of the pin carriage go to the right of the lowest order quotient pinion. Since there are eleven columns of complemental pins and nine columns of solid teeth in the higher order complemental positions in the pin carriage, the necessary tens transfer in the highest order of the dividend register which is essential for correct division will always take place regardless of the lateral position of the pin carriage.

When the automatic quotient printing cycle takes place the coupling pin 1402 will be elevated but since the tunnel shaft 1436 is at this time latched in its clockwise position the small pawl 1433 will be effective to hold frame 1400A and the quotient counter against any leftward translation. As seen in FIG. 43B the shaft 913A which is rocked counterclockwise to cause engagement of the quotient pinions with the vertical racks has a lever 1994 pinned thereto which in turn carries a driving lever 1995 which is urged counterclockwise by a spring 1996. Lever 1996 has a rectangular notch cut in its lower front vertical surface. A stud 1997A on a lever 1997 is disposed within said notch so that when the shaft 913A rocks counterclockwise the lever 1997 will be rocked counterclockwise. The leftwardly extending end of lever 1997 overlies the end of the previously described lever 1427 and therefore it will be seen that the heavy pawls 1406 and 1407 will be disabled during a portion of the quotient cycle to permit the pin carriage to move to the left to its proper home position. The latch 1428 is held disabled by the tunnel shaft 1436 and therefore when shaft 913A returns to its clockwise position the pawls 1406 and 1407 will again be released. To prevent operation of the lever 1997 during multiplier entry operations (during which shaft 913A is also rocked counterclockwise) the control shaft 980 has a lever 1998 (FIG. 43B) pinned thereto which in turn has a leftwardly extending lug which underlies a portion of lever 1995. As previously described shaft 980 is moved counterclockwise during multiplier entry operations and therefore lever 1995 is disabled during such operations so that pawls 1406 and 1407 are not affected.

From the above it will be seen that during the quotient printing cycle the small pawl 1433 will hold the frame 1400A and sliding block 1400 against leftward movement. Therefore, when the pawls 1406 and 1407 are momentarily released the pin carriage will be pulled to the left to its home position, such leftward movement being limited by engagement of the upper right end of the pin carriage with the right end of the sliding block 1400. Thus it will be seen that even though the pin carriage might be to the right of its home position at the end of the division routine it will be moved to the left to its home position during the quotient printing cycle.

As previously noted the product-dividend register includes 12 pinions which are used for accumulating a product during multiplication and for receiving a dividend during division operations with the units order thereof being normally aligned with the units order of the pin carriage when it is in its normal home position. The product-dividend register also has eight additional pinions disposed to the right of the units order pinion which, as previously described, are used during division operations to insure correct answers in those cases where the quotient counter is displaced to the left of the units order of the pin carriage resulting in the units order of the pin carriage being to the right of the units order of the product-dividend register prior to completion of the division operation. When the remainder is printed from the normal twelve orders of the product-dividend register it will be seen that the eight additional orders must be cleared or zeroized even though the amounts contained in such additional eight orders will not be printed. To this end it will be seen that the lug 1705A (FIGS. 10 and 12) is not only disposed above a notch or opening in the power total slide 637 but is also disposed above an auxiliary U shaped slide 2000 disposed immediately adjacent the slide 637 and extending leftwardly under the six operation control slides and adapted by means of an upwardly extending portion at the left end thereof to support a lever 2001 connected to a sleeve 2002 disposed above the previously described shaft 1707. As seen in FIG. 11 the sleeve 2002 has a lever 2003 secured thereto which is substantially identical to the previously described levers 1710 which are used to bring the left twelve orders of the register into engagement with the add racks. In a similar manner when the sleeve 2002 is rocked counterclockwise the lever 2003 will maintain the right eight orders of the register in engagement with the racks during the remainder printing operation. It will be seen in FIG. 11 that the right eight orders of auxiliary racks 1713 are supported by a shaft 2004 which is separate from the shaft 1712 and said shaft 2004 is in turn supported by a separate frame 2005 which is substantially identical to the frame formed by the members 1714. The arrangement is such that when the sensing interposer 649 (FIG. 10) is driven downwardly during the remainder printing cycle of operation the lug 1705A (FIG. 12) will be disposed within notches provided in slides 637 and 2000 so that when the slide 637 is driven forwardly the slide 2000 will be carried therewith and hence shaft 1707 as well as sleeve 2002 will be rocked counterclockwise and cause all twenty of the auxiliary racks 1713 to be rocked into engagement with the twenty pinions of the product-dividend register for providing not only a printing of the remainder from the twelve highest orders of the product-dividend register but also for clearing the lowest eight orders of said register. Thus the product-dividend register is completely zeroized following printing of the remainder.

During the cycle of operation which takes place for printing of the remainder the control slide 566 will be moved forwardly to its home position and hence the divisor key will be released after having served to cause three cycles of the main low speed driveshaft.

From the above it will be seen that three automatic cycles of the low-speed shaft as well as automatic cycles of the high-speed shaft will have taken place to cause the automatic performance of a division operation including the printing of the divisor, quotient, and remainder.

There has been disclosed an improved calculating machine which is adapted to perform multiplication and division problems using a unique and novel set of parts which cooperate in a manner such that the machine can be constructed to perform at a high speed and yet produce accurate results. The machine is further adapted to provide printed results and so constructed that numerical amounts having decimals therein can be entered into the machine as factors for multiplication or division problems.

What is claimed is:

1. A calculating apparatus comprising in combination: a plurality of axially aligned counting pinions arranged in denominational order to form a first register; a second register including a first plurality of columns of pins each individually movable to a first or a second position; drive means selectively operable to move said first register in a circular path such that each of said pinions is engageable with the pins in one of said columns which are in their said first positions, the period of engagement of each pinion with an associated column of pins occurring simultaneously and in a manner such that for each complete rotation of said register through said circular path each pinion will be advanced by a number of units corresponding to the number of pins in the associated column which pins are in their said first position; simultaneous tens transfer means operable during each rotation of said first register through said circular path and after said pinions have departed from engagement with said pins to cause the simultaneous occurrence of tens transfers in selected orders of said first register; a third register; means selectively operable to cause said third register to count the number of times said first register is moved in said path or to control the number of times said first register is moved in said path; said second register being in the form of a pin carriage and further including a second plurality of columns of pins each disposed adjacent to one of the columns in said first plurality of columns, means supporting said carriage for transverse movement to bring either said first or said second plurality of columns into alignment with said pinions, and means operative to select which of said plurality of columns is aligned with said pinions.

2. A calculating apparatus as defined in claim 1 wherein said last named means is selectively responsive sequentially to the orders of said third register to control the position of said pin carriage.

3. A multiplication apparatus comprising in combination: a first shaft; a plurality of rotatable pinions supported on said shaft; power means selectively operable to move said shaft in a circular path; a pin carriage; a first plurality of pins disposed in first columns in said carriage; first pin control means selectively operable to move selected pins in a first group of columns into a first position such that movement of said shaft in said path will cause engagement of said pinions with said pins which are in their said first positions and cause rotation of said pinions, each of said pinions being simultaneously engageable with a pin; means supporting said carriage for movement parallel to said shaft; a storage register; means responsive to each movement of said shaft through said circular path to sequentially change the magnitude of the orders of said register in stepwise fashion to their zero condition; and means operable to move said carriage parallel to said shaft each time one of said orders of said register is reduced to its zero condition.

4. A multiplication apparatus as defined in claim 3 and including: means for sensing the condition of each order of said register sequentially and for providing a first signal when one of said orders is restored to its zero condition; means responsive to said first signal to preset said power means in a condition to stop movement of said shaft prior to another movement thereof through said path; means operative to move said sensing means into sensing relationship with the next higher orders of said register; and means responsive to said sensing means reaching a nonzero order of said register to release said power means for further movement of said shaft through said circular path.

5. A multiplication apparatus as defined in claim 3 and further including: a second plurality of pins disposed in second columns each of which is adjacent to one of said first columns in said carriage; second pin control means operable simultaneously with said first pin control means to move selected pins in said second columns into a first position such that movement of said shaft in said path will cause engagement of said pinions with those pins in either said first or said second columns which are in their said first positions; means for sensing sequentially the magnitude of the orders in said register; means controlled by said sensing means for positioning said first columns in active alignment with said pinions when the value of the order being sensed is of a first magnitude and for positioning said second columns in active alignment with said pinions when the value of the order being sensed is of a second magnitude; and wherein the order being sensed is restored to its zero condition in stepwise fashion in a first manner when said first columns are in active alignment with said pinions and in a second manner when said second columns are in active alignment with said pinions.

6. A multiplication apparatus as defined in claim 5 and wherein said first magnitude is five or less, said second magnitude is greater than five, said first manner is by steps which sequentially reduce the magnitude of the order toward zero condition, and said second manner is by steps which sequentially increase the magnitude of the order toward zero condition.

7. A calculating apparatus comprising in combination: a first shaft; a plurality of denominationally arranged accumulating pinions disposed on said shaft; power means operative to move said shaft in a circular path; a pin carriage; first and second groups of columns of individually movable pins disposed in said carriage; support means supporting said carriage for movement parallel to said shaft; pin carriage input means operative to move a number of pins in said first group of columns to first positions of engagement with said pinions during movement of said shaft in said circular path and to move a number of pins in said second group of columns corresponding to the nines complement of the number moved in said first group of columns to first positions of engagement with said pinions when said shaft is moved in said circular path; a storage register including a plurality of counting pinions; counting pinion drive means selectively engageable with any one of said counting pinions and operative to rotate one of said counting pinions by one step in a first direction when said shaft is moved once through said circular path with said first group of columns of pins aligned with said accumulating pinions and to rotate one of said counting pinions by one step in a second direction when said shaft is moved once through said circular path with said second group of columns of pins aligned with said accumulating pinions; means interconnecting said counting pinion drive means with said pin carriage to cause movement of said counting pinion drive means to a position of operation upon a selected one of said counting pinions in accordance with the lateral position of said pin carriage; and pin carriage positioning means selectively operable to position the lowest order column of said first group of columns with any one of said accumulating pinions.

8. A calculating apparatus as defined in claim 7 and wherein said last named means includes counting pinion sensing means coupled with said pin carriage and selectively operable to position said first group of columns of pins or said second group of columns of pins in alignment with said accumulating pinions depending upon the magnitude of a selected one of said counting pinions.

9. A calculating apparatus as defined in claim 7 wherein said last named means includes means selectively operable to move said pin carriage until the highest nonzero column of pins in said first group of columns reaches a predetermined lateral position, and including selectively operable means for disconnecting said means interconnecting said counting pinion drive means with said pin carriage to permit relative movement therebetween.

10. A calculating apparatus as defined in claim 9 and including: simultaneous tens transfer means associated with each of said accumulating pinions; sensing means selectively operable to sense the occurrence or nonoccurrence of a tens transfer in the highest order one of said accumulating pinions; and carriage drive means controlled by said last named sensing means to maintain said second group of columns of pins in alignment with said accumulating pinions as long as the highest order accumulating pinion undergoes ten steps of movement during each movement of said shaft through said circular path and to drive said carriage in a first direction to bring said first group of columns of pins into alignment with said accumulating pinions when the highest order accumulating pinion undergoes less than ten steps of movement during a movement of said shaft once through said circular path.

References Cited by the Examiner

UNITED STATES PATENTS

| | | | |
|---|---|---|---|
| 2,229,889 | 1/1941 | Friden | 235—62 X |
| 2,880,933 | 4/1959 | Westinger et al. | 235—79 |
| 2,886,238 | 5/1959 | Plunkett | 235—63 |
| 2,970,754 | 2/1961 | Gang | 235—60 |
| 3,069,084 | 12/1962 | Barkas et al. | 235—137 |
| 3,090,554 | 5/1963 | Malavazos | 235—63 |

RICHARD B. WILKINSON, *Primary Examiner.*

STEPHEN J. TOMSKY, *Examiner.*